United States Patent
Fisher et al.

(10) Patent No.: US 12,373,971 B2
(45) Date of Patent: Jul. 29, 2025

(54) SYSTEMS AND METHODS FOR TRIGGER-BASED UPDATES TO CAMOGRAMS FOR AUTONOMOUS CHECKOUT IN A CASHIER-LESS SHOPPING

(71) Applicant: STANDARD COGNITION, CORP., San Francisco, CA (US)

(72) Inventors: Jordan Fisher, San Francisco, CA (US); Nairwita Mazumder, San Francisco, CA (US); Arpan Ghosh, San Francisco, CA (US); Mohit Deep Singh, San Francisco, CA (US); David Woollard, San Francisco, CA (US); Michael Huang, San Francisco, CA (US)

(73) Assignee: STANDARD COGNITION, CORP., San Francisco, CA (US)

( * ) Notice: Subject to any disclaimer, the term of this patent is extended or adjusted under 35 U.S.C. 154(b) by 376 days.

(21) Appl. No.: 17/940,980

(22) Filed: Sep. 8, 2022

(65) Prior Publication Data

US 2023/0079388 A1    Mar. 16, 2023

Related U.S. Application Data

(60) Provisional application No. 63/295,418, filed on Dec. 30, 2021, provisional application No. 63/242,023, filed on Sep. 8, 2021.

(51) Int. Cl.
*G06T 7/20* (2017.01)
*G06F 16/55* (2019.01)
(Continued)

(52) U.S. Cl.
CPC ............... *G06T 7/60* (2013.01); *G06F 16/55* (2019.01); *G06F 16/75* (2019.01); *G06F 18/24* (2023.01);
(Continued)

(58) Field of Classification Search
CPC ............. G06T 7/60; G06T 3/18; G06T 7/246; G06T 2207/20081; G06T 2207/20132;
(Continued)

(56) References Cited

U.S. PATENT DOCUMENTS 6,154,559 A    11/2000   Beardsley
6,236,736 B1   5/2001    Crabtree et al.
(Continued)

FOREIGN PATENT DOCUMENTS

CN    104850846 A    8/2015
CN    105069413 A    11/2015
(Continued)

OTHER PUBLICATIONS

Search machine translation of TW-202013240-A to Fisher et al. (Fischetti D L), Deep Learning-Based Store Realograms, translated Nov. 10, 2024, 47 pages. (Year: 2024).*

(Continued)

*Primary Examiner* — Henok Shiferaw
*Assistant Examiner* — Dennis Rosario
(74) *Attorney, Agent, or Firm* — Haynes Beffel & Wolfeld LLP; Andrew L. Dunlap

(57) ABSTRACT

Systems and methods for tracking inventory items in an area of real space are disclosed. The method includes receiving a signal generated in dependence on sensors. The signal indicates a change to a portion of an image of an area of real space. The method includes, in response to receiving the signal, implementing a trained location detection model to determine, based on inputs, whether an inventory item (Continued)

identified in the portion of the image has changed a position in the area of real space. The method includes implementing a trained item classification model to determine a classification of the inventory item. The method includes updating an inventory database with inventory item data determined in dependence on the classification of the inventory item to provide an updated map of the area of real space as a result of the received signal indicating the change to the portion of the image.

19 Claims, 53 Drawing Sheets

(51) Int. Cl.
| | |
|---|---|
| *G06F 16/75* | (2019.01) |
| *G06F 18/24* | (2023.01) |
| *G06Q 10/08* | (2024.01) |
| *G06Q 10/087* | (2023.01) |
| *G06Q 10/0875* | (2023.01) |
| *G06Q 30/0207* | (2023.01) |
| *G06T 3/18* | (2024.01) |
| *G06T 3/60* | (2024.01) |
| *G06T 7/00* | (2017.01) |
| *G06T 7/246* | (2017.01) |
| *G06T 7/60* | (2017.01) |
| *G06V 10/24* | (2022.01) |
| *G06V 10/26* | (2022.01) |
| *G06V 10/75* | (2022.01) |
| *G06V 10/764* | (2022.01) |
| *G06V 10/774* | (2022.01) |
| *G06V 20/52* | (2022.01) |
| *G06V 40/10* | (2022.01) |
| *G06V 40/20* | (2022.01) |
| *G06N 3/02* | (2006.01) |
| *G06N 20/00* | (2019.01) |
| *G06Q 10/0833* | (2023.01) |
| *G06T 5/60* | (2024.01) |
| *G06T 5/80* | (2024.01) |
| *G06T 7/292* | (2017.01) |
| *G06V 10/82* | (2022.01) |
| *G06V 20/68* | (2022.01) |
| *G06V 20/70* | (2022.01) |
| *G06V 30/10* | (2022.01) |
| *G06V 30/146* | (2022.01) |

(52) U.S. Cl.
CPC ........... *G06Q 10/08* (2013.01); *G06Q 10/087* (2013.01); *G06Q 10/0875* (2013.01); *G06Q 30/0223* (2013.01); *G06T 3/18* (2024.01); *G06T 3/60* (2013.01); *G06T 7/0002* (2013.01); *G06T 7/20* (2013.01); *G06T 7/246* (2017.01); *G06T 7/251* (2017.01); *G06V 10/242* (2022.01); *G06V 10/243* (2022.01); *G06V 10/26* (2022.01); *G06V 10/7515* (2022.01); *G06V 10/764* (2022.01); *G06V 10/774* (2022.01); *G06V 20/52* (2022.01); *G06V 40/10* (2022.01); *G06V 40/28* (2022.01); *G06N 3/02* (2013.01); *G06N 20/00* (2019.01); *G06Q 10/0833* (2013.01); *G06T 5/60* (2024.01); *G06T 5/80* (2024.01); *G06T 7/292* (2017.01); *G06T 2207/20081* (2013.01); *G06T 2207/20084* (2013.01); *G06T 2207/20132* (2013.01); *G06V 10/82* (2022.01); *G06V 20/68* (2022.01); *G06V 20/70* (2022.01); *G06V 30/10* (2022.01); *G06V 30/1463* (2022.01); *G06V 30/1473* (2022.01); *G06V 30/1475* (2022.01)

(58) Field of Classification Search
CPC ............. G06T 2207/20084; G06T 7/73; G06T 7/70; G06T 7/74; G06T 7/75; G06T 7/77; G06T 7/62; G06T 7/64; G06T 7/66; G06T 7/68; G06T 7/0008; G06T 2219/004; G06T 2207/30232; G06T 2207/30128; G06T 3/60; G06T 7/001; G06T 7/0006; G06T 7/251; G06T 3/608; G06T 3/606; G06T 3/604; G06T 3/602; G06T 3/4046; G06T 7/0004; G06T 7/0002; G06T 7/20; G06T 7/292; G06T 5/60; G06T 5/80; G06Q 10/087; G06Q 10/0875; G06Q 10/0833; G06Q 10/08; G06Q 20/208; G06Q 30/0639; G06Q 30/0223; G06Q 30/0201; G06V 10/26; G06V 10/764; G06V 10/774; G06V 20/52; G06V 40/10; G06V 40/28; G06V 10/12; G06V 10/25; G06V 10/74; G06V 10/82; G06V 30/224; G06V 10/454; G06V 20/20; G06V 10/751; G06V 20/64; G06V 10/245; G06V 2201/06; G06V 30/1448; G06V 30/1473; G06V 10/22; G06V 20/00; G06V 20/44; G06V 30/19173; G06V 40/107; G06V 40/171; G06V 40/173; G06V 10/24; G06V 10/242; G06V 10/243; G06V 10/248; G06V 10/247; G06V 10/255; G06V 10/7515; G06V 10/7747; G06V 10/7753; G06V 10/809; G06V 10/811; G06V 10/88; G06V 20/176; G06V 20/35; G06V 20/36; G06V 20/38; G06V 20/39; G06V 20/41; G06V 20/47; G06V 20/58; G06V 20/68; G06V 20/70; G06V 20/80; G06V 30/00; G06V 30/1429; G06V 30/1463; G06V 30/146; G06V 30/1465; G06V 30/1468; G06V 30/147; G06V 30/1475; G06V 30/1478; G06V 30/153; G06V 30/1801; G06V 30/19167; G06V 30/20; G06V 30/199; G06V 40/161; G06V 40/172; G06V 40/197; G06V 40/23; G06V 40/25; G06V 40/30; G06V 40/37; G06V 40/394; G06V 2201/02; G06V 2201/03; G06V 2201/04; G06V 2201/05; G06V 2201/07; G06V 2201/08; G06V 2201/09; G06V 2201/10; G06V 2201/12; G06V 10/70; G06V 2201/00; G06V 30/10; G06V 20/60; G06V 20/62; G06V 20/66; G06V 20/698; G06V 40/103; G06V 40/113; G06V 40/11; G06V 40/117; G06V 30/413; G06V 30/40; G06V 40/00; G06V 30/36; G06V 20/188; G06N 20/00; G06N 3/08; G06N 3/0464; G06N 3/02; G05D 2101/15; G05D 2107/70; G06F 18/24; G06F 16/906; G06F 16/285; G06F 16/35; G06F 16/55; G06F 16/65; G06F 16/75; H04N 23/695; H04N 21/44008

See application file for complete search history.

(56) References Cited

U.S. PATENT DOCUMENTS 6,561,417 B1    5/2003    Gadd
6,768,102 B1    7/2004    Skoll

(56) References Cited

U.S. PATENT DOCUMENTS

| | | |
|---|---|---|
| 7,050,624 B2 | 5/2006 | Dialameh et al. |
| 7,050,652 B2 | 5/2006 | Stanek |
| 7,742,623 B1 | 6/2010 | Moon et al. |
| 8,009,863 B1 | 8/2011 | Sharma et al. |
| 8,098,888 B1 | 1/2012 | Mummareddy et al. |
| 8,219,438 B1 | 7/2012 | Moon et al. |
| 8,261,256 B1 | 9/2012 | Adler et al. |
| 8,279,325 B2 | 10/2012 | Pitts et al. |
| 8,577,705 B1 | 11/2013 | Baboo et al. |
| 8,624,725 B1 | 1/2014 | MacGregor |
| 8,749,630 B2 | 6/2014 | Alahi et al. |
| 9,036,028 B2 | 5/2015 | Buehler |
| 9,058,523 B2 | 6/2015 | Merkel et al. |
| 9,124,778 B1 | 9/2015 | Crabtree |
| 9,256,807 B1 | 2/2016 | Shlens et al. |
| 9,262,681 B1 | 2/2016 | Mishra |
| 9,269,012 B2 | 2/2016 | Fotland |
| 9,269,093 B2 | 2/2016 | Lee et al. |
| 9,294,873 B1 | 3/2016 | MacGregor |
| 9,449,233 B2 | 9/2016 | Taylor |
| 9,460,524 B1 | 10/2016 | Curlander et al. |
| 9,483,704 B2 | 11/2016 | Schwartz |
| 9,489,623 B1 | 11/2016 | Sinyavskiy et al. |
| 9,494,532 B2 | 11/2016 | Xie et al. |
| 9,536,167 B2 | 1/2017 | Schwartz |
| 9,536,177 B2 | 1/2017 | Chalasani et al. |
| 9,582,891 B2 | 2/2017 | Geiger et al. |
| 9,595,127 B2 | 3/2017 | Champion et al. |
| 9,652,751 B2 | 5/2017 | Aaron et al. |
| 9,811,754 B2 | 11/2017 | Schwartz |
| 9,846,810 B2 | 12/2017 | Partis |
| 9,881,221 B2 | 1/2018 | Bala et al. |
| 9,886,827 B2 | 2/2018 | Schoner |
| 9,911,290 B1 | 3/2018 | Zalewski et al. |
| 10,026,116 B2 | 7/2018 | Zohar et al. |
| 10,055,853 B1 | 8/2018 | Fisher et al. |
| 10,083,453 B2 | 9/2018 | Campbell |
| 10,127,438 B1 | 11/2018 | Fisher et al. |
| 10,133,933 B1 | 11/2018 | Fisher et al. |
| 10,165,194 B1 | 12/2018 | Baldwin |
| 10,169,677 B1 | 1/2019 | Ren et al. |
| 10,175,340 B1 | 1/2019 | Abari et al. |
| 10,176,452 B2 | 1/2019 | Rizzolo et al. |
| 10,192,408 B2 | 1/2019 | Schoner |
| 10,202,135 B2 | 2/2019 | Mian et al. |
| 10,210,603 B2 | 2/2019 | Venable et al. |
| 10,210,737 B2 | 2/2019 | Zhao |
| 10,217,120 B1 | 2/2019 | Shin et al. |
| 10,242,393 B1 | 3/2019 | Kumar et al. |
| 10,262,331 B1 | 4/2019 | Sharma et al. |
| 10,282,720 B1 | 5/2019 | Buibas et al. |
| 10,282,852 B1 | 5/2019 | Buibas et al. |
| 10,318,917 B1 | 6/2019 | Goldstein et al. |
| 10,332,089 B1 | 6/2019 | Asmi et al. |
| 10,354,262 B1 | 7/2019 | Hershey et al. |
| 10,373,322 B1 | 8/2019 | Buibas et al. |
| 10,387,896 B1 | 8/2019 | Hershey et al. |
| 10,438,164 B1 | 10/2019 | Xiong et al. |
| 10,438,277 B1 | 10/2019 | Jiang et al. |
| 10,445,694 B2 * | 10/2019 | Fisher .................. G06T 7/20 |
| 10,474,877 B2 | 11/2019 | Huang et al. |
| 10,474,988 B2 | 11/2019 | Fisher et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,529,137 B1 | 1/2020 | Black et al. |
| 10,535,146 B1 | 1/2020 | Buibas et al. |
| 10,650,545 B2 | 5/2020 | Fisher et al. |
| 10,776,926 B2 | 9/2020 | Shrivastava |
| 10,805,556 B1 | 10/2020 | Sorgi et al. |
| 10,810,539 B1 | 10/2020 | Mohanty et al. |
| 10,853,942 B1 | 12/2020 | Boyd et al. |
| 10,853,965 B2 | 12/2020 | Fisher et al. |
| 11,030,442 B1 | 6/2021 | Bergamo et al. |
| 11,132,810 B2 | 9/2021 | Kume et al. |
| 11,303,853 B2 | 4/2022 | Kallakuri et al. |
| 11,361,468 B2 | 6/2022 | Kallakuri et al. |
| 11,818,508 B2 | 11/2023 | Kallakuri et al. |
| 2001/0049690 A1 | 12/2001 | McConnell et al. |
| 2003/0078849 A1 | 4/2003 | Snyder |
| 2003/0107649 A1 | 6/2003 | Flickner et al. |
| 2003/0154141 A1 | 8/2003 | Capazario et al. |
| 2004/0099736 A1 | 5/2004 | Neumark |
| 2004/0131254 A1 | 7/2004 | Liang et al. |
| 2005/0177446 A1 | 8/2005 | Hoblit |
| 2005/0201612 A1 | 9/2005 | Park et al. |
| 2006/0132491 A1 | 6/2006 | Riach et al. |
| 2006/0195370 A1 | 8/2006 | Howarth |
| 2006/0279630 A1 | 12/2006 | Aggarwal et al. |
| 2007/0021863 A1 | 1/2007 | Mountz et al. |
| 2007/0021864 A1 | 1/2007 | Mountz et al. |
| 2007/0182718 A1 | 8/2007 | Schoener et al. |
| 2007/0282665 A1 | 12/2007 | Buehler et al. |
| 2008/0001918 A1 | 1/2008 | Hsu et al. |
| 2008/0159634 A1 | 7/2008 | Sharma et al. |
| 2008/0170776 A1 | 7/2008 | Albertson et al. |
| 2008/0181507 A1 | 7/2008 | Gope et al. |
| 2008/0208698 A1 | 8/2008 | Olson et al. |
| 2008/0211915 A1 | 9/2008 | McCubbrey |
| 2008/0243614 A1 | 10/2008 | Tu et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2009/0268028 A1 | 10/2009 | Ikumi et al. |
| 2009/0307226 A1 | 12/2009 | Koster et al. |
| 2010/0021009 A1 | 1/2010 | Yao |
| 2010/0103104 A1 | 4/2010 | Son et al. |
| 2010/0208941 A1 | 8/2010 | Broaddus et al. |
| 2010/0217678 A1 | 8/2010 | Goncalves |
| 2010/0283860 A1 | 11/2010 | Nader |
| 2011/0141011 A1 | 6/2011 | Lashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0317871 A1 | 12/2011 | Tossell et al. |
| 2011/0320322 A1 | 12/2011 | Roslak et al. |
| 2012/0119879 A1 | 5/2012 | Estes et al. |
| 2012/0154604 A1 | 6/2012 | Chen et al. |
| 2012/0159290 A1 | 6/2012 | Pulsipher et al. |
| 2012/0206337 A1 | 8/2012 | Hildreth et al. |
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2013/0011007 A1 | 1/2013 | Muriello et al. |
| 2013/0011049 A1 | 1/2013 | Kimura |
| 2013/0076898 A1 | 3/2013 | Philippe et al. |
| 2013/0103608 A1 | 4/2013 | Scipioni et al. |
| 2013/0156260 A1 | 6/2013 | Craig |
| 2013/0169822 A1 | 7/2013 | Zhu et al. |
| 2013/0182114 A1 | 7/2013 | Zhang et al. |
| 2013/0201339 A1 | 8/2013 | Venkatesh |
| 2013/0325673 A1 | 12/2013 | Abdic et al. |
| 2014/0168477 A1 | 6/2014 | David |
| 2014/0172476 A1 | 6/2014 | Goulart |
| 2014/0188648 A1 | 7/2014 | Argue et al. |
| 2014/0207615 A1 | 7/2014 | Li et al. |
| 2014/0219550 A1 | 8/2014 | Popa et al. |
| 2014/0222501 A1 | 8/2014 | Hirakawa et al. |
| 2014/0282162 A1 | 9/2014 | Fein et al. |
| 2014/0285660 A1 | 9/2014 | Jamtgaard et al. |
| 2014/0289009 A1 | 9/2014 | Campbell |
| 2014/0300736 A1 | 10/2014 | Reitinger et al. |
| 2014/0304123 A1 | 10/2014 | Schwartz |
| 2015/0002675 A1 | 1/2015 | Kundu et al. |
| 2015/0009323 A1 | 1/2015 | Lei |
| 2015/0012396 A1 | 1/2015 | Puerini et al. |
| 2015/0019391 A1 | 1/2015 | Kumar et al. |
| 2015/0026010 A1 | 1/2015 | Ellison |
| 2015/0026646 A1 | 1/2015 | Ahn et al. |

(56) References Cited

U.S. PATENT DOCUMENTS

| | | |
|---|---|---|
| 2015/0029339 A1 | 1/2015 | Kobres et al. |
| 2015/0039458 A1 | 2/2015 | Reid |
| 2015/0049914 A1 | 2/2015 | Alves |
| 2015/0124107 A1 | 5/2015 | Muriello et al. |
| 2015/0193761 A1 | 7/2015 | Svetal |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0341599 A1 | 11/2015 | Carey |
| 2015/0356610 A1 | 12/2015 | Ponoth |
| 2015/0363868 A1 | 12/2015 | Kleinhandler et al. |
| 2015/0379366 A1 | 12/2015 | Nomura et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0127297 A1 | 5/2016 | Irmak et al. |
| 2016/0155011 A1 | 6/2016 | Sulc et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0011260 A1 | 1/2017 | Mihara et al. |
| 2017/0024806 A1 | 1/2017 | High et al. |
| 2017/0032193 A1 | 2/2017 | Yang |
| 2017/0068861 A1 | 3/2017 | Miller et al. |
| 2017/0076454 A1 | 3/2017 | Yano et al. |
| 2017/0104979 A1 | 4/2017 | Shaw et al. |
| 2017/0116473 A1 | 4/2017 | Sashida et al. |
| 2017/0124096 A1 | 5/2017 | Hsi et al. |
| 2017/0148005 A1 | 5/2017 | Murn |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0178226 A1 | 6/2017 | Graham et al. |
| 2017/0193397 A1 | 7/2017 | Kottha et al. |
| 2017/0193434 A1 | 7/2017 | Shah et al. |
| 2017/0205337 A1 | 7/2017 | Akhtman et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0249549 A1 | 8/2017 | Bai |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0108195 A1 | 4/2018 | Bashkin |
| 2018/0150788 A1 | 5/2018 | Vepakomma et al. |
| 2018/0165728 A1 | 6/2018 | McDonald et al. |
| 2018/0165733 A1 | 6/2018 | Kundu et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0293706 A1 | 10/2018 | Viswanathan et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365481 A1 | 12/2018 | Tolbert et al. |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0019309 A1 | 1/2019 | Herrli et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0147709 A1 | 5/2019 | Schoner |
| 2019/0156273 A1* | 5/2019 | Fisher ...................... G06N 3/04 |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1* | 5/2019 | Fisher ...................... G06N 3/08 |
| 2019/0156506 A1 | 5/2019 | Fisher et al. |
| 2019/0158813 A1 | 5/2019 | Rowell et al. |
| 2019/0188876 A1 | 6/2019 | Song et al. |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0311625 A1 | 10/2019 | Anvari |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0019921 A1 | 1/2020 | Buibas et al. |
| 2020/0020113 A1 | 1/2020 | Buibas et al. |
| 2020/0025931 A1 | 1/2020 | Liang et al. |
| 2020/0034988 A1 | 1/2020 | Zhou |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0125824 A1 | 4/2020 | Mabyalaht et al. |
| 2020/0134588 A1 | 4/2020 | Nelms et al. |
| 2020/0151692 A1 | 5/2020 | Gao et al. |
| 2020/0184230 A1 | 6/2020 | Liu et al. |
| 2020/0184442 A1 | 6/2020 | Gu et al. |
| 2020/0184444 A1 | 6/2020 | Gu et al. |
| 2020/0184447 A1 | 6/2020 | Gu et al. |
| 2020/0193507 A1 | 6/2020 | Glaser et al. |
| 2020/0202177 A1 | 6/2020 | Buibas et al. |
| 2020/0234463 A1 | 7/2020 | Fisher et al. |
| 2020/0258241 A1 | 8/2020 | Liu et al. |
| 2020/0293992 A1 | 9/2020 | Bogolea et al. |
| 2020/0302510 A1* | 9/2020 | Chachek ................ G06V 20/52 |
| 2020/0334834 A1 | 10/2020 | Fisher |
| 2020/0334835 A1 | 10/2020 | Buibas et al. |
| 2020/0380701 A1 | 12/2020 | Buibas et al. |
| 2020/0410713 A1 | 12/2020 | Auer et al. |
| 2021/0049772 A1 | 2/2021 | Buibas et al. |
| 2021/0067744 A1 | 3/2021 | Buibas et al. |
| 2021/0125355 A1 | 4/2021 | Mirza et al. |
| 2021/0158430 A1 | 5/2021 | Buibas et al. |
| 2021/0182922 A1 | 6/2021 | Zheng et al. |
| 2021/0191519 A1 | 6/2021 | Zhao et al. |
| 2021/0201253 A1 | 7/2021 | Fisher et al. |
| 2021/0272086 A1 | 9/2021 | Buibas et al. |
| 2021/0279475 A1 | 9/2021 | Tusch et al. |
| 2021/0295081 A1 | 9/2021 | Berry et al. |
| 2021/0374836 A1* | 12/2021 | Bronicki ................ H04N 7/181 |
| 2021/0407131 A1 | 12/2021 | Kallakuri et al. |
| 2022/0083959 A1* | 3/2022 | Skaff ...................... G06V 20/52 |
| 2022/0156827 A1 | 5/2022 | Glaser et al. |
| 2022/0262069 A1 | 8/2022 | Singh et al. |

(56) References Cited

U.S. PATENT DOCUMENTS

| | | | |
|---|---|---|---|
| 2022/0270295 A1 | 8/2022 | Kallakuri et al. | |
| 2022/0391796 A1* | 12/2022 | O'Herlihy | G06V 10/764 |
| 2023/0057340 A1* | 2/2023 | Minisankar | G06V 10/42 |
| 2023/0079018 A1* | 3/2023 | Fisher | G06V 30/224 |
| | | | 382/103 |
| 2023/0162398 A1 | 5/2023 | Varekamp et al. | |

FOREIGN PATENT DOCUMENTS

| | | | |
|---|---|---|---|
| CN | 105701519 A | 6/2016 | |
| CN | 104778690 B | 6/2017 | |
| EP | 1574986 B1 | 7/2008 | |
| EP | 2555162 A1 | 2/2013 | |
| EP | 3002710 A1 | 4/2016 | |
| GB | 2560387 A | 9/2018 | |
| GB | 2566762 A | 3/2019 | |
| JP | H11175730 A | 7/1999 | |
| JP | 2004171240 A | 6/2004 | |
| JP | 2004171241 A | 6/2004 | |
| JP | 2004348618 A | 12/2004 | |
| JP | 2006126926 A | 5/2006 | |
| JP | 2008176504 A | 7/2008 | |
| JP | 2009055139 A | 3/2009 | |
| JP | 2009265922 A | 11/2009 | |
| JP | 2010002997 A | 1/2010 | |
| JP | 2011209966 A | 10/2011 | |
| JP | 2011253344 A | 12/2011 | |
| JP | 2012123667 A | 6/2012 | |
| JP | 2012147083 A | 8/2012 | |
| JP | 2013196199 A | 9/2013 | |
| JP | 2014089626 A | 5/2014 | |
| JP | 2015011649 A | 1/2015 | |
| JP | 2015149559 A | 8/2015 | |
| JP | 2016144049 A | 8/2016 | |
| JP | 2016532932 A | 10/2016 | |
| JP | 2016206782 A | 12/2016 | |
| JP | 2017059945 A | 3/2017 | |
| JP | 2017062776 A | 3/2017 | |
| JP | 2017157216 A | 9/2017 | |
| JP | 2018099317 A | 6/2018 | |
| KR | 1020180032400 A | 3/2018 | |
| KR | 1020190093733 A | 8/2019 | |
| KR | 102223570 B1 | 3/2021 | |
| TW | 201228380 A | 7/2012 | |
| TW | 201911119 A | 3/2019 | |
| TW | 202013240 A * | 4/2020 | G06N 3/04 |
| WO | 0021021 A1 | 4/2000 | |
| WO | 0243352 A2 | 5/2002 | |
| WO | 02059836 A3 | 5/2003 | |
| WO | 2008029159 A1 | 3/2008 | |
| WO | 2013041444 A1 | 3/2013 | |
| WO | 2013043590 A1 | 3/2013 | |
| WO | 2013103912 A1 | 7/2013 | |
| WO | 2014133779 A1 | 9/2014 | |
| WO | 2014209724 A1 | 12/2014 | |
| WO | 2015017796 A2 | 2/2015 | |
| WO | 2015133699 A1 | 9/2015 | |
| WO | 2016136144 A1 | 9/2016 | |
| WO | 2016166508 A1 | 10/2016 | |
| WO | 2017015390 A1 | 1/2017 | |
| WO | 2017151241 A2 | 9/2017 | |
| WO | 2017196822 A1 | 11/2017 | |
| WO | 2018013438 A1 | 1/2018 | |
| WO | 2018013439 A1 | 1/2018 | |
| WO | 2018148613 A1 | 8/2018 | |
| WO | 2018162929 A1 | 9/2018 | |
| WO | 2018209156 A1 | 11/2018 | |
| WO | 2018237210 A1 | 12/2018 | |
| WO | 2019032304 A1 | 2/2019 | |
| WO | 2019032305 A2 | 2/2019 | |
| WO | 2019032306 A1 | 2/2019 | |
| WO | 2019032307 A1 | 2/2019 | |
| WO | 2020023795 A1 | 1/2020 | |
| WO | 2020023796 A2 | 1/2020 | |
| WO | 2020023798 A1 | 1/2020 | |
| WO | 2020023799 A1 | 1/2020 | |
| WO | 2020023801 A1 | 1/2020 | |
| WO | 2020023926 A1 | 1/2020 | |
| WO | 2020023930 A1 | 1/2020 | |
| WO | 2020047555 A1 | 3/2020 | |
| WO | 2020214775 A1 | 10/2020 | |
| WO | 2020225562 A1 | 11/2020 | |

OTHER PUBLICATIONS

Black et al.: "Multi view image surveillance and tracking", Motion and Video Computing, 2002. Proceedings. Workshop on Dec. 5-6, 2002, Jan. 1, 2002 (Jan. 1, 2002), pp. 169-174.

Erdem et al. "Automated camera layout to satisfy task-specific and floor plan-specific coverage requirements," Computer Vision and Image Understanding 103, Aug. 1, 2006, 156-169.

Germann et al., "Space-Time Body Pose Estimation in Uncontrolled Environments," 2011 International Conference on BD Imaging, Modeling, Processing, Visualization and Transmission, May 2011, pp. 244-251.

Hofmann et al., Hypergraphs for Joint Multi-view Reconstruction and Multi-object Tracking, 2017, IEEE Conference on Computer Vision and Pattern Recognition, IEEE Computer Society, dated Jun. 23, 2013, pp. 3650-3657, 8 pages.

Iqbal et al., "PoseTrack: Joint Multi-Person Pose Estimation and Tracking," Proceedings of the IEEE Conference on Computer Vision and Pattern Recognition (CVPR), Jul. 26, 2017, 12 pages.

JP Office Action from JP 2020-507521—First Office Action with translation dated Aug. 2, 2022, 9 pages.

JP Office Action from JP 2020-507550—Office Action with translation dated Aug. 16, 2022, 6 pages.

JP Office Action from JP 2020-507669—First Office Action with translation, dated Aug. 2, 2022, 13 pages.

Lee et al., Monitoring Activities from Activities from multiple video streams: Establishing a common coordinate frame, IEEE Transactions on Pattern Analysis and Machine Intelligence, IEEE Computer Society, vol. 22, No. 8, dated Aug. 1, 2000, pp. 758-767, 10 pages.

Cai et al., "An Ego-Vision System for Hand Grasp Analysis", IEEE Transactions on Human-Machine Systems, IEEE, Piscataway, NJ, USA, vol. 47, No. 4, Aug. 1, 2017, pp. 525-535.

Odashima et al., "Object Movement Management System via Integration of Stable Image Changes in Multiple Viewpoints", Journal of the Robotics Society of Japan, 2011, vol. 29, Issue 9, pp. 837-848 (Abstract Translation Only).

Symons, "Data Fusion Methods for Netted Sensors with Limited Communication Bandwidth", QinetiQ Ltd and University College London, 2004.

U.S. Office Action in U.S. Appl. No. 17/358,864 dated Oct. 15, 2021, 6 pages.

Vincze, "Robust tracking of ellipses at frame rate," Pattern Recognition, vol. 34, Issue 2, Feb. 2001, pp. 487-498.

Yusoff et al. "Optimal Camera Placement for 3D Environment," ICSECS 2011: Software Engineering and Computer Systems, Jun. 27-29, 2011, 448-459.

Zhang "A Flexible New Technique for Camera Calibration," IEEE Transactions on Pattern Analysis and Machine Intelligence, vol. 22, No. 11, Nov. 2000, 22 pages.

Baek, "Aging and Soiling Simulators for Improved Banknote Classification and Validation", Graduate School, Yonsei University Department of Electrical and Electronic Engineering, pp. 1-9 Aug. 4, 2018 [retrieved on Sep. 6, 2021]. Retrieved from <URL: http://www.riss.kr/search/detail/DetailView.do?p_mat_type=be54d9b8bc7cdb09&control_no=0fd91aa4dcd3617affe0bdc3ef48d419>.

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.

Cao et al, "Leveraging Convolutional Pose Machines for Fast and Accurate Head Pose Estimation", 2018 IEEE/RSJ International Conference On Intelligent Robots and Systems (IROS), IEEE, Oct.

(56) References Cited

OTHER PUBLICATIONS 1, 2018 (Oct. 1, 2018), pp. 1089-1094, XP033491495, DOI: 10.1109/IROS.2018.8594223 [retrieved on Dec. 27, 2018].
Ceballos, Scikit-Learn Decision Trees Explained, https://towardsdatascience.com/scikit-learn-decision-trees-explained-803f3812290d, Feb. 22, 2019, 13 pages.
DeTone et al, SuperPoint: Self-Supervised Interest Point Detection and Description, Apr. 19, 2018, arXiv:1712.07629v4 [cs.CV] Apr. 19, 2018, 13 pages.
Feng et al., "2D3D-MatchNet: Learning to Match Keypoints Across 2D Image and 3D Point Cloud," 2019 International Conference on Robotics and Automation (ICRA). IEEE, 2019, May 20, 2019, pp. 4790-4796.
Gkioxari et al., "R-CNN's for Pose Estimation and Action Detection", <https://arxiv.org/pdf/1406.5212.pdf>, Jun. 19, 2014.
Grinciunaite et al. "Human Pose Estimation in Space and Time Using 3D CNN," ECCV Workshop on Brave new ideas for motion representations in videos, Oct. 2016, 7 pages.
Harville, "Stereo person tracking with adaptive plan-view templates of height and occupancy statistics," Image and Vision Computing, vol. 22, Issue 2, Feb. 1, 2004, pp. 127-142.
He et al. "Identity mappings in deep residual networks" (published at https://arxiv.org/pdf/1603.05027.pdf), Jul. 25, 2016, 15 pages.
Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.
Insafutdinov, Eldar et al., Deeper Cut: A Deeper, Stronger, and Faster Multi-Person Pose Estimation Model, http://pose.mpi-inf.mpg.de, dated Nov. 30, 2016.
Jayabalan, et al., "Dynamic Action Recognition: A convolutional neural network model for temporally organized joint location data," Cornell University, Computer Science, Dec. 20, 2016, 11 pages.
Khan et al., "Skin detection: A random forest approach", Proceedings of 2010 IEEE 17th International Conference on Image Processing, Sep. 26-29, 2010, pp. 4613-4616.
Li et al., "DeepI2P: Image-to-Point Cloud Registration via Deep Classification", CVPR, Jun. 2021, pp. 15960-15969.
Longuet-Higgens, "A computer algorithm for reconstructing a scene from two projections," Nature 293, Sep. 10, 1981, pp. 133-135.
Redmon et al., "You Only Look Once: Unified, Real-Time Object Detection," University of Washington, Allen Institute tor Aly, Facebook AI Research, May 9, 2016, 10 pages.
Redmon et al., YOLO9000: Better, Faster, Stronger, (available at https://arxiv.org/pdf/1612.08242.pdf), Dec. 25, 2016, 9 pages.
Rossi et al., "Tracking and Counting Moving People," IEEE Int'l Conf. on Image Processing, ICIP-94, Nov. 13-16, 1994, 5 pages.
Sheeney De Moraes, Marcel et al., Deep Convolutional Poses for Human Interaction Recognition Monocular Videos, School of Engineering & Physical Sciences, Heriot-Watt University, dated Dec. 13, 2016.
Toshev et al. "DeepPose: Human Pose Estimation via Deep Neural Networks," IEEE Conf. on Computer Vision and Pattern Recognition, Aug. 2014, 8 pages.
Wei et al., "Convolutional Pose Machine", Proceedings of the IEEE conference on Computer Vision and Pattern Recognition, Jun. 27, 2016, pp. 4724-4732.

* cited by examiner

Operations for Trigger-based Updates to Camograms

SYSTEMS AND METHODS FOR TRIGGER-BASED UPDATES TO CAMOGRAMS FOR AUTONOMOUS CHECKOUT IN A CASHIER-LESS SHOPPING

PRIORITY APPLICATIONS

This application claims the benefit of U.S. Provisional Patent Application No. 63/242,023, filed on 8 Sep. 2021 and U.S. Provisional Patent Application No. 63/295,418, filed on 30 Dec. 2021, both applications are incorporated herein by reference.

BACKGROUND

Field

The technology disclosed relates to systems and methods that track inventory items in an area of real space. More specifically, the technology disclosed relates systems and methods that update maps of inventory locations as inventory items are taken from or placed at the inventory locations in the area of real space.

Description of Related Art

A difficult problem in image processing arises when images of an area of real space are processed to detect inventory items taken by subjects such as shoppers. Technologies been developed to apply image processing to identify and track puts and takes of items in the area of real space. For example, so-called cashier-less shopping systems are being developed to identify inventory items that have been picked up by shoppers, and automatically accumulate shopping lists that can be used to bill the shoppers. The inventory items are placed in inventory display structures the area of real space. Some inventory items may not be clearly visible in the images captured by the sensors due to occlusions or due to low light conditions. Reliable operations of the cashier-less store require robust classification of inventory items. The inventory items may be placed in different orientations or may fall over in the inventory display structures. Additionally, some products may include various inventory items with similar appearances but minor variations to reflect different sizes, flavors, etc. Furthermore, an inventory item may be slightly moved or rotated, yet remain in the same inventory location. This can cause image processing systems to unnecessarily update the map of the inventory locations and/or provide incorrect classification of items.

It is desirable to provide systems and methods that solve technological challenges involved in effectively and automatically identifying inventory items and inventory events including puts and takes of inventory items in large spaces, while only updating the map of the inventory locations when inventory items are actually moved out of their locations.

SUMMARY

A system, and method for operating a system, are provided for tracking inventory items in an area of real space. The method includes receiving signals that are generated in dependence on sensors. The signals can indicate a change to a portion of an image of an area of real space. The method includes, in response to receiving the signal, implementing a trained location detection model to determine, based on inputs, whether an inventory item identified in the portion of the image has changed a position within a same location in the area of real space. The method includes implementing a trained item classification model to determine a classification of the inventory item. The method includes updating an inventory database with inventory item data determined in dependence on the determined classification of the inventory item to provide an updated map of the area of real space as a result of the received signal indicating the change to the portion of the image.

The trained location detection model can determine whether the inventory item is a shifted inventory item that has been shifted within the same location to determine whether the inventory item has changed the position within the same location.

The method further includes, responsive to the determination that the inventory item is the shifted inventory item, determining that the inventory item does not need to be re-categorized.

The trained location detection model can determine whether the inventory item is a rotated inventory item that has been rotated within the same location to determine whether the inventory item has changed the position within the same location.

The method further includes, responsive to the determination that the inventory item is the rotated inventory item, determining that the inventory item does not need to be re-categorized.

The portion of the image includes a location of a cell in a map of the area of real space and the inventory item is located in the location of the cell in the map.

The trained location detection model determines that the inventory item has changed the position within the same location when the inventory item has changed the position while remaining within the location of the cell in the map.

The method further includes in response to the trained location detection model determining that the inventory item has not changed the position within the same location, but has rather changed a location, implementing a trained product category determination model. The trained product category determination model can determine a product category for the inventory item. The implementing of the trained product category determination model is performed prior to the implementing of the trained item classification model.

The implementing of the trained product category determination model includes inputting, to the trained product category determination model, the portion of the image of the area of real space (a) matching a location of a cell in which the inventory item is located in a map of the area of real space and (b) obtained in a current time interval. The implementing of the trained product category determination model includes, determining, by the trained product category determination model, the product category for the inventory item, which is identified in the cell in the map of the area of real space from the portion of the image obtained in the current time interval.

The implementing of the trained location detection model includes, inputting, to the trained location detection model, (i) a portion of a first image of the area of real space (a) matching a location of a cell in which the inventory item is located in a map of the area of real space and (b) obtained in a previous time interval and (ii) a portion of a second image of the area of real space (a) matching the location of the cell and (b) obtained in a current time interval. The implementing of the trained location detection model includes, determining, by the trained location detection model, whether the inventory item identified in the cell has changed the position within the same location in dependence on the location of the inventory item in the first image and the second image.

The implementing of the trained classification model includes, inputting, to the trained item classification model, (i) the portion of the image of the area of real space (a) matching a location of a cell in which the inventory item is located in a map of the area of real space and (b) obtained in a current time interval, (ii) a determined product category of the inventory item, and (iii) a determined size of the inventory item. The implementing of the trained classification model includes, classifying, by the trained item classification model, the inventory item in dependence upon the portion of the image of the area of real space, the determined product category of the inventory item and the determined size of the inventory item.

The method includes, prior to the inputting to the trained item classification model, determining, using a trained item size detection model, a size of the inventory item. The size of the inventory item is identified in the cell in which the inventory item is located in the map of the area of real space from the portion of the image obtained in the current time interval, by processing the portion of the image. The processing of the portion of the image includes warping and cropping the portion of the image and providing the processed portion of the image to the trained item classification model.

The received signal indicating the change is generated by matching at least one factored image of inventory locations in the area of real space captured in a first time interval with at least one factored image of inventory locations in the area of real space captured in a second time interval. The factored images are generated by removing foreground objects occluding inventory items placed in inventory locations.

The received signal indicating the change is generated when a mismatch is detected between the factored images at a location of the inventory item.

The received signal indicating the change is generated by matching a first image captured in a first time interval with a second image captured in a second time interval, such that the signal indicating the change is generated when the first image includes at least a hand, of a subject, without an inventory item and the second image contains the hand, of the subject, holding at least one inventory item.

The method further includes identifying a nearest inventory location from the position of the first hand of the first subject in the second image and using the identified inventory location to determine the cell in the map of the area of real space.

The received signal indicating the change is generated by matching at least a first image of inventory locations in the area of real space captured in a first time interval with at least a second image of inventory locations in the area of real space captured in a second time interval. The first image and the second image are captured by a same sensor, and wherein the received signal indicating the change is generated when a mismatch is detected between the first image and the second image.

The received signal includes a signal indicating the change and generated by matching at least a first image of inventory locations in the area of real space captured in a first time interval with at least a second image of inventory locations in the area of real space captured in a second time interval. The signal indicating the change is generated when a subject and a stocking event is detected in the area of real space.

The method further includes identifying a nearest inventory location from a position of a hand of the subject detected in the area of real space and using the identified nearest inventory location to determine the cell in the map of the area of real space.

The inventory item data includes a stock keeping unit (SKU) of the inventory item, a size of the inventory item, and/or a price of the inventory item.

The inventory item data includes a category of the inventory item, a sub-category of the inventory item, a description of the inventory item, a location in three-dimensions of the inventory item within the area of real space, a weight of the inventory item, a flavor of the inventory item, and/or a shelf-identifier of a shelf on which the inventory item is located.

The trained location detection model can determine that the inventory item has changed a position within the same location in the area of real space when the inventory item has been relocated to another location in the area of real space that is designated as being a proper location for a particular inventory item that is the same as the inventory item Systems and computer program products which can be executed by computer systems implementing the methods presented above are also described herein.

Other aspects and advantages of the present invention can be seen on review of the drawings, the detailed description and the claims, which follow.

BRIEF DESCRIPTION OF THE DRAWINGS

FIGS. 11A, 11B, 11C, 11D, 11E, 11F and 11G present various features of a two camera view tool.

FIGS. 12A, 12B, 12C, 12D, 12E, 12F, 12G and 12H present various features of a camogram annotation tool.

FIGS. 14A, 14B, 14C, 14D, 14E, 14F and 14G present various features for searching for an item using a two camera view tool.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology are described with reference to FIGS. 1-16. The system and processes are described with reference to FIG. 1, an architectural level schematic of a system in accordance with an implementation. Because FIG. 1 is an architectural diagram, certain details are omitted to improve the clarity of the description.

Figure 1:
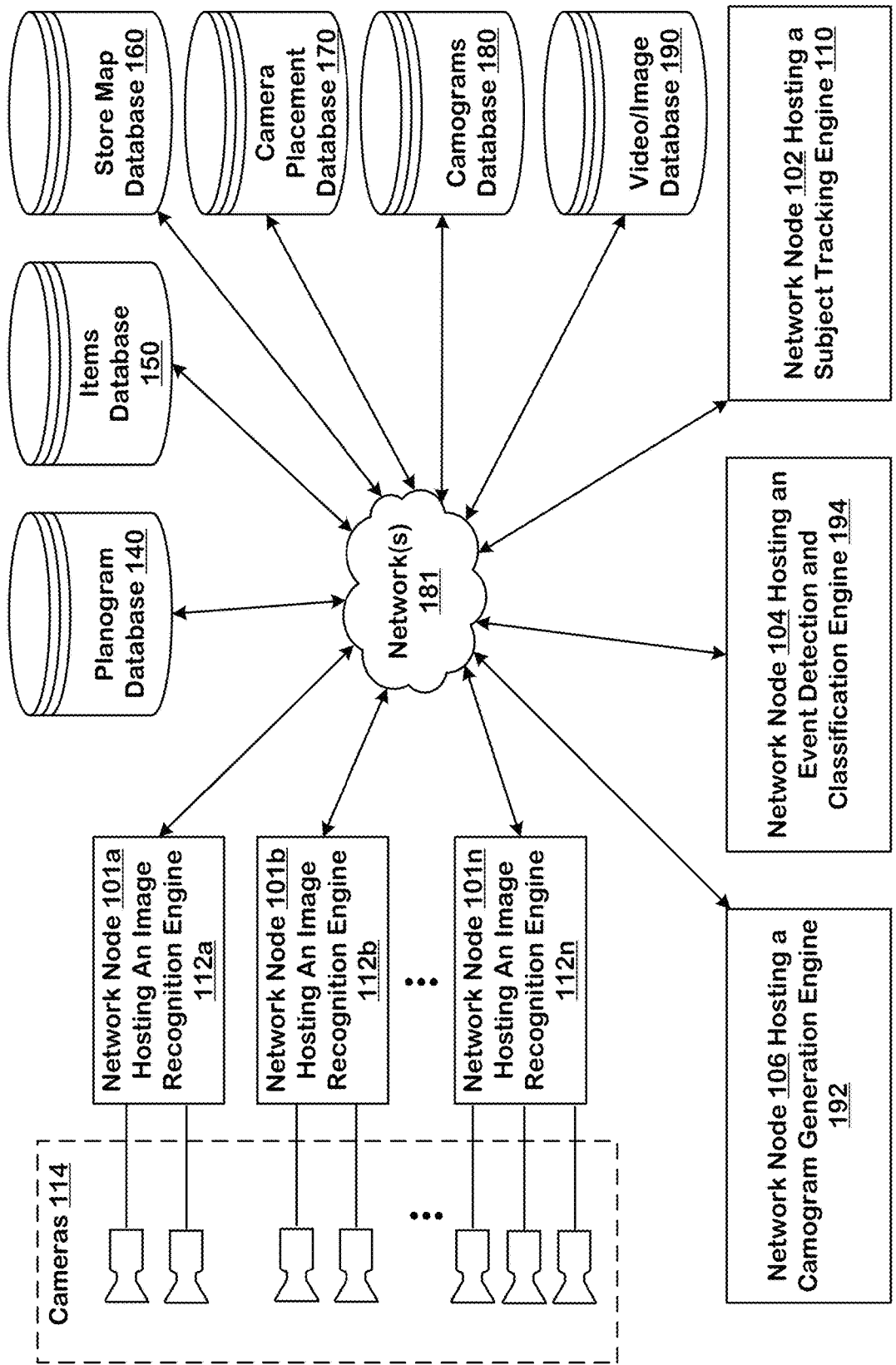
FIG. 1 illustrates an architectural level schematic of a system which can detect changes in placement of inventory items in an area of real space and accordingly update the camograms.

The description of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes 101a, 101b, and 101n hosting image recognition engines 112a, 112b, and 112n, a network node 102 hosting a subject tracking engine 110, a network node 104 hosting an event detection and classification engine 194, and a network node 106 hosting a camogram generation engine 192. The network nodes 101a, 101b, 101n, 102, 104 and/or 106 can include or have access to memory supporting tracking of inventory items and tracking of subjects. The system 100 further includes, in this example, a planogram database 140, an items database 150, a store map database 160, a camera placement database 170, a camograms database 180, a video/image database 190, and a communication network or networks 181. Each of the planogram database 140, the items database 150, the store map database 160, the camera placement database 170, the camograms database 180, and the video/image database 190 can be stored in the memory that is accessible to the network nodes 101a, 101b, 101n, 102, 104 and/or 106. The network nodes 101a, 101b, 101n, 102, 104 and/or 106 can host only one image recognition engine, or several image recognition engines.

The embodiment described here uses cameras 114 in the visible range which can generate for example RGB color output images. In other embodiments, different kinds of sensors are used to produce sequences of images. Examples of such sensors include, ultrasound sensors, thermal sensors, and/or Lidar, etc., which are used to produce sequences of images of corresponding fields of view in the real space. In one embodiment, sensors can be used in addition to the cameras 114. Multiple sensors can be synchronized in time with each other, so that frames are captured by the sensors at the same time, or close in time, and at the same frame capture rate (or different rates). All of the embodiments described herein can include sensors other than or in addition to the cameras 114.

As used herein, a network node (e.g., network nodes 101a, 101b, 101n, 102, 104 and/or 106) is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system and/or a local system. More than one virtual device configured as a network node can be implemented using a single physical device.

The databases 140, 150, 160, 170, 180, and 190 are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 1, the databases 140, 150, 160, 170, 180, and 190 can be considered to be a single database. The system can include other databases such as a subject database storing data related to subjects in the area of real space, a shopping cart database storing logs of items or shopping carts of shoppers in the area of real space, etc.

For the sake of clarity, only three network nodes 101a, 101b and 101n hosting image recognition engines 112a, 112b, and 112n are shown in the system 100. However, any number of network nodes hosting image recognition engines can be connected to the subject tracking engine 110 through the network(s) 181. Similarly, the image recognition engines 112a, 112b, and 112n, the subject tracking engine 110, the event detection and classification engine 194, the camogram generation engine 192 and/or other processing engines described herein can execute various operations using more than one network node in a distributed architecture.

The interconnection of the elements of system 100 will now be described. Network(s) 181 couples the network nodes 101a, 101b, and 101n, respectively, hosting image recognition engines 112a, 112b, and 112n, the network node 102 hosting the subject tracking engine 110, the network node 104 hosting the event detection and classification engine 194, the network node 106 hosting the camogram generation engine 192, the planogram database 140, the items database 150, the store map database 160, the camera placement database 170, the camograms database 180, and the video/image database 190. Cameras 114 are connected to the subject tracking engine 110, the event detection and classification engine 194, and/or the camogram generation engine 192 through network nodes hosting image recognition engines 112a, 112b, and 112n. In one embodiment, the cameras 114 are installed in a shopping store, such that sets of cameras 114 (two or more) with overlapping fields of view are positioned to capture images of an area of real space in the store. Two cameras 114 can be arranged over a first aisle within the store, two cameras 114 can be arranged over a second aisle in the store, and three cameras 114 can be arranged over a third aisle in the store. Cameras 114 can be installed over open spaces, aisles, and near exits and entrances to the shopping store. In such an embodiment, the cameras 114 can be configured with the goal that customers moving in the shopping store are present in the field of view of two or more cameras 114 at any moment in time.

Cameras 114 can be synchronized in time with each other, so that images are captured at the image capture cycles at the same time, or close in time, and at the same image capture rate (or a different capture rate). The cameras 114 can send respective continuous streams of images at a predetermined rate to network nodes 101a, 101b, and 101n hosting image recognition engines 112a-112n. Images captured in all the cameras 114 covering an area of real space at the same time, or close in time, are synchronized in the sense that the synchronized images can be identified in engines 112a, 112b, 112n, 110, 192 and/or 194 as representing different views of subjects having fixed positions in the real space. For example, in one embodiment, the cameras 114 send image frames at the rates of 30 frames per second (fps) to respective network nodes 101a, 101b and 101n hosting image recognition engines 112a-112n. Each frame has a timestamp, identity of the camera (abbreviated as "camera_id"), and a frame identity (abbreviated as "frame_id") along with the image data. As described above other embodiments of the technology disclosed can use different types of sensors such as image sensors, ultrasound sensors, thermal sensors, and/or Lidar, etc. Images can be captured by sensors at frame rates greater than 30 frames per second, such as 40 frames per second, 60 frames per second or even at higher image capturing rates. In one embodiment, the images are captured at a higher frame rate when an inventory event such as a put or a take of an item is detected in the field of view of a camera 114. In such an embodiment, when no inventory event is detected in the field of view of a camera 114, the images are captured at a lower frame rate.

In an embodiment of a subject tracking system described herein, the cameras 114 can be installed overhead and/or at other locations, so that in combination, the fields of view of the cameras encompass an area of real space in which the tracking is to be performed, such as in a shopping store.

In one embodiment, each image recognition engine 112a, 112b, and 112n is implemented as a deep learning algorithm such as a convolutional neural network (abbreviated CNN). In such an embodiment, the CNN is trained using a training database. In an embodiment described herein, image recognition of subjects in the area of real space is based on identifying and grouping features of the subjects such as joints, recognizable in the images, where the groups of joints (e.g., a constellation) can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database, the CNN is switched to production mode to process images of customers in the shopping store in real time.

The technology disclosed is related to tracking inventory items placed on inventory display structures in the area of real space. The technology disclosed can also track subjects in a shopping store and identify actions of subjects including takes and puts of objects such as inventory items on inventory locations such as shelves or other types of inventory display structures. The technology disclosed includes logic to detect what items are positioned on which shelves as this information changes over time. The detection and classification of items is challenging due to subtle variations between items. Additionally, the items are taken and placed on shelves in environments with occlusions that block the view of the cameras. The technology disclosed can reliably detect inventory events and classify the inventory events as takes and puts of items on shelves. To support the reliable detection and classification of inventory events and inventory items related to inventory events, the technology disclosed generates and updates camograms of the area of real space.

Camograms can be considered as maps of items placed on inventory display structures such as shelves, or placed on floor, etc. Camograms can include images of inventory display structures with classification of inventory items positioned on the shelf at their respective locations (e.g., at respective "cells" as described in more detail below). When a shelf is in the field of view of camera, the system 100 can detect which inventory items are positioned on that shelf and where the specific inventory items are positioned on the shelf with a high level of accuracy. The technology disclosed can associate an inventory item taken from the shelf to a subject such as a shopper or associate the inventory item to an employee of the store who is stocking the inventory items.

The technology disclosed can perform detection and classification of inventory items. The detection task in the context of a cashier-less shopping store is to identify whether an item is taken from a shelf by a subject such as a shopper. In some cases, it is also possible to detect whether an item is placed on a shelf by a subject who can be a store employee to record a stocking event. The classification task is to identify what item was taken from the shelf or placed on the shelf. The event detection and classification engine 194 includes logic to detect inventory events (such as puts and takes) in the area of real space and classify inventory items detected in the inventory event. The subject tracking engine 110 includes logic to track subjects in the area of real space by processing images captured by sensors positioned in the area of real space.

Camograms can support the detection and classification tasks by identifying the location on the shelf from where an item has been taken from or placed at. The technology disclosed includes systems and methods to generate, update and utilize camograms for detection and classification of items in a shopping store. The technology disclosed includes logic to use camograms for other tasks in a cashier-less store such as detecting size of an inventory item. Updating the camograms (e.g., the map of the area of real space) takes time and processing power. The technology disclosed implements techniques that eliminate unnecessarily updating the camograms (or portions thereof) when inventor items are shifted, rotated, and/or tilted, yet they remain in essentially the same location (e.g., cell). In other words, the system 100 can skip updating the camograms when the inventory items have moved slightly, but still remain in the same location (or they have moved to another appropriately designated location).

The technology disclosed includes systems and methods to detect changes to portions of camograms and apply updates to only those portions of camograms that have been updated, such as when one or more new items are placed in a shelf or when one or more items have been taken from a shelf. The technology disclosed includes a trigger-based system that can process a signal and/or signals received from sensors in the area of real space to detect changes to a portion or portions of an image of an area of real space (e.g., camograms). The signals can be generated by other processing engines that process the images captured by sensors and output signals indicating a change in a portion of the area of real space. Applying updates to only those portions of camograms in which a change has occurred improves the efficiency of maintaining the camograms and reduces the computational resources required to update camograms over time. In busy shopping stores, the placement of items on shelves can change frequently, therefore a trigger-based system enables real time or near real time updates to camograms. The updated camogram improves operations of an autonomous shopping store by reliably detecting which item was taken by a shopper and also providing a real time inventory status to store management.

The technology disclosed implements a computer vision-based system that includes plurality of sensors or cameras having overlapping fields of view. Some difficulties are encountered when identifying inventory items, as a result of images of inventory items being captured with steep perspectives and partial occlusions. This can make it difficult to correctly detect or determine sizes of items (e.g., an 8 ounce can of beverage of brand "X" or a 12 ounce can of beverage of brand "X") as items of the same type (or product) with different sizes can be placed on shelves with no clear indication of sizes on shelves (e.g., the shelf may not be labelled to distinguish between 8 ounce can and 12 ounce can). Current machine vision-based technology has difficulty determining whether a larger or smaller version of the same type of item is placed on the shelf. One reason for this difficulty is due to different distances of various cameras to the inventory item. The image of an inventory item from one camera can appear larger as compared to the image captured from another camera because of different distances of the cameras to the inventory item and also due to their different perspectives. The technology disclosed includes image processing and machine learning techniques that can detect and determine sizes of items of the same product placed in inventory display structures. This provides an additional input to item classification model further improving the accuracy item classification results. Further details of camograms are presented in the following section.

Camogram

Figure 2:
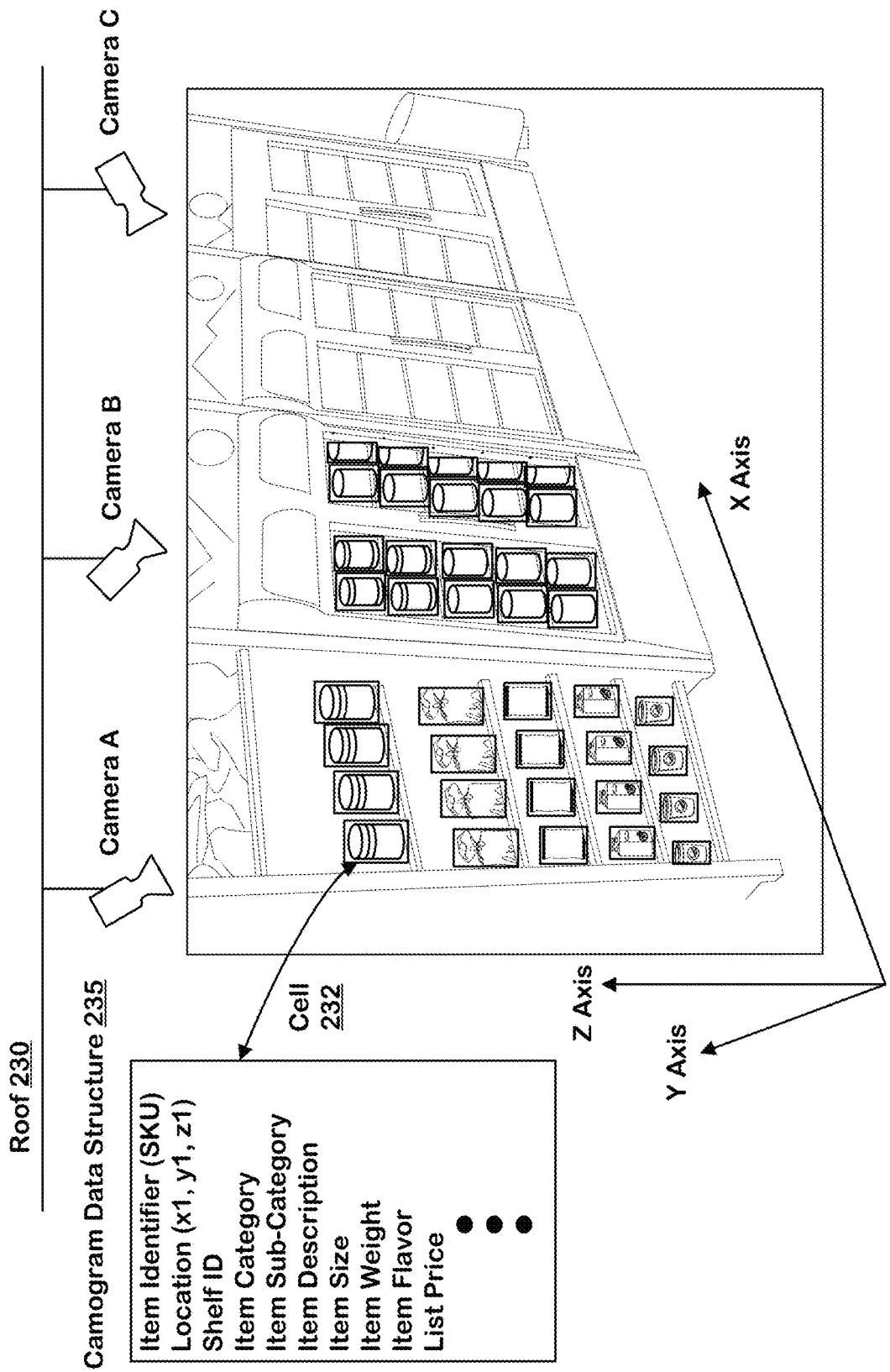
FIG. 2 is an example camogram representing inventory items in an area of real space including example inventory item data.

FIG. 2 presents an example camogram superimposed on the shelves or inventory display structures. The camogram can be considered as a map of inventory items placed in the area of real space. The map includes locations of cells or boxes in the map. The cells or boxes can be arranged in rows and columns. An inventory items is located in the location of a cell in the map. The cell encloses the inventory item. For example, a canned inventory item is located in the location of the cell 232. The cell 232 is shown as enclosing the canned item placed on a top left-most position of the shelf. When a shelf is in the field of view of a camera, the technology disclosed can detect what products are positioned on a shelf and where (location in two-dimensions or 3-dimensions) the specific products are positioned on the shelf with a high level of accuracy. The technology disclosed can associate an item taken from the shelf or placed on a shelf to a subject such as a shopper or a store employee, etc.

FIG. 2 shows example inventory display structures in which items are placed on shelves. A plurality of cameras 114 are positioned on the ceiling or roof 230 and oriented to view the shelves and opens spaces in the shopping store. Only three cameras camera A, camera B, and camera C are shown for illustration purposes. The inventory items positioned in the shelf are identified by the machine vision technology and information of the detected items are stored in camogram data structure 235. The data structure 235 can store information related to inventory item positioned in one cell (232) or more than one cells. Some example data stored in the camogram data structure is shown in FIG. 2 including item identifier (such as a SKU), location of the item in the area of real space (x1, y1, z1), shelf identifier (shelf ID), item category, item sub-category, item description, item size (such as small, medium, large, etc.), weight of item (such as in grams, lbs., etc.), item volume (such as in ml, etc.) flavor of item, and/or item price, etc. It is understood that additional data related to inventory items can be stored in the camogram data structure. The camogram data is stored in the camogram database 180. The data in the camogram database can be linked to inventory items data in the items database 150 using a foreign-key relationship such as item's SKU or any other type of item identifier.

In the example of a shopping store, the subjects move in the aisles and in open spaces. The subjects take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, rotating (e.g., lazy susan type) shelves, warehouse shelves, and/or refrigerated shelving units. In some instance such as in the case of refrigerated shelves, the items in the shelves may be partially or completely occluded by a door at certain points of time. In such cases, the subjects open the door to take an item or place an item in the shelf. The inventory items can also be stocked in other types of inventory display structures such as stacking wire baskets, dump bins, etc. The subjects can also put items back on the same shelves from where they were taken or on another shelf. In such cases, the camogram may need to be updated to reflect a different item now positioned in a cell which previously referred to another item.

Figure 3:
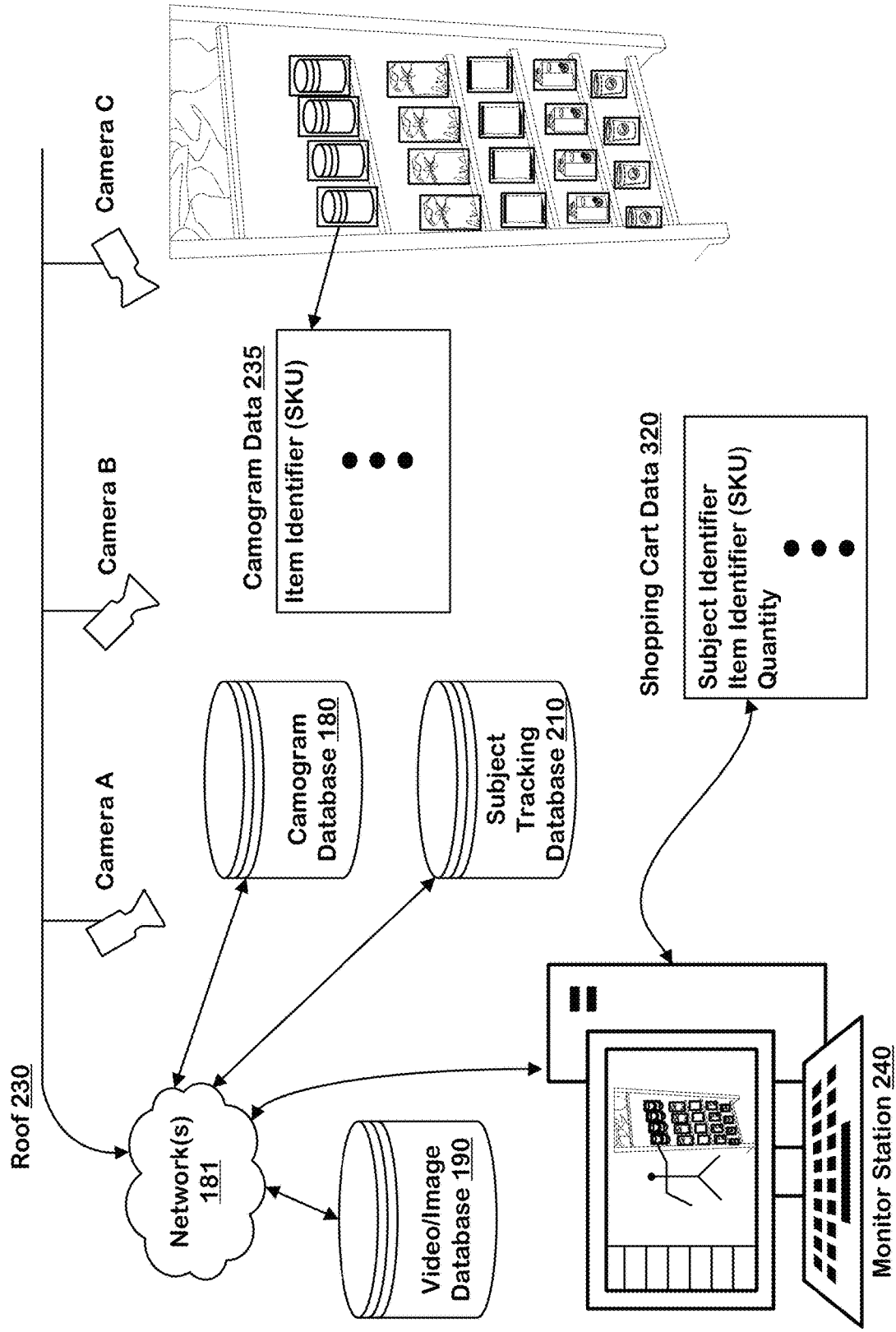
FIG. 3 is a system including image capturing sensors for tracking inventory items in an area of real space.

FIG. 3 shows selected components of a system that can be used to generate or update a camogram. The system shown in FIG. 3 includes multiple cameras 114 positioned over an area of real space. Only three cameras, camera A, camera B, and camera C are shown for illustration purposes. The cameras (e.g., A, B and C) can be installed at the ceiling or roof 230 and oriented to have shelves and open areas of the real space such as the shopping store in their respective fields of view. The cameras can be connected to a cloud-based storage database system or on-premises database system to store data in the video/image database 190. The system can include a plurality of monitoring systems or monitoring stations 240. The system includes "camera selection" logic that can select cameras to provide a view of the subject moving in the shopping store and taking items from the shelves or placing items on the shelves. The camera selection logic can recommend multiple cameras with a good view of the subject. The monitor can choose one or more cameras to view the subject from the recommended cameras. The monitor can identify takes of items by a subject by using appropriate user interface elements. In one embodiment, the system uses the event detection and classification engine 194 to detect takes of items and puts of items by a subject. The takes and puts of inventory items can be indicated on the user interface on the monitor stations 240 and the monitor can review the takes and puts to confirm or reject one or more detected takes and puts. In another embodiment, the system can use trained machine learning models to process images captured by the cameras to detect takes and puts of items by subjects. Trained machine learning models can then be invoked to detect changes to portions of camograms from where items have been taken or where items have been placed. The technology disclosed can then automatically update camograms (e.g., the camogram database 180) representing portions of shelves where changes have been detected.

When an item is detected to be taken by a subject and classified using the event detection and classification engine 194, the item is added to the subject's shopping cart. An example shopping cart data 320 is shown in FIG. 3. The shopping cart (e.g., the shopping cart data structure 320) of a subject can include a subject identifier, an item identifier (such as SKU), a quantity per item and/or other attributes including a total amount to be charged to subject's account for items in her shopping cart. The shopping cart can include additional information such as discounts applied or other information related to the shopper's visit to the shopping store such as timestamp of when the item was taken by the subject. Information such the camera identifier and frame identifier, which was used to detect and classify the item can be included in the shopping cart or log data structure. The shopping cart data 320 can be stored in a subject database or in a separate shopping cart database that is linked to the subject database using a subject identifier or another unique identifier to track subjects.

Subject Tracking Engine

The subject tracking engine 110, hosted on the network node 102 receives, in this example, continuous streams of arrays of joints data structures for the subjects from image recognition engines 112*a*-112*n* and can retrieve and store information from and to a subject tracking database 210. The subject tracking engine 110 processes the arrays of joints data structures identified from the sequences of images received from the cameras at image capture cycles. It then translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is used to locate subjects in the area of real space during identification intervals. One image in each of the plurality of sequences of images, produced by the cameras, is captured in each image capture cycle.

The subject tracking engine 110 uses logic to determine groups or sets of candidate joints having coordinates in real space as subjects in the real space. For the purposes of analogy, each set of candidate points is like a constellation of candidate joints at each point in time. In one embodiment, these constellations of joints are generated per identification interval as representing a located subject. Subjects are located during an identification interval using the constellation of joints. The constellations of candidate joints can move over time. A time sequence analysis of the output of the subject tracking engine 110 over a period of time, such as over multiple temporally ordered identification intervals (or time intervals), identifies movements of subjects in the area of real space. The system can store the subject data including unique identifiers, joints and their locations in the real space in the subject database.

In an example embodiment, the logic to identify sets of candidate joints (i.e., constellations) as representing a located subject comprises heuristic functions is based on physical relationships amongst joints of subjects in real space. These heuristic functions are used to locate sets of candidate joints as subjects. The sets of candidate joints comprise individual candidate joints that have relationships according to the heuristic parameters with other individual candidate joints and subsets of candidate joints in a given set that has been located, or can be located, as an individual subject.

Located subjects in one identification interval can be matched with located subjects in other identification intervals based on location and timing data that can be retrieved from and stored in the subject tracking database 210. An identification interval can include one image for a given timestamp or it can include a plurality of images from a time interval. Located subjects matched this way are referred to herein as tracked subjects, and their location can be tracked in the system as they move about the area of real space across identification intervals. In the system, a list of tracked subjects from each identification interval over some time window can be maintained, including for example by assigning a unique tracking identifier to members of a list of located subjects for each identification interval, or otherwise. Located subjects in a current identification interval are processed to determine whether they correspond to tracked subjects from one or more previous identification intervals. If they are matched, then the location of the tracked subject is updated to the location of the current identification interval. Located subjects not matched with tracked subjects from previous intervals are further processed to determine whether they represent newly arrived subjects, or subjects that had been tracked before, but have been missing from an earlier identification interval.

Tracking all subjects in the area of real space is important for operations in a cashier-less store. For example, if one or more subjects in the area of real space are missed and not tracked by the subject tracking engine 110, it can lead to incorrect logging of items taken by the subject causing errors in generation of an item log (e.g., shopping cart data 320) for this subject. The technology disclosed can implement a subject persistence engine (not illustrated) to find any missing subjects in the area of real space.

In one embodiment, the image analysis is anonymous, i.e., a unique tracking identifier assigned to a subject created through joints analysis does not identify personal identification details (such as names, email addresses, mailing addresses, credit card numbers, bank account numbers, driver's license number, etc.) of any specific subject in the real space. The data stored in the subjects database does not include any personal identification information. Operations of the subject persistence processing engine and the subject tracking engine 110 do not use any personal identification including biometric information associated with the subjects.

In one embodiment, the tracked subjects are identified by linking them to respective "user accounts" containing for example preferred payment method provided by the subject. When linked to a user account, a tracked subject is characterized herein as an identified subject. Track subjects are linked with items picked up on the store, and linked with a user account, for example, and upon exiting the store, an invoice can be generated and delivered to the identified subject, or a financial transaction executed online to charge the identified subject using the payment method associated to their accounts. The identified subjects can be uniquely identified, for example, by unique account identifiers or subject identifiers, etc. In the example of a cashier-less store, as the customer completes shopping by taking items from the shelves, the system processes payment of items bought by the customer.

The system can include other processing engines such as an account matching engine (not illustrated) to process signals received from mobile computing devices carried by the subjects to match the identified subjects with their user accounts. The account matching can be performed by identifying locations of mobile devices executing client applications in the area of real space (e.g., the shopping store) and matching locations of mobile devices with locations of subjects, without use of personal identifying biometric information from the images.

The actual communication path to the network node 106 hosting the camogram generation engine 192, the network node 104 hosting the event detection and classification engine 194 and the network node 102 hosting the subject tracking engine 110, through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, and/or Internet, inclusive of the mobile Internet, via protocols such as EDGE, 3G, 4G LTE, Wi-Fi, and/or WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ and/or PostgreSQL™ compatible relational database implementation and/or a Microsoft SQL Server™ compatible relational database implementation an/or a NoSQL™ non-relational database implementation such as a Vampire™ compatible non-relational database implementation, an Apache Cassandra™ compatible non-relational database implementation, a BigTable™ compatible non-relational database implementation and/or an HBase™ and/or DynamoDB™ compatible non-relational database implementation. In addition, the technology disclosed can be implemented using different programming models like MapReduce™, bulk synchronous programming, MPI primitives, etc. and/or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and/or Yahoo! S4™

Camera Arrangement

The cameras 114 are arranged to track subjects (or entities) in a three dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 4A:
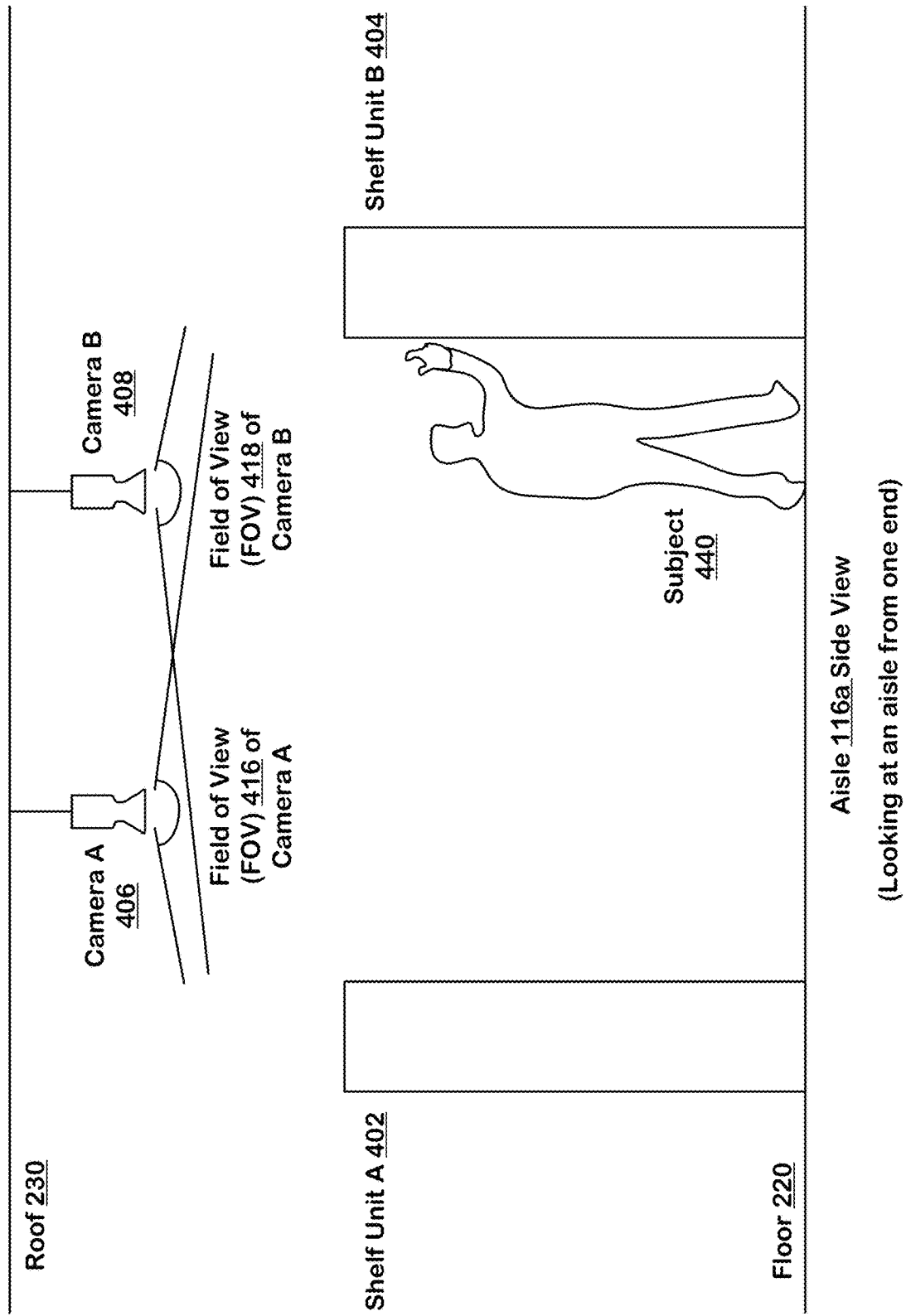
FIG. 4A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 4A shows an arrangement of shelf unit A 402 and shelf unit B 404, forming an aisle 116a, viewed from one end of the aisle 116a. Two cameras, camera A 406 and camera B 408 are positioned over the aisle 116a at a predetermined distance from a ceiling or roof 230 and a floor 220 of the shopping store above the inventory display structures, such as shelf units A 402 and shelf unit B 404. The cameras 114 comprise cameras disposed over and having fields of view encompassing respective parts of the inventory display structures and floor area in the real space. For example, the field of view 416 of camera A 406 and field of view 418 of camera B 408 overlap as shown in FIG. 4A. The locations of subjects are represented by their positions in three dimensions of the area of real space. In one embodiment, the subjects are represented as constellation of joints in real space. In this embodiment, the positions of the joints in the constellation of joint are used to determine the location of a subject in the area of real space. The cameras 114 can be any of Pan-Tilt-Zoom cameras, 360-degree cameras, and/or combinations thereof that can be installed in the real space.

In the example embodiment of the shopping store, the real space can include the entire floor 220 in the shopping store. Cameras 114 are placed and oriented such that areas of the floor 220 and shelves can be seen by at least two cameras. The cameras 114 also cover floor space in front of the shelve unit A 402 and shelve unit B 404. Camera angles are selected to have both steep perspective, straight down, and angled perspectives that give more full body images of the customers (subjects). In one example embodiment, the cameras 114 are configured at an eight (8) foot height or higher throughout the shopping store. In one embodiment, the area of real space includes one or more designated unmonitored locations such as restrooms.

Entrances and exits for the area of real space, which act as sources and sinks of subjects in the subject tracking engine 110, are stored in the store map database 160. Also, designated unmonitored locations are not in the field of view of cameras 114, which can represent areas in which tracked subjects may enter, but must return into the area being tracked after some time, such as a restroom. The locations of the designated unmonitored locations are stored in the store map database 160. The locations can include the positions in the real space defining a boundary of the designated unmonitored location and can also include location of one or more entrances or exits to the designated unmonitored location.

Three Dimensional Scene Generation

Figure 4B:
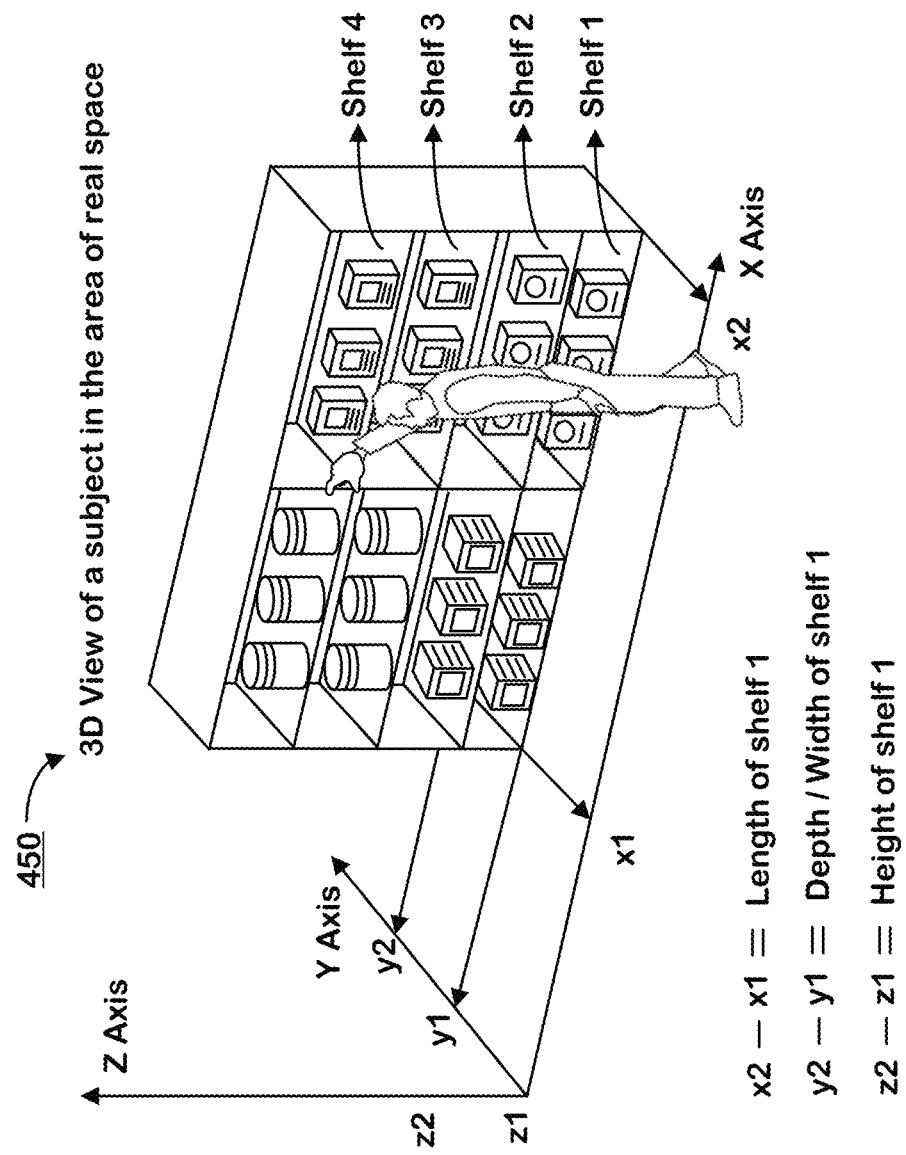
FIG. 4B is a perspective view, illustrating a subject taking an item from a shelf in the inventory display structure in the area of real space.

In FIG. 4A, a subject 440 is standing by an inventory display structure shelf unit B 404, with one hand positioned close to a shelf (not visible) in the shelf unit B 404. FIG. 4B is a perspective view of the shelf unit B 404 with four shelves, shelf 1, shelf 2, shelf 3, and shelf 4 positioned at different levels from the floor. The inventory items are stocked on the shelves.

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints in the area of real space. This section presents a description of the process to generate 3D coordinates of joints. The process is also referred to as 3D scene generation.

Before using the system 100 in a training or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one subject (also referred to as a multi-joint subject), such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera 114 has a different view of the same 3D scene, a point correspondence is determined using two pixel locations (one location from each camera with overlapping field of view) that represent the projection of the same point in the 3D scene. Many point correspondences are identified for each 3D scene using the results of the image recognition engines 112a to 112n for the purposes of the external calibration. The image recognition engines 112a to 112n identify the position of a joint as (x, y) coordinates, such as row and column numbers, of pixels in the 2D image space of respective cameras 114. In one embodiment, a joint is one of 19 different types of joints of the subject. As the subject moves through the fields of view of different cameras, the subject tracking engine 110 receives (x, y) coordinates of each of the 19 different types of joints of the subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a subject is used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures) of different image recognition engines 112a to 112n, processing images of cameras 114 with overlapping fields of view. The results of the internal and external camera calibration are stored in a calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space. The technology disclosed can use the external calibration parameters of two cameras with overlapping fields of view to determine a two-dimensional plane on which an inventory item is positioned in the area of real space. An image captured by one of the cameras 114 can then be warped and re-oriented along the determined two-dimensional plane for determining a size of the inventory item. Details of the item size detection process are presented later in this text.

In an embodiment of the technology disclosed, the parameters of the external calibration can be stored in two data structures. The first data structure stores intrinsic parameters. The intrinsic parameters represent a projective transformation from the 3D coordinates into 2D image coordinates. The first data structure contains intrinsic parameters per camera 114 as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
  1: {
    K: [[x, x, x], [x, x, x], [x, x, x]],
    distortion_coefficients: [x, x, x, x, x, x, x, x]
  },
}
```

The camera recalibration method can be applied to 360 degree or high field of view cameras. The radial distortion parameters described above can model the (barrel) distortion of a 360 degree camera. The intrinsic and extrinsic calibration process described here can be applied to the 360 degree cameras. However, the camera model using these intrinsic calibration parameters (data elements of K and distortion coefficients) can be different.

The second data structure stores per pair of cameras 114: a 3×3 fundamental matrix (F), a 3×3 essential matrix (E), a 3×4 projection matrix (P), a 3×3 rotation matrix (R) and a 3×1 translation vector (t). This data is used to convert points in one camera's 114 reference frame to another camera's 114 reference frame. For each pair of cameras 114, eight homography coefficients are also stored to map the plane of the floor 220 from one camera 114 to another. A fundamental matrix is a relationship between two images of the same scene that constrains where the projection of points from the scene can occur in both images. Essential matrix is also a relationship between two images of the same scene with the condition that the cameras 114 are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras 114 with overlapping fields of views. The second data structure is shown below. Similar data is stored for all pairs of cameras 114. As indicated previously, the x's represents numeric floating point numbers.

```
{
  1: {
    2: {
      F: [[x, x, x], [x, x, x], [x, x, x]],
      E: [[x, x, x], [x, x, x], [x, x, x]],
      P: [[x, x, x, x], [x, x, x, x], [x, x, x, x]],
      R: [[x, x, x], [x, x, x], [x, x, x]],
      t: [x, x, x],
      homography_floor_coefficients: [x, x, x, x, x, x, x, x]
    }
  },
  .......
}
```

Two dimensional and Three dimensional Maps

An inventory location, such as a shelf, in a shopping store can be identified by a unique identifier in the store map database 160 (e.g., shelf id). Similarly, a shopping store can also be identified by a unique identifier (e.g., store_id) in the store map database 160. Two dimensional (2D) and three dimensional (3D) maps stored in the store map database 160 can identify inventory locations in the area of real space along the respective coordinates. For example, in a 2D map, the locations in the maps define two dimensional regions on the plane formed perpendicular to the floor 220 i.e., XZ plane as shown in FIG. 4B. The map can define an area for inventory locations where inventory items are positioned. In FIG. 4B, a 2D location of the shelf unit can be represented by four coordinate positions (x1, y1), (x1, y2), (x2, y2), and (x2, y1). These coordinate positions define a 2D region on the floor 220 where the shelf is located. Similar 2D areas are defined for all inventory display structure locations, entrances, exits, and designated unmonitored locations in the shopping store. This information is stored in the store map database 160.

In a 3D map, the locations in the map define three dimensional regions in the 3D real space defined by X, Y, and Z coordinates. The map defines a volume for inventory locations where inventory items are positioned. In FIG. 4B, a 3D view 450 of shelf 1 in the shelf unit shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the store map database 160. The coordinate positions along the three axes can be used to calculate length, depth and height of the inventory locations as shown in FIG. 4B.

In one embodiment, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations, entrances, exits and designated unmonitored locations in the shopping store.

The items in a shopping store are arranged in some embodiments according to a planogram which identifies the inventory locations (such as shelves) on which a particular item is planned to be placed. For example, as shown in FIG. 4B, a left half portion of shelf 3 and shelf 4 are designated for an item (which is stocked in the form of cans).

Joints Data Structure

The technology disclosed tracks subjects in the area of real space using machine learning models combined with heuristics that generate a skeleton of a subject by connecting the joints of a subject. The position of the subject is updated as the subject moves in the area of real space and performs actions such as puts and takes of inventory items. The image recognition engines 112a-112n receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one embodiment, the image recognition engines 112a-112n identify one of the 19 possible joints of a subject at each element of the image, usable to identify subjects in the area who may be moving in the area of real space, standing and looking at an inventory item, or taking and putting inventory items. The possible joints can be grouped in two categories: foot joints and non-foot joints. The 19$^{th}$ type of joint classification is for all non-joint features of the subject (i.e., elements of the image not classified as a joint). In other embodiments, the image recognition engine may be configured to identify the locations of hands specifically. Also, other techniques, such as a user check-in procedure, may be deployed for the purposes of identifying the subjects and linking the subjects with detected locations of their hands as they move throughout the store. However, note that the subjects identified in the area of real space are anonymous. The subject identifiers assigned to the subjects that are identified in the area of real space are not linked to real world identities of the subjects. The technology disclosed does not store any facial images or other facial or biometric features and therefore, the subjects are anonymously tracked in the area of real space. Examples of joint types that can be used to track subjects in the area of real space are presented below:

Foot Joints:
　Ankle joint (left and right)
Non-foot Joints:
　Neck
　Nose
　Eyes (left and right)
　Ears (left and right)
　Shoulders (left and right)
　Elbows (left and right)
　Wrists (left and right)
　Hip (left and right)
　Knees (left and right)
Not a joint An array of joints data structures (e.g., a data structure that stores an array of joint data) for a particular image classifies elements of the particular image by joint type, time of the particular image, and/or the coordinates of the elements in the particular image. The type of joints can include all of the above-mentioned types of joints, as well as any other physiological location on the subject that is identifiable. In one embodiment, the image recognition engines 112a-112n are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure is used to store the information of each joint. The joints data structure identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, in one embodiment, if the value corresponding to the left-ankle joint is highest in the confidence array for that image element, then the value of the joint number is "1".

A confidence number indicates the degree of confidence of the CNN in detecting that joint. If the value of confidence number is high, it means the CNN is confident in its detection. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking using Joints Data Structure

The subject tracking engine 110 is configured to receive arrays of joints data structures generated by the image recognition engines 112a-112n corresponding to images in sequences of images from cameras 114 having overlapping fields of view. The arrays of joints data structures per image are sent by image recognition engines 112a-112n to the subject tracking engine 110 via the network(s) 181. The subject tracking engine 110 translates the coordinates of the elements in the arrays of joints data structures from 2D image space corresponding to images in different sequences into candidate joints having coordinates in the 3D real space. A location in the real space is covered by the field of views of two or more cameras. The subject tracking engine 110 comprises logic to determine sets of candidate joints having coordinates in real space (constellations of joints) as located subjects in the real space. In one embodiment, the subject tracking engine 110 accumulates arrays of joints data structures from the image recognition engines for all the cameras at a given moment in time and stores this information as a dictionary in the subject tracking database 210, to be used for identifying a constellation of candidate joints corresponding to located subjects. The dictionary can be arranged in the form of key-value pairs, where keys are camera ids and values are arrays of joints data structures from the camera. In such an embodiment, this dictionary is used in heuristics-based analysis to determine candidate joints and for assignment of joints to located subjects. In such an embodiment, a high-level input, processing and output of the subject tracking engine 110 is illustrated in table 1 (see below). Details of the logic applied by the subject tracking engine 110 to create subjects by combining candidate joints and track movement of subjects in the area of real space are presented in U.S. patent application Ser. No. 15/847,796, entitled, "Subject Identification and Tracking Using Image Recognition Engine," filed on 19 Dec. 2017, now issued as U.S. Pat. No. 10,055,853, which is fully incorporated into this application by reference.

TABLE 1

Inputs, processing and outputs from subject tracking engine 110 in an example embodiment.

| Inputs | Processing | Output |
| --- | --- | --- |
| Arrays of joints data structures per image and for each joints data structure<br>Unique ID<br>Confidence number<br>Joint number<br>2D (x, y) position in image space | Create joints dictionary<br>Reproject joint positions in the fields of view of cameras with overlapping fields of view to candidate joints | List of located subjects located in the real space at a moment in time corresponding to an identification interval |

Subject Data Structure

The subject tracking engine 110 uses heuristics to connect joints identified by the image recognition engines 112a-112n to locate subjects in the area of real space. In doing so, the subject tracking engine 110, at each identification interval, creates new located subjects for tracking in the area of real space and updates the locations of existing tracked subjects matched to located subjects by updating their respective joint locations. The subject tracking engine 110 can use triangulation techniques to project the locations of joints from 2D image space coordinates (x, y) to 3D real space coordinates (x, y, z). A subject data structure can be used to store an identified subject. The subject data structure stores the subject related data as a key-value dictionary. The key is a "frame_id" and the value is another key-value dictionary where key is the camera_id and value is a list of 18 joints (of the subject) with their locations in the real space. The subject data is stored in a subject database. A subject is assigned a unique identifier that is used to access the subject's data in the subject database.

In one embodiment, the system identifies joints of a subject and creates a skeleton (or constellation) of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the subject identification and image analysis are anonymous, i.e., a unique identifier assigned to a subject created through joints analysis does not identify personal identification information of the subject as described above.

For this embodiment, the joints constellation of a subject, produced by time sequence analysis of the joints data structures, can be used to locate the hand of the subject. For example, the location of a wrist joint alone, or a location based on a projection of a combination of a wrist joint with an elbow joint, can be used to identify the location of hand of a subject.

Trigger-based Updates to Camograms

The technology disclosed provides systems and methods to track inventory items in an area of real space and detect a change e.g., a new item placed in one or more locations in a store. The technology disclosed can then update the camogram reflect the change in the area of real space. This technology disclosed can efficiently update only portions of the camogram corresponding to only the locations in the area of real space where a change is detected without generating an entirely new camogram for the current time interval. Therefore, there is no need to replace the entire camogram from the previous time interval with a newly generated camogram for the current time interval. The technology disclosed includes trained machine learning models to process images of inventory display structures to detect changes in shelves at a current time interval as compared to a previous time interval. The change in the area of real space can occur at a location (such as in an inventory display structure) due to various reasons e.g., an item taken from a shelf, an item placed (or misplaced) at a shelf, an item shifted (or rotated) in a same location without being permanently removed from its original location. For example, a shift (or rotation) of an item in a same location can occur when a customer picks up an item, reviews it and puts it back at the same location with a different orientation. Further, a customer might (i) rotate the inventory item to see different information on the packaging that is not initially available, (ii) slightly shift the location of the inventory item and/or (iii) tilt the inventory item. Each of items (i)-(iii) can involve the customer picking up the item and then placing it back on the shelf with an orientation that is different from the previous orientation, or each of items (i)-(iii) can involve the inventory item essentially remaining in the same designated location (e.g., an item can be rotated, shifted and/or tilted without actually being picked up. Additionally, a customer might pick up an inventory item from a particular designated location that is designated for that item (e.g., location X designated for item Y) and then the customer might place inventory item Y on the shelf at location Z, which is also designated for inventory item Y. Each of these examples should not trigger the update of the camogram because re-categorization and re-classification of the inventory item is not needed, even though there has been a change to at least a portion of the image representing a portion of the area of real space. Other types of changes in placement of inventory items can also occur in a shopping store, for example, a new occlusion or removal of an occlusion that was partially or completely blocking the view of one or more inventory items. The technology disclosed can determine which changes in the area of real space require the camogram to be updated and which changes (e.g., item shifted in a same location) do not require re-categorization and re-classification of the item.

Figure 5A:
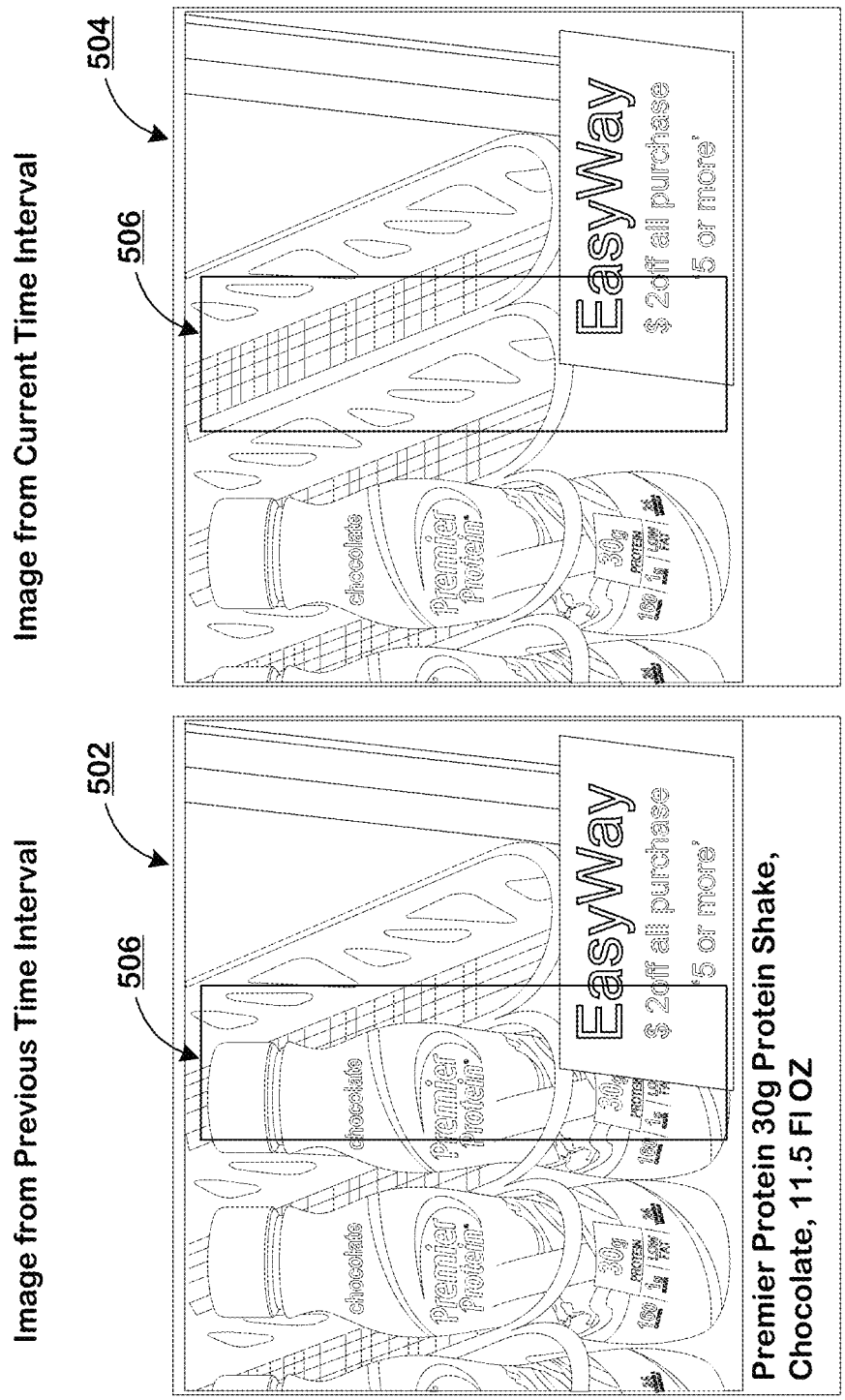
FIG. 5A shows a portion of an image captured in a first time interval and a portion of an image captured in a second time interval, both images capturing a same area of the real space and displaying an empty location from where an inventory item has been taken in the second time interval.

Consider two images in FIG. 5A. The image 502 on the left is a "previous" image of a location of a shelf taken in a previous time interval. The image 504 on the right is a "current" image of the same location of the same shelf captured in a current time interval. The change detection logic implemented by the technology disclosed can detect that this part of the area of real space has changed. The model can then flag part of the camogram corresponding to this location in the area of real space as a candidate for update. The images 502 and 504 are portions of images captured by an image capturing sensor in a previous time interval and a current time interval, respectively. A portion of the image can include a location of a cell in a map of the area of real space. The inventory item is located in the location of the cell in the map of the area of the real space, as described above. The portion of the image can also include locations of a plurality of other adjacent cells in the map of the area of real space. A cell can bound at least one item or a portion of at least one item positioned in an inventory display structure. For example, in image 502, a bottled item is located in a cell 506 as captured in the image 502 by a sensor in a first time interval. The bottle is taken by a subject, such that it is no longer visible in the second time interval. Therefore, the cell 506 in the image 504 as captured in in the second time interval is empty. The technology disclosed can detect the inventory event causing the bottle to be taken from the location of the cell 506 in the map of the area of real space. Detection of the inventory event then triggers the process to update the map of the area of real space (e.g., the camogram) accordingly. The updated map does not include any item located in the cell 506. This update of the map can trigger other processes such as initiating a re-stocking process and updating the inventory management system to re-order item from a supplier, a distributor or a manufacturer, etc.

The example of changes in the area of real space, such as presented above, can cause an image captured of an inventory display structure to change at a current time interval as compared to the image of the same inventory display structure in a previous time interval. The technology disclosed includes machine learning models that can detect such changes and process the changes to classify the change so that a portion of the camogram is updated accordingly. For example, if the change is due to an item taken from a shelf, or a new item placed in a shelf, the system can update the portion of the camogram at the particular location to indicate that the item previously located at that position is no longer there or a new item is now placed at the location. If the change is due to an item having changed a position within a same location, such as being reoriented, shifted, rotated and/or tilted, yet remaining in a same location (e.g., in the same cell 506), the technology disclosed includes logic to determine that the inventory item does not need to be re-categorized and/or re-classified, etc. Furthermore, if the item has been moved from a particular location (e.g., cell 506) to another location (e.g., a different cell) that is still designated for the same inventory item, then the technology disclosed includes logic to determine that the inventory item does not need to be re-categorized and/or re-classified, etc.

Figure 5B:
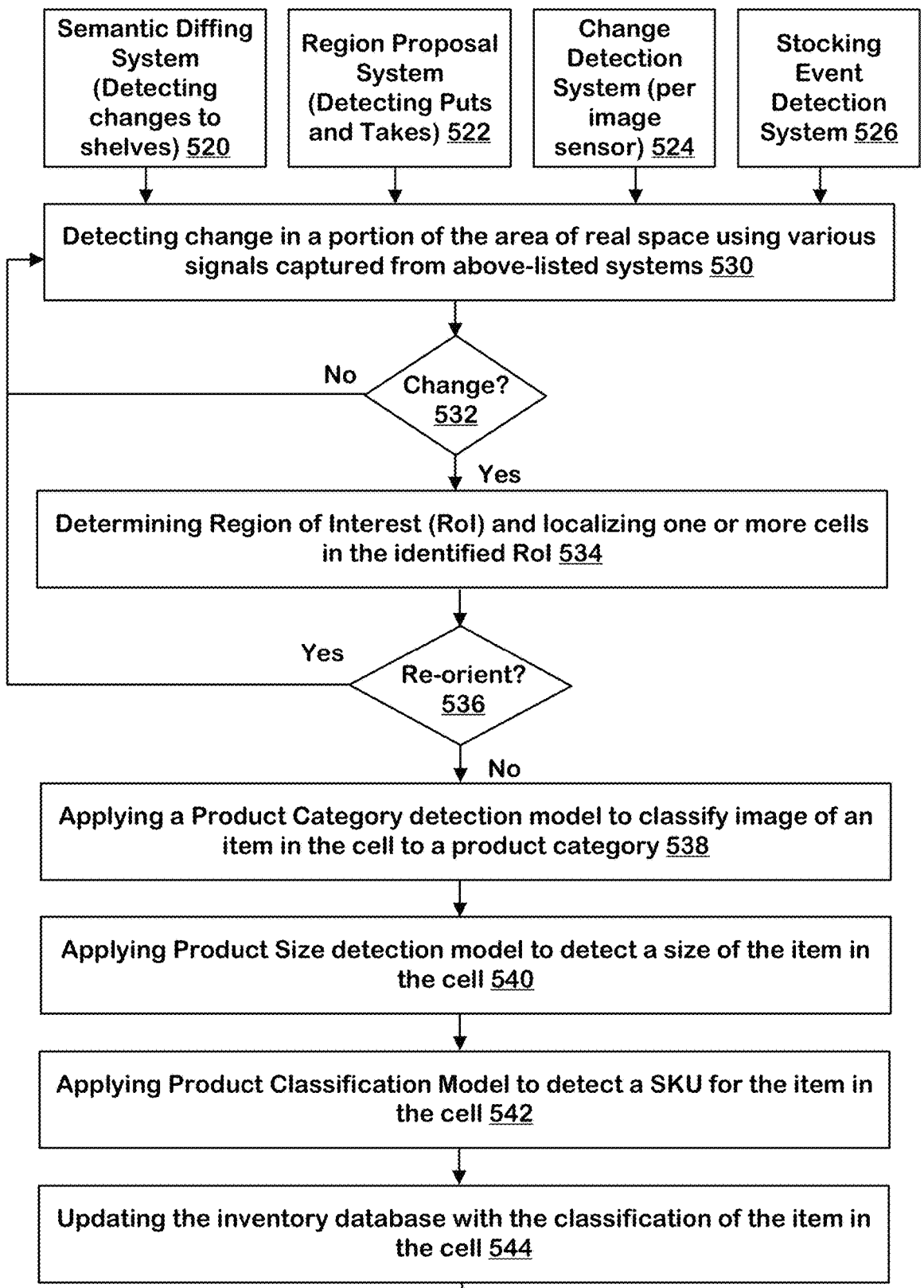
FIG. 5B is a flowchart presenting operations for trigger-based updates to camograms.

The technology disclosed can maintain an up-to-date map of the area of real space such as a shopping store. Every shelf in the shopping store can be covered by multiple camera views, thus keeping track of what item is where in the store. The technology disclosed includes logic to receive a signal or signals from a plurality of image processing systems that process images captured by the sensors. The technology disclosed can then process the received signal or signals to detect a "change" in the area of real space including detecting which parts of the area of real space have changed. A signal can then be generated and/or received that is generated in dependence on the sensors and that indicates that there has been a change to a portion of an image of an area of real space and then only re-classifying and/or re-categorizing the inventory items in those locations. Trained machine learning models can compare images of shelves at two timestamps, i.e., a previous timestamp and a current (or new) timestamp corresponding to the previous and the current time intervals. The image of the shelf is already labeled at the previous timestamp and therefore, placement of items shelves is known for the previous time interval. For an image taken at the new timestamp (or current timestamp), only the changed parts of the shelf get new labels and other item data associated with the location as described above. This item data is then stored in the inventory item database.
Process for Trigger-based Updates to Camograms FIG. 5B presents a process flowchart including operations for performing trigger-based updates to camograms. The logic can be implemented using processors, programmed using computer programs, stored in memory accessible and executable by the processors, and in other configurations, by dedicated logic hardware, including field programmable integrated circuits, and by combinations of dedicated logic hardware and computer programs. With all flowcharts herein, it will be appreciated that many of the operations can be combined, performed in parallel, or performed in a different sequence, without affecting the functions achieved. In some cases, as the reader will appreciate, a rearrangement of operations will achieve the same results only if certain other changes are made as well. In other cases, as the reader will appreciate, a rearrangement of operations will achieve the same results only if certain conditions are satisfied. Furthermore, it will be appreciated that the flow charts herein show only operations that are pertinent to an understanding of the embodiments, and it will be understood that numerous additional steps for accomplishing other functions can be performed before, after and between those shown.

FIG. 5B presents operations to detect changes in parts of an area of real space and update a portion of the camogram corresponding to the area of real space in which changes are detected. The technology disclosed can receive and process signals generated by a variety of image processing systems implemented by the technology disclosed to process images captured by the sensors in the area of real space. Some example systems are shown in the flowchart such as a semantic diffing system 520, a region proposal system 522, a change detection model (per sensor) 524, and a stocking event detection system 526. The process includes receiving signals by these systems. The signals are generated in dependence on sensors and indicate a change to a portion of an image of an area of real space. The details of the four systems that generate signals are presented below.

A "semantic diffing" system 520 detects changes in images of the area of real space particularly the images of the inventory locations. The semantic diffing system 520 can generate a signal indicating a change in the area of real space by matching at least one factored (or unfactored) image of inventory locations in the area of real space captured in a first time interval with at least one factored (or unfactored) image of inventory locations in the area of real space captured in a second time interval. The change can indicate an item taken from the inventory location or an item placed at the inventory location such as an inventory display structure. The signal indicating the change is generated by the semantic diffing system 520 when a mismatch is detected between the factored images at a location of the inventory item. The sematic diffing system 520 can generate the signal by matching at least one factored image of inventory locations in the area of real space captured in a first time interval with at least one factored image of inventory locations in the area of real space captured in a second time interval. The factored images are generated by removing foreground objects such as subjects occluding inventory items placed in inventory locations. The factored image or a portion of the factored image includes a location of a cell in a map of the area of real space and the inventory item is located in the location of the cell in the map. The signal indicating the change is generated when a mismatch is detected at a location of the inventory item matching the location of one or more cells. The semantic diffing system 520 includes background image recognition engines, which receive corresponding sequences of images from the plurality of cameras and recognize semantically significant differences in the background (i.e., inventory display structures such as shelves) as they relate to puts and takes of inventory items, for example, over time in the images from each sensor. The semantic diffing system 520 receives output of the subject tracking engine 110 and image frames from cameras 114 as input. Details of semantic diffing system 520 are presented in U.S. patent application Ser. No. 15/945,466, entitled, "Predicting Inventory Events using Semantic Diffing," filed on 4 Apr. 2018, now issued as U.S. Pat. No. 10,127,438, and U.S. patent application Ser. No. 15/945,473, entitled, "Predicting Inventory Events using Foreground/Background Processing," filed on 4 Apr. 2018, now issued as U.S. Pat. No. 10,474,988, both of which are fully incorporated into this application by reference. The semantic diffing system 520 also includes logic to associate identified background changes i.e., changes in the inventory locations with tracked subjects.

A "region proposal" system 522 detects takes of items and puts of items on inventory locations by processing portions of images of the area of real space that capture hands of subjects. A signal generated by the system 522 indicates a change in the area of real space due to an item taken by a subject or an item placed by a subject on an inventory display structure. The signal indicating the change is generated by matching a first image captured in a first time interval with a second image captured in a second time interval. The signal indicating the change is generated when the first image includes at least a hand of a subject without an inventory item and the second image contains the hand of the subject holding at least one inventory item. A signal indicating a change can also be generated when an item is detected in the hand of a subject in a first time interval and no item is detected in the of the subject in the second time interval. The former signal can indicate an item take event while the latter signal can indicate an item put event. The region proposal system 522 includes logic to identify a nearest inventory location from the position of the hand of the subject in the second image and use the identified inventory location to determine the one or more cells in the map of the area of real space. The determined cells in the map of the area of real space can include locations of inventory items that are taken from the inventory display structure or placed on inventory display structure. The region proposal system 522 includes image recognition engines and receives corresponding sequences of images from the plurality of sensors or cameras 114. The region proposal system 522 includes logic to detect semantically significant objects in the foreground (i.e., shoppers, their hands and inventory items) as they relate to puts and takes of inventory items, for example, over time in the images from each sensor. The region proposal system 522 also receives output of the subject tracking engine. It processes sequences of images from sensors to identify and classify foreground changes represented in the images in the corresponding sequences of images. The detections of inventory events output from the region proposal system 522 are also referred to as foreground detection of puts and takes of inventory items. In the example of a shopping store, these detections identify takes of inventory items and puts of inventory items on inventory display structures by customers and employees of the store. The details of a region proposal system 522 are presented in U.S. patent application Ser. No. 15/907,112, entitled, "Item Put and Take Detection Using Image Recognition," filed on 27 Feb. 2018, now issued as U.S. Pat. No. 10,133,933, which is fully incorporated into this application by reference.

A "change detection" system 524 can generate a signal indicating a change in the area of real space. The signal can be generated by matching at least a first image of inventory locations in the area of real space captured in a first time interval with at least a second image of inventory locations in the area of real space captured in a second time interval. The first image and the second image can be captured by a same sensor. The signal indicating the change is generated when a mismatch is detected at a location of an inventory item matching the location of the cell.

A "stocking event detection" system 526 can generate a signal indicating the change in the area of real space. The signal can be generated by matching at least a first image of inventory locations in the area of real space captured in a first time interval with at least a second image of inventory locations in the area of real space captured in a second time interval. The signal indicating the change is generated when a subject and a stocking event is detected in the area of real space. The stocking event can be detected when a subject is positioned close to an inventory location and one or more boxes are detected positioned close to the subject. Additionally, a location in the store can be designated as a location for which stocking is about to be or going to be performed (e.g., an employee can designate a location as a location for which they are about to begin stocking items). This can indicate that the subject is an employee of the shopping store and re-stocking items on shelves. The inventory display structures in the area of real space can include sensors that can detect a change in a weight of items (individually or collectively) positioned on a shelf. When a sensor detects an increase in the weight of items on a shelf, the sensor can send a signal to the stocking event detection system 526 to initiate the process to update the camogram of the shelf. Further, when a sensor detects a decrease in the weight of items (individually or collectively) on a shelf, the sensor can send a signal to initiate a process of updating the camogram for the shelf and the system can determine whether a take event has occurred. The technology disclosed can also include logic to generate an alert signal when certain inventory items such as tobacco, cigarettes, alcohol etc. are detected in an inventory event as a result of a change in the weight. The alert signal can be transmitted to a store manager or another employee of the store who is designated to check the identity of the subject taking the item for age verification or for any other legal requirements. The store manager can receive this alert on her cell device as a text message or via a store app executing on a mobile computing device, a tablet, a laptop or a desktop computer at which the store manager or another store employee is monitoring the store operations. Moreover, the sensors can detect a change in a weight of particular items that are sold based on their weight. For example, the sensors could detect that 4 pounds of apples were removed from an inventory display structure. Accordingly, the shopper could be charged the appropriate price for taking 4 pounds of apples based on the change in the weight.

The process of trigger-based updates to camograms includes detecting a change in the area of real space by processing one or more signals received from the various systems (e.g., systems 520, 522, 524 and/or 526) processing the images of the area of real space including the example systems described above (operation 530). If a change is detected (operation 532), the process continues at a next operation. This trigger-based updating of the camograms is more efficient than continually updating the entire camograms when there have actually been no changes to the inventory items or locations thereof. The change can indicate a portion of the area of real space has changed. The subsequent operation steps in the process classify the change to determine whether the change is significant enough to require an update to the map of the area of real space.

The process includes determining a region of interest (RoI) in the area of real space where change is detected (operation 534). A region of interest can comprise locations of one or more cells in the map of the area of real space in which the change is detected.

The process includes determining whether the change detected in the area of real space is due to re-orienting of an inventory item within a same location in the area of real space (operation 536) As discussed above, re-orienting can include shifting, rotating, tilting and/or placing the item in another location that is also designated for the particular item. The process can include implementing a trained location detection model (also referred to as a shift detection model) to determine, based on inputs, whether an inventory item identified in the portion of the image has changed a position within a same location in the area of real space. As mentioned above, changing a position within a same location can be described as being re-oriented (e.g., shifting, rotating, tilting and/or placing the item in another location that is also designated for the particular item). The trained location detection model determines whether the inventory item is a re-oriented inventory item that has been re-oriented within the same location The trained location detection model determines that the inventory item has been re-oriented when the inventory item has changed the position while remaining within a same location of a cell in the map or when the inventory item has been relocated to another cell in the map that is designated for the same inventory item.

The implementation of the trained location detection model includes inputting, to the trained location detection model, (i) a portion of a first image of the area of real space (a) matching a location of a cell in which the inventory item is located in a map of the area of real space and (b) obtained in a previous time interval and (ii) a portion of a second image of the area of real space (a) matching the location of the cell and (b) obtained in a current time interval. The trained location detection model determines whether the inventory item identified in the cell has changed the position within the same location in dependence on the location of the inventory item in the first image and the second image. If the model determines that the inventory item has changed the position within the same location (e.g., see FIGS. 5C, 5D and 5E discussed below), then the inventory item does not need to be re-categorized and therefore, the map of the area of real space does not need to be updated.

Note that the various systems (listed above) processing the images of the area of real space perform the comparison of images captured in one or more previous time intervals with images captured in a current time interval. The comparison of images can indicate a change even if an inventory item identified in the portion of the image is re-oriented (e.g., shifted, rotated and/or tilted), because the inventory item remains in the same cell or location or has been placed in a cell or location that has been designated for the same inventory item. For example, a shifted item within the same location means that the item has moved slightly but is still within the same general location (e.g., within the same cell) and is not located in a completely different location (e.g., not located in a different cell than it was before) designated for different inventory item. The shifting of items can occur during re-stocking of shelves or when a subject takes an item from the shelf and puts it back at the same location but with a different orientation. If a signal detecting change in the area of real space is generated due to a re-orientation of (e.g., a shift, a rotation, a tilt and/or a relocation to a location designated for the same inventory item) an inventory item, then process to update the camograms does not continue (operation 536)(e.g., if the item is determined to have been reoriented, which is a yes at operation 536, then the process returns to operation 530). Otherwise, when the inventory items not determined to have been "re-oriented" in operation 536, then the process continues at a next operation 538.

Figure 5C:
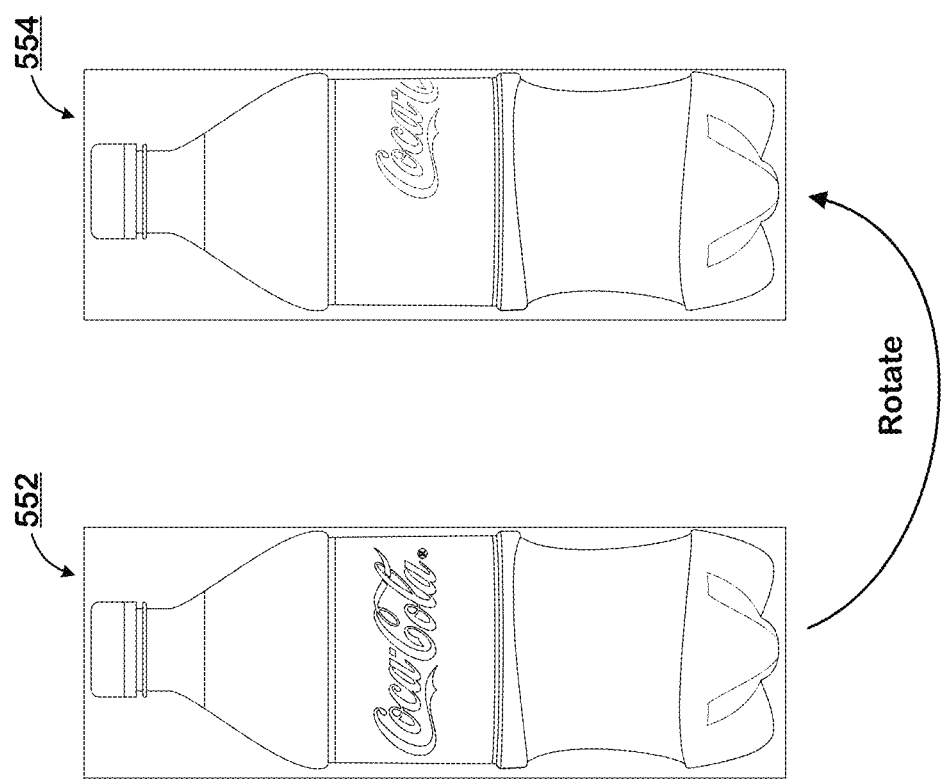
FIGS. 5C, 5D, and 5E present examples of inventory items that have changed their respective positions within a same location in the area of real space.
Figure 5D:
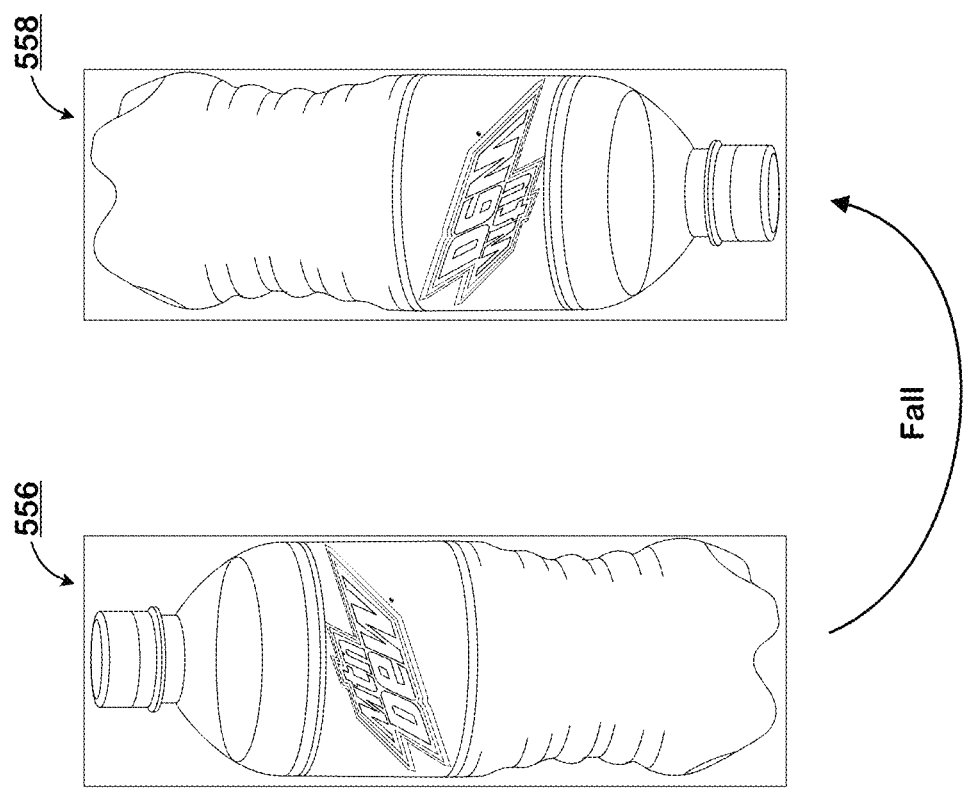

FIGS. 5B, 5C, and 5D present various examples of items that are shifted or rotated in a current time interval as compared to their positions and orientations in a previous time interval. In each of these three figures, the item on the left is captured in an image taken in a previous time interval while the image on the right is the same object captured in a current time interval. The items have been rotated and the label has moved in the images of items at the same location of respective shelves at a current (or new) timestamp.

In FIG. 5C, the bottle of soft drink in the image 554 is rotated in a second time interval as compared to the placement 552 of the bottle in the same location in a first time interval.

In FIG. 5D, the image captured in a second time interval shows that the bottle has fallen over in its slot (558) and is laying on its side and/or upside down. In the first time interval, the image captured shows that the bottle is placed correctly in the same location (556).

Figure 5E:
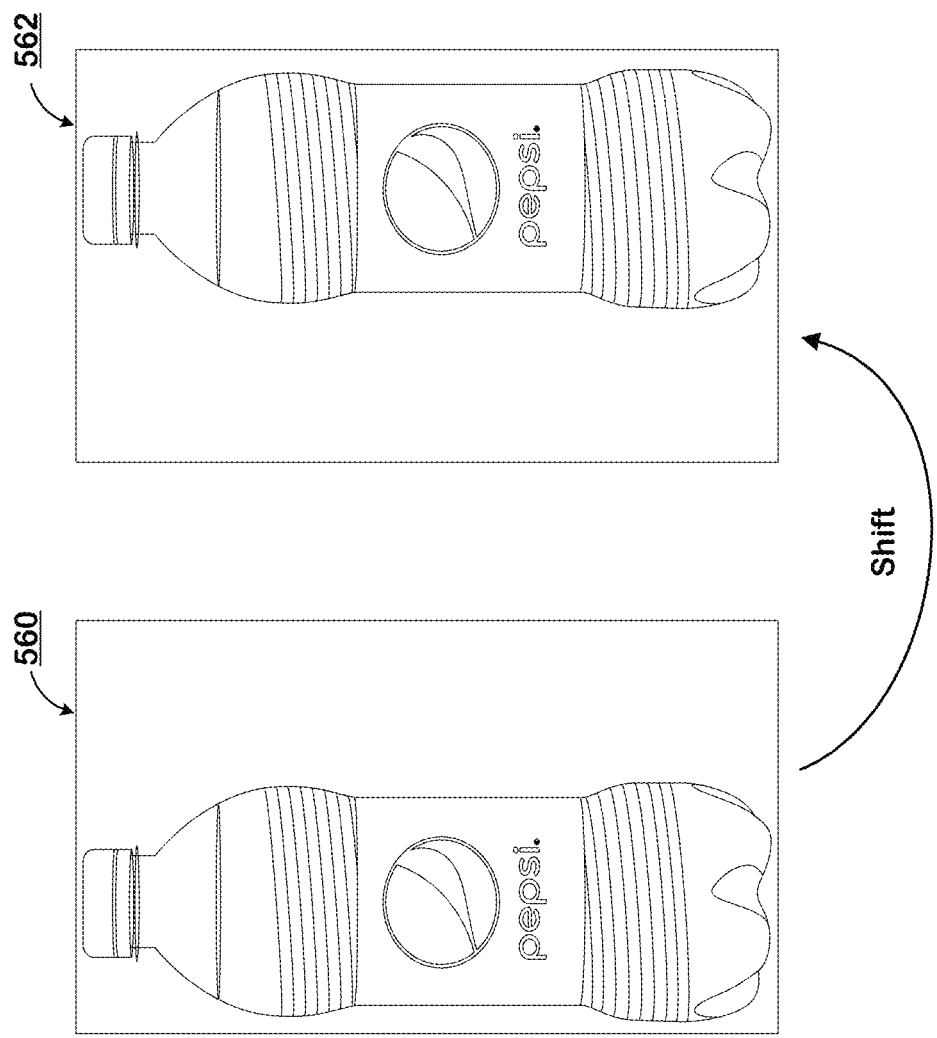

FIG. 5E shows the bottle in an image 562 captured in a second time interval is shifted to the right as compared to the placement of the bottle in the image captured in the first time interval (560). The examples in FIGS. 5C, 5D, and 5E illustrate various ways in which a same item can have a different orientation due to rotation, fall, slight movement within the same location, etc. The technology disclosed includes logic to detect shifting of items and therefore not update the camogram due to these minor movements or re-orientation of items.

Figure 5F:
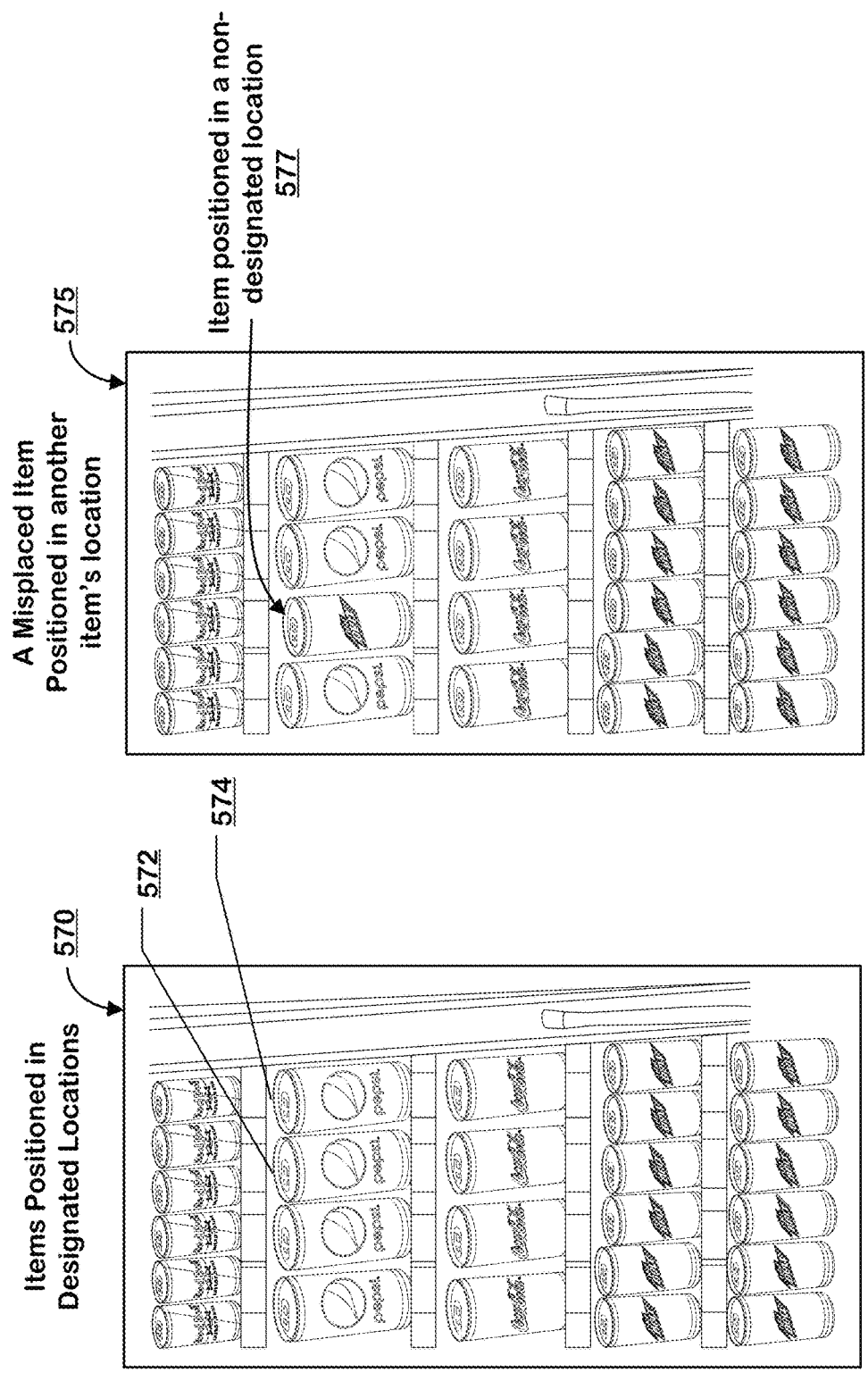
FIG. 5F illustrates two inventory display structures and locations of inventory items.

FIG. 5F presents two inventory display structures 570 and 575.

All inventory items in the inventory display structure 570 are placed in their designated locations per store planogram. Reference elements 572 and 574 represent two locations that are designated for the same inventory item (e.g., a Pepsi™ soda can). If a customer takes the inventory item from location 572 and then places the same inventory item at location 574, which is different from location 572, the technology disclosed can essentially determine that the camogram (e.g., the map of the area of real space) does not need to be updated. In other words, the trained location detection model can determine that even though the item has moved to a different location, there is no need to update the camogram because the inventory item has been located to another location in the area of real space that is designated as being a proper location for particular inventory items that are the same as the inventory item that was moved from location 572. In other words, the trained location detect model can determine that the inventory item has essentially changed a position within the same (or equivalent) location in the area of real space when the inventory item has been relocated to another location in the area of real space that is designated as being a proper location for a particular inventory item that is the same as the inventory item.

FIG. 5F further illustrates that within the inventory display structure 575, one inventory item (e.g., a Mountain Dew™ soda can) has moved from one of the bottom two rows to location 577 in the second row. Location 577 is not a designated location for the one inventory item according to, for example, the store planogram. The technology disclosed detects this relocation of the inventory item to a different location 577 and initiates the process to update the camogram and/or to alert an employee to place the one inventory item back in one of the two bottom rows of the inventory display structure 575.

When it is determined that the change detected in one or more cells of the map of the area of real space is not due to re-orientation as described herein (e.g., shifting of an inventory item in the same location), the next operations (538, 540, 542, and 544) in the overall process classify inventory items in the one or more cells of the map in which the change is detected. The technology disclosed can include a two-step process to classify an inventory item in the cell in which change is detected. The operation in a first step of the two-step process classifies the portion of the image including the location of the cell in the map of the area of real space in which the change is detected to determine a product category for the inventory item located in the location of the cell in the map. The operation in a second step of the two-step process further classifies the item with a unique Stock Keeping Unit (SKU). The two-step process increases the efficiency of the classification process. This is because in the first step a product category is selected from a total number of product categories that are much smaller in number as compared to the total number of SKUs in a shopping store. In the second step, the inventory item is classified from the total number of unique SKUs within one product category which are much smaller in number as compared to the total number of unique SKUs in the shopping store. In an alternative embodiment, the process does not perform the product category detection model to detect a product category for the item. Further, the trained item classification model can be implemented to determine the classification of the inventory item in a one-step process. Details of the operations 538 to 544 are presented below.

At the operation 538, the process includes implementing a trained product category determination model. The implementation of the trained product category determination model includes inputting to the trained category determination model, the portion of the image of the area of real space (a) matching a location of a cell in which the inventory item is located in a map of the area of real space and (b) obtained in a current time interval. The trained product category determination model determines the product category for the inventory item, which is identified in the cell in the map of the area of real space from the portion of the image obtained in the current time interval.

A product category can include tens or more products that are similar or offer same features. Examples of product categories in a grocery store include washing detergent, canned fish, toothpastes, bar soap, canned soft drink etc. In many instances, the products in a product category comprise multiple sizes. The products or items of different sizes can have similar appearance. For example, a 20 ounce can of a particular brand of soft drink can have similar appearance (color, markings, etc.) as a 12 ounce can of the same soft drink. As the sensors take images of items with steep perspective and sometimes in low light conditions, the item classification model may not be able to correctly classify the item. Therefore, the technology disclosed includes an additional operation of detecting the size of the item in the portion of the image prior to classifying the item using the trained item classification model.

At an operation 540, the process includes determining, using a trained item size detection model, a size of the inventory item, which is identified in the cell in which the inventory item is located in the map of the area of real space. The trained item size detection model determines the size of the inventory item from the portion of the image obtained in a current time interval. The processing of the portion of the image includes warping and cropping the portion of the image. After detecting the size of the inventory item, the process continues at a next operation to classify the inventory item.

The detected product category and the size of the inventory item determined by operations performed above can then be provided as input along with the portion of image to a trained classification model to determine a SKU of the item in the portion of the image (operation 542). The operation for classifying the inventory item includes inputting, to the trained item classification model, (i) the portion of the image of the area of real space (a) matching the location of the cell in which the inventory item is located in a map of the area of real space and (b) obtained in the current time interval, (ii) the determined product category of the inventory item, and/or (iii) the determined size of the inventory item. The trained item classification model classifies the inventory item in dependence upon the portion of the image of the area of real space, the determined product category of the inventory item and the determined size of the inventory item. The classification of the inventory item by the classification model in the two step process has an increased likelihood of being correct because the classification model can be trained for classifying items belonging to a particular product category. The targeted trained item classification model produces better results than a classification model that is trained for classifying all items in a shopping store.

The process includes updating the (inventory items) database 150 with inventory item data determined in dependence on the determined classification of the inventory item to provide an updated map of the area of real space as a result of the received signal indicating a change to the portion of the image (operation 544). The inventory item data can include at least one of a stock keeping unit (SKU) of the inventory item, the size of the inventory item and/or a price of the inventory item. The inventory item data stored in the inventory item database 150 can also include at least one of a product category of the inventory item, a product sub-category of the inventory item, a description of the inventory item, a location in three-dimensions of the inventory item within the area of real space, a weight of the inventory item, a flavor of the inventory item and/or a shelf-identifier on which the inventory item is positioned. The inventory item data is linked camogram data related to the cell in the map of the area of real space. The location of the inventory item matches the location of that cell in the map. The camogram data is stored in the camogram database 180 and linked to the inventory item data via a foreign-key relationship. The foreign key connecting the cell in the map to the item data can include a combination of a unique identifier of the cell and the SKU of the item. Therefore, using the cell identifier, inventory item data can be accessed and using an SKU, the one or more cells in the map can be determined at which an inventory item is placed.

The following sections present further details of change detection and size detection methods including the models that are implemented to detect changes and determine sizes of items in the area of real space.

Camogram Change Detection Model

The technology disclosed implements a trained "change detection" model during inference (or production) for detecting changes to an area of real space. The "change detection" model can be a two-class model that can be trained for determining changes to inventory items on inventory display structures such as shelves. The model can process images of shelves to detect "no change" if the item in the image has not been moved or shifted to another location since the last time interval or a previous time interval in which the model processed the image of the same portion of the area of real space. In other words, the model compares the image of that particular part of the shelf in a current time interval (or with a current timestamp) with the image of the same part of the shelf in a previous time interval (or with a previous timestamp). The model detects a "change" if there is an item with a new SKU placed in that area, or the item with the same SKU as in the previous image has changed positions or orientation at the same location, or there is a new occlusion, and the model can no longer be confident in the classification decision. Two cropped images of the same (or similar) coordinates of the area of real space are input to the change detection model from two different time intervals (or timestamps) i.e., a previous time interval and a new or a current time interval. The model outputs one of a binary class (such as "change" or "no change") indicating whether a change is detected in the input image from current time interval with respect to image of the same area of real space from a previous time interval. Further details of the change detection process are presented below.

Process for Camograms Change Detection

Figure 6:
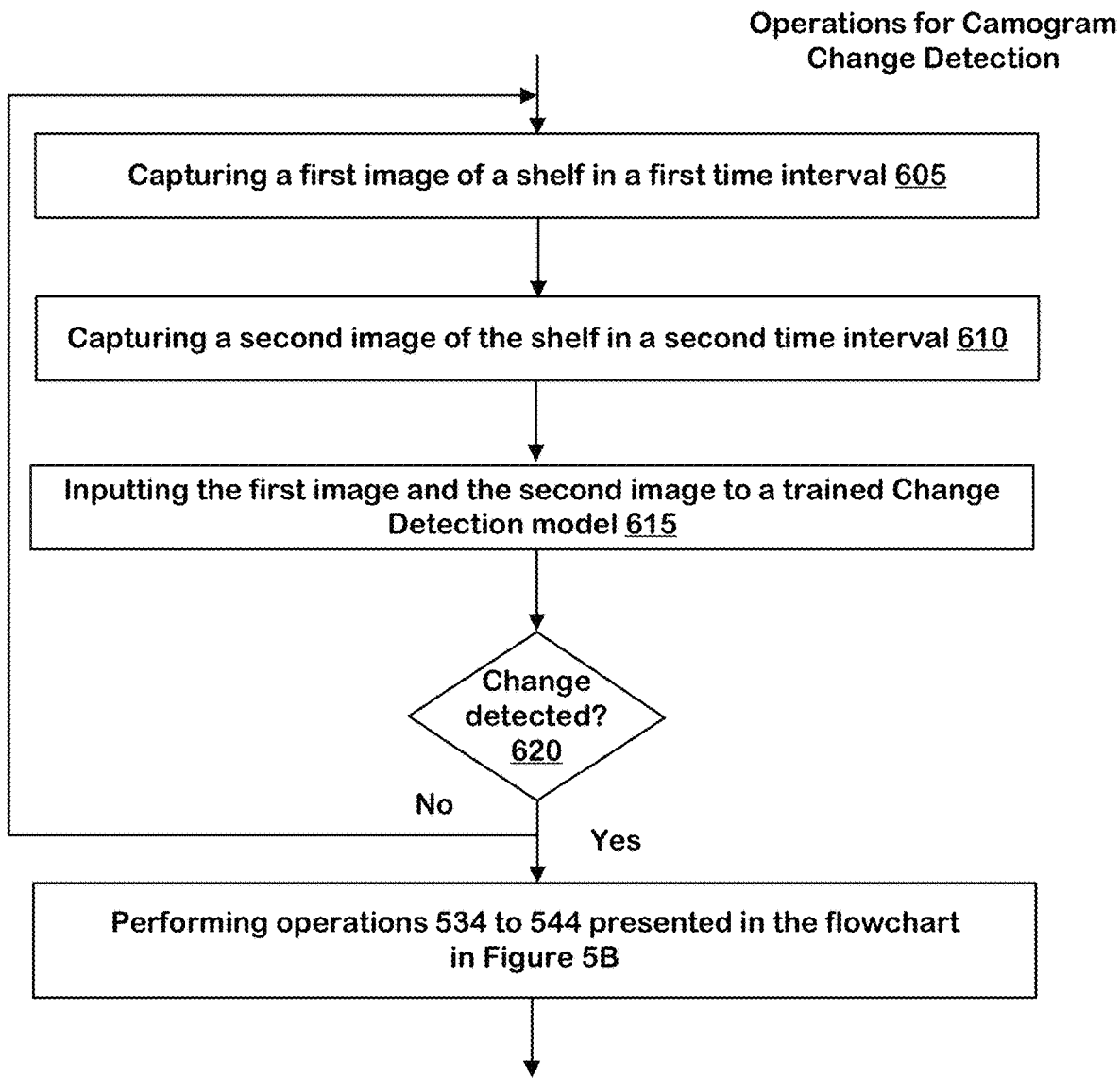
FIG. 6 is a flowchart presenting operations for detecting changes to area of real space for updating the camograms.

FIG. 6 presents a process flowchart including operations for detecting changes to area of real space by processing images captured from a same sensor in different time intervals. The flowchart presents operations for detecting change to an area of a real space and classifying the change to update the camogram. The sensors in the area of real space capture images at regular time intervals. In one embodiment, the sensors capture images at a rate of 30 frames per second (fps). In this embodiment, the time interval can be set at ⅓₀ of a second. A longer time interval can also be set in which case multiple image frames will be captured in one time interval. One image from a time interval can be used for further processing. In another embodiment, multiple images from a time interval can be combined such as by calculating average pixel values to create a frame for detecting changes in the area of real space over a plurality of time intervals. It is understood that images can be captured at rates greater than or less than 30 fps without impacting the change detection process.

The process includes capturing a first image in a first time interval using a sensor positioned in the area of real space (operation 605). The process includes capturing a second image of the same (or similar) area of the real space in a second time interval (operation 610).

The process includes inputting the images captured in the first and the second time intervals to a trained change detection model (operation 615). The trained change detection model can detect a "change" or "no change" by processing the input images with the first and the second timestamps captured from the first and the second time intervals, respectively. If the change detection model detects "no change" (operation 620) then the process continues checking images in subsequent time intervals to detect any change in the area of real space. Otherwise, if the model detects a "change", then the process including performing operations 534 to 544 as presented in the flowchart in FIG. 5B.

Detecting Size of Inventory Items

Distinguishing between different sizes of the same product can be difficult when there is no clear difference between items of the same type but different size. In some cases, items of different sizes of the same product are placed in different locations and therefore it is difficult to compare those side-by-side for determining which item is of what size. The item's distance from the camera and its angle relative to the camera both affect its appearance. For example, in FIG. 7A, a can 702 containing a beverage, as illustrated on the left-hand side, is an 8 oz can, and the can 704 containing the same type of beverage, as illustrated on the right-hand side, is a 12 oz can. However, from these images, the size difference between the two cans is not obvious as the colors and shapes of cans are similar.

It is much easier to make such a comparison between the two cans (or other types of products) if, for each can, the system has an image from a same distance and angle. Although it is not practical to do this physically, the system can approximate such images by warping an original image to the perspective of "virtual" cameras located at a predefined distance and angle from each item. The technology disclosed provides a method for determining sizes of inventory items. The operations to determine the size of an inventory item are presented in a flowchart in FIG. 8.

Process for Detecting Size of Inventory Items

Figure 8:
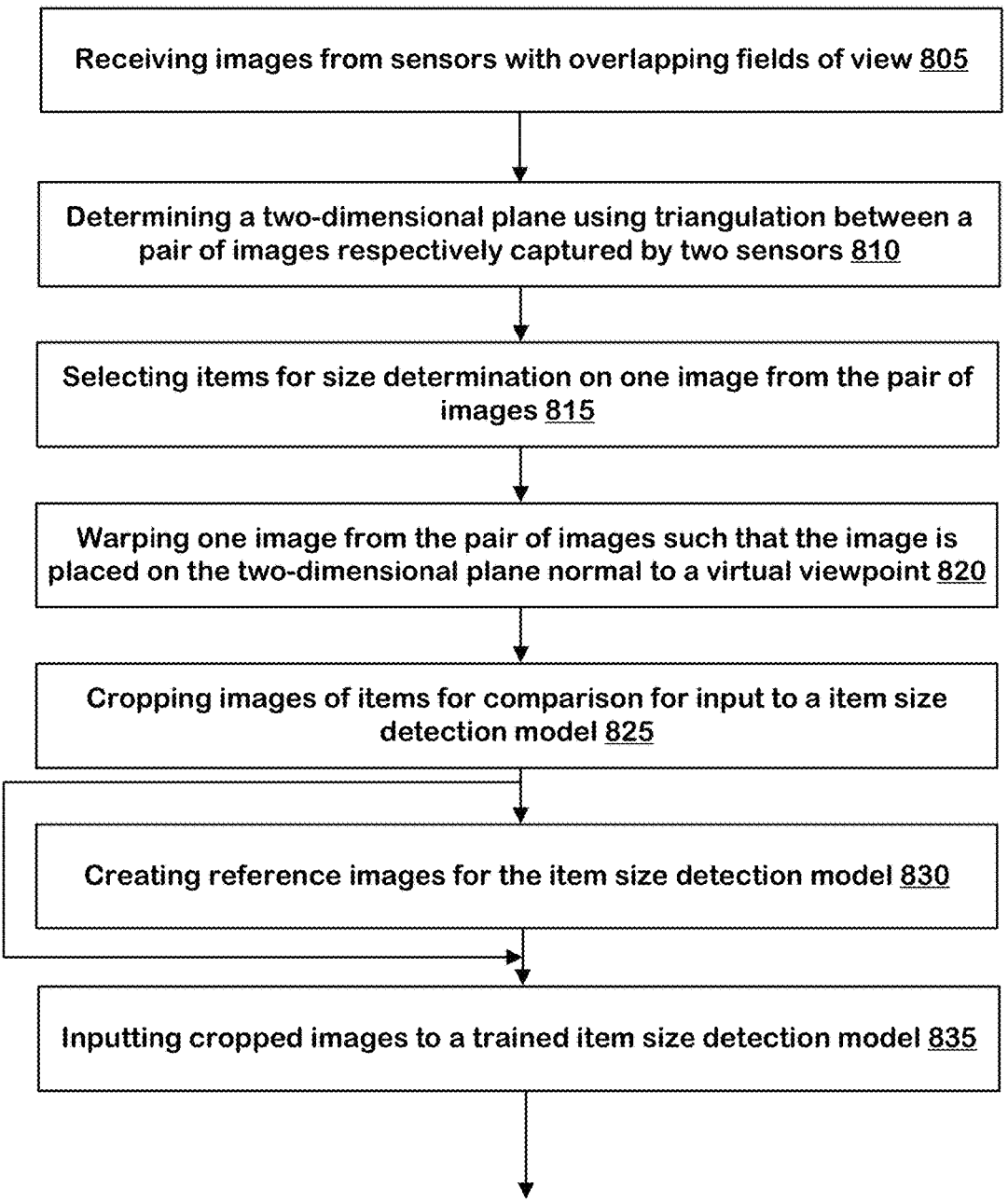
FIG. 8 is a flowchart presenting operations for detecting a size of an item positioned in an inventory location in the area of real space.

FIG. 8 presents a process flowchart including operations to perform item size determination by processing images of items captured by sensors in the area of real space. The process for item size determination starts at an operation 805 when sequences of images of the area of real space are received from a plurality of sensors. The sensors have overlapping fields of view. Two or more sensors have overlapping fields of view in the area of real space thus capturing images of a same portion of the area of real space.

Determining the size of an inventory item requires determination of position of the item in three dimensions of the area of real space. The location of the inventory item in the two-dimensional plane is available from the images captured by the sensors. However, the position of the inventory item along the third dimension or the depth information of the inventory item is not readily available from two-dimensional images received from the sensors. As the sensors (or the cameras) are calibrated and their positions in the area of real space are known, the technology disclosed can use extrinsic calibration parameters of the sensors to determine a two-dimensional plane that is, for example, normal to the floor (or some other surface or plane) of the area of real space and the inventory item is positioned on this plane (operation 805). To determine the two-dimensional plane that is, for example, normal to the floor in the three-dimensional area of real space on which the inventory item is positioned, triangulation is performed on a pair of images captured from sensors with overlapping areas of real space. Alternatively, the two-dimensional plane can be parallel to a plane formed by the shelf on which the inventory item is located. Furthermore, the two-dimensional plane can be parallel to a known angle of display of one or more inventory items (e.g., sometimes beverage cans are displayed at a particular angle, so that they slide to the front of the shelf when one inventory item is taken away, the two-dimensional plane can be adjusted so as to be parallel to the angle of the inventory item). Both a first image and a second image in the pair of images include a same portion of the area of real space thus both images include the image of the inventory item. However, the image of the inventory item may appear in respective images from a different perspective and in a different size due to different orientation and distance of respective sensors from the inventory item.

Figure 7A:
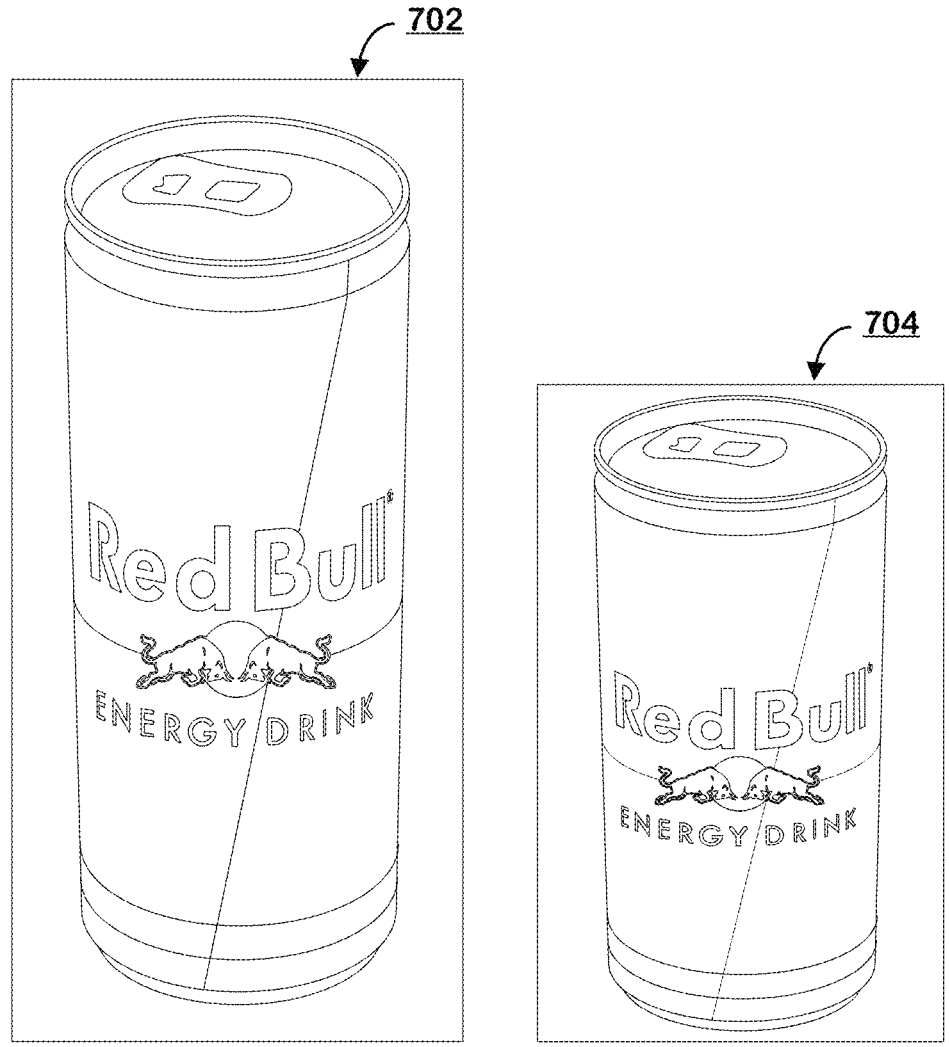
FIG. 7A presents images of two inventory items for which a correct detection of a size of the item is difficult.
Figure 7B:
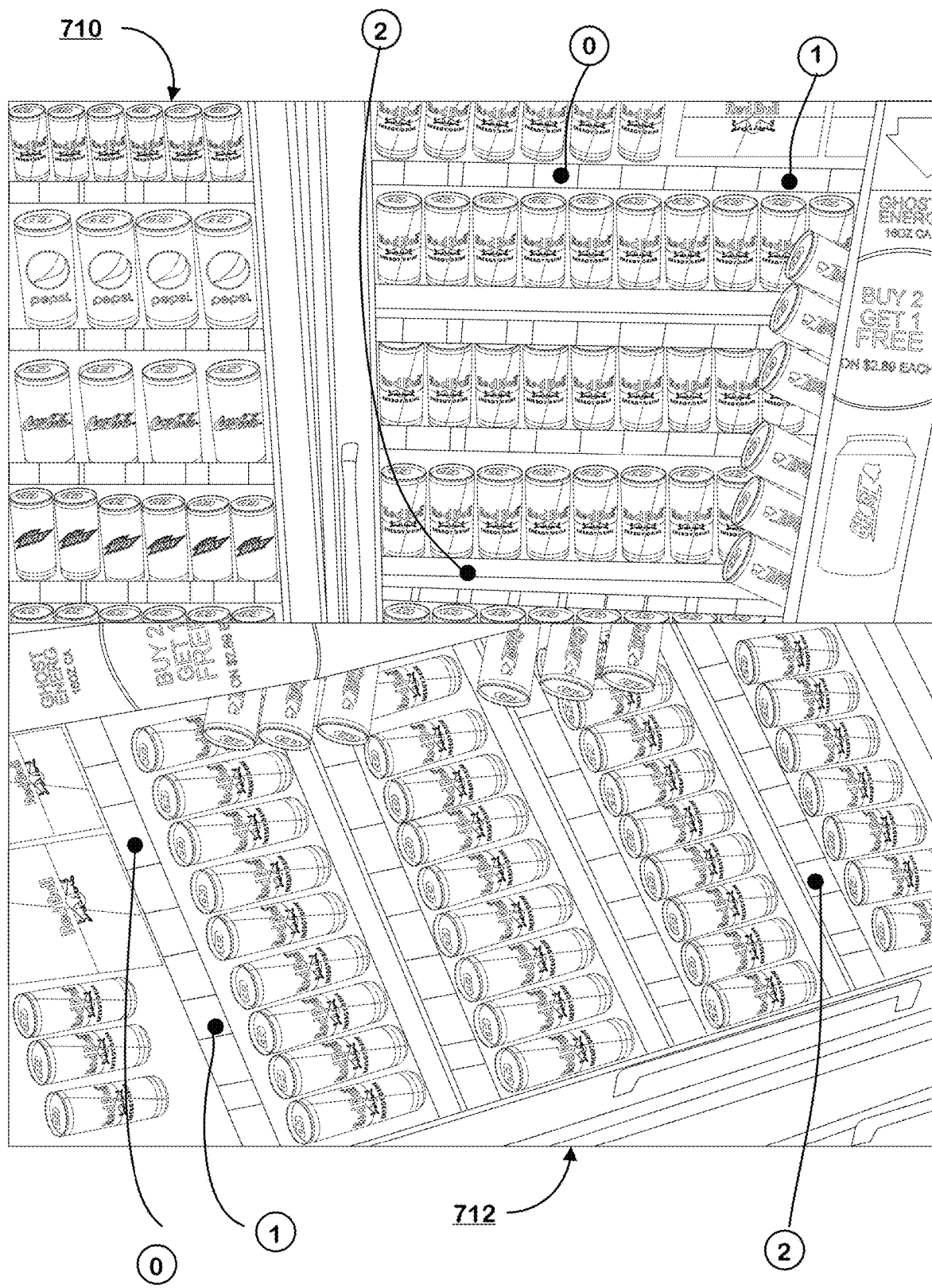
FIG. 7B presents a pair of images of a same area of real space captured by two sensors and identification of three pairs of points for determining an inventory item's position in three-dimensional area of real space.

Determining a two-dimensional plane in the area of real space includes matching at least three points on a first image obtained by a first sensor and a second image obtained by a second sensor. This results in at least three pairs of corresponding points, such that each pair of corresponding points includes a point on a first image and a point on a second image. Each point in each pair of corresponding points is located at a same visual feature in a same portion of the area of real space. FIG. 7B shows a pair of images (710 and 712) respectively captured by sensors with overlapping fields of view. Both images capture inventory items placed in a same refrigerator. To determine the two-dimensional plane on which the items are positioned in the three-dimensional area of real space, three pairs of points are identified on the two images. These points are also known as "keypoints". The system can automatically or manually (i.e., manual user selection) detect the same keypoint in multiple camera perspectives, and then use multi-view geometry to triangulate the keypoint into a 3D coordinate system. By then doing this with multiple keypoints, the system can determine a two-dimensional plane in the three-dimensional area of real space to measure the distance between those keypoints in 3D. This is further explained below with reference to an example presented in FIG. 7B.

FIG. 7B shows the three points labeled as "0", "1", and "2" on the pair of images. A pair of points with the same label such as "0" is placed on a same visual feature in the pair of images. The three-dimensional scene generation technique, presented above, can be used to determine the depth of the inventory items using the corresponding points in the pair of images. The technique uses extrinsic calibration parameters of the sensors and the positions of the corresponding pairs of points to determine a position in three-dimensions (x, y, z) of each of the points "0", "1", and "2". Using the three-dimensional positions of the points "0", "1", and "2", a two-dimensional plane is determined in the area of real space on which the three points are positioned (operation 810).

Identification of the at least three points on each of the first and second images further can be implemented using a feature extractor model. The first image and the second image are input to a feature extractor model to extract matching features of inventory display structures or other structures in the area of real space. At least three pairs of matching features are selected as the at least three points on each of the first and the second images for determination of the two-dimensional plane in the area of real space. The feature extractor model can be a machine learning model trained to extract features in the area of real space. The model can detect hundreds of pairs of points in the first image and the second image such that the points in a pair of corresponding points are positioned at the same visual feature in the area of real space. The models are trained to select visual features that remain substantially immobile during the operation of the store. Therefore, the feature extractor model is more likely to select visual features corresponding to inventory display structures or other structures or fixtures in the shopping store that remain stationary for extended periods of time such as for many days or weeks. Therefore, the process of determining the two-dimensional planes in the area of real space may be performed once and used over a longer period of time (such as one day, two days, or up to a week).

One or more inventory items are selected from at least one image from the pair of images for detecting size of the item (operation 815). Any one of the two images from the pair of images can be used for selection of inventory items for detecting size of inventory items. In some cases, one of the image in the pair of images may have been captured by a high-resolution camera or may have a better view of the inventory items placed in the inventory location. In such cases, the high-resolution image or the image capturing a better view of the inventory items is used for selecting inventory items. This camera or sensor providing a higher resolution image may also be referred to as a "master camera" or a "master sensor". The other camera or sensors may be referred to as a "slave camera" or a "slave sensors".

The selected inventory item for which the size needs to be determined can be referred to as a "query" item. If another inventory item of the same product is available in the high-resolution image, it can be selected for providing as a "reference" image input to a trained size determination model for determining the size of the query item. The reference image of the inventory item is selected from the same image when a visual clue is available on the image of the inventory item in the reference image that indicates the size of the item. For example, the writing on the item shows the size of the item on the reference image. If the particular inventory item for which the size needs to be determined is available only in two sizes, then the reference image of any of the two sizes can be used. When the query item and the reference item in the reference image are of the same size, the trained size determination model will match the items (or output "true") and the size of the reference item can be used as the size of the query item. If the items are of different sizes, the model will not match them (or output "false"). In this case, the system can use the other size as the size of the query item.

In some cases, the items for a particular product are available in more than two sizes in the shopping store. In this case, it is better to use a reference image from a reference library for determining the size of the inventory item by matching it with one or more reference items of different sizes of the same product. Another use case when reference item from a reference library can be used occurs when a reference item is not present in the image selected from the pair of images or the visual information on the other item in the image does not indicate the size. In such cases, a reference image can be selected from a library of labeled images and provided as input to the size detection model along with the image of the query item. A reference image taken from a reference library of images including classified and sized inventory items. The reference image is an image of an inventory item that has a same classification as the inventory item of the first image or the image from the master sensor selected for determining the size of the inventory item.

Figure 7C:
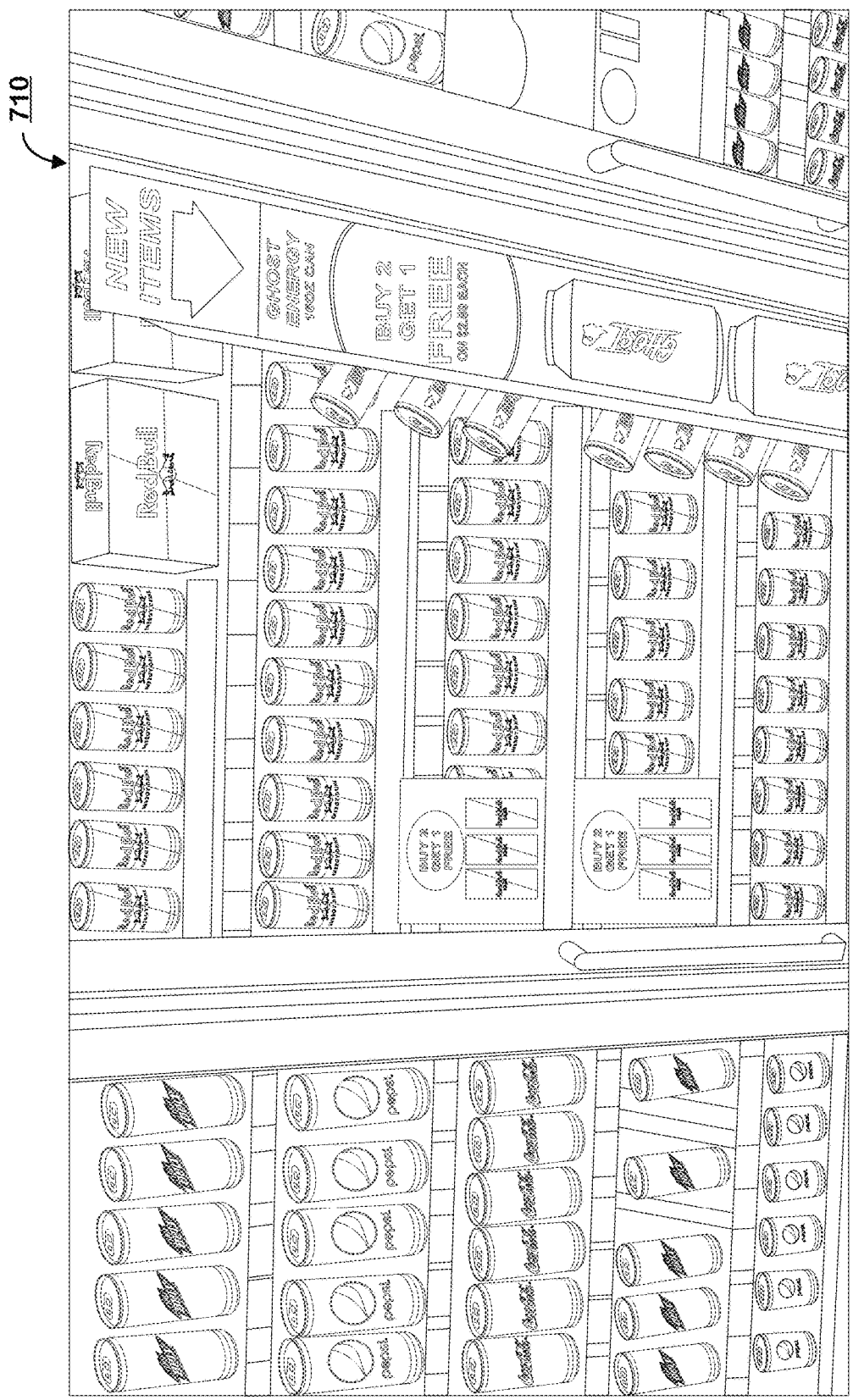
FIG. 7C presents one image selected from the pair of images for detecting a size of an inventory item.
Figure 7D:
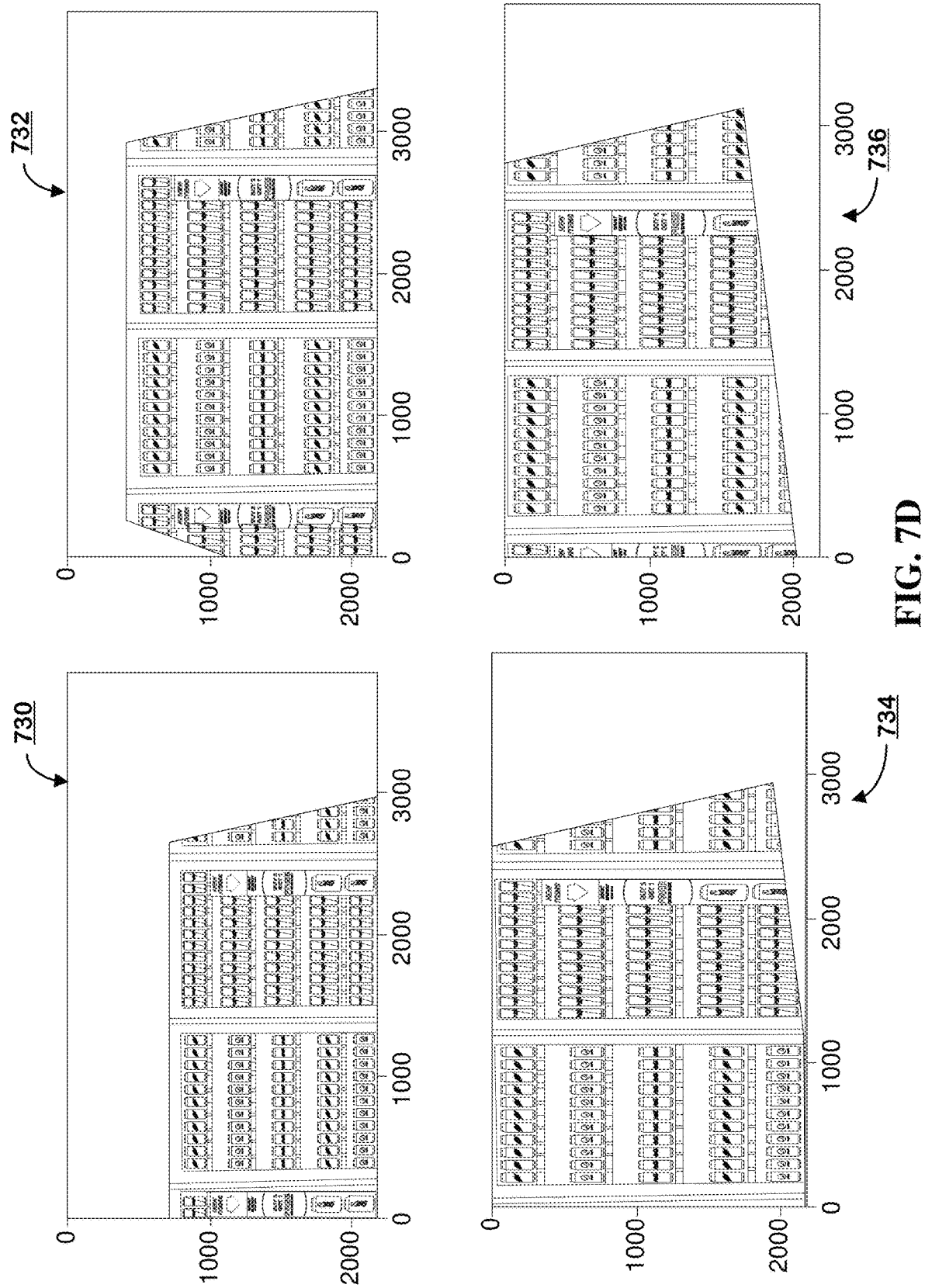
FIG. 7D presents a warped image which is reoriented and positioned on a two-dimensional plane that is normal to a virtual viewpoint.

The selected image from the pair of images is warped onto the two-dimensional plane by re-orienting the first image onto the two-dimensional plane such that (i) a determined virtual point of view (virtual viewpoint) is normal to the first image placed onto the two-dimensional plane and (ii) the determined virtual point of view is located at a pre-defined distance from the two-dimensional plane (operation 820) A virtual view point is a made up view point from a perspective of a virtual (or actual) camera position that is normal to the two-dimensional plane and is at a virtual (or actual) depth and x-y location with respect to the two-dimensional plane. FIG. 7C shows one image 710 from the pair of images selected for warping. FIG. 7D shows four variations of an image after warping if performed and a virtual viewpoint is established. The images 730, 732, 734, and 736 show a warped image, after the operation 820 is complete, as if viewed from four different virtual viewpoints. The images 730, 732, 734, and 736 are positioned at a distance of at least 1 meter from the virtual viewpoint. Different values of distances from the position of the virtual viewpoint (or the virtual camera) can be used, for example, 2 meters, 3 meters or more. A distance of less than 1 meter can also be used such as 0.5 meters or 0.25 meters or less. One image from the images 730, 732, 734, and 736 can be selected for further processing to detect the size of the inventory item. The image that provides a better view of the item or plurality of items for which size needs to be detected can be selected for further processing. The height of the virtual viewpoint or the virtual camera from the floor can be adjusted to get a better view of a portion of the inventory display structure in which the inventory item for which the size needs to be determined is positioned. The four images in FIG. 7D (i.e., images 730, 732, 734, and 736) illustrate four warped images that are taken from different positions of the virtual viewpoint. The virtual viewpoint is positioned at a greater height when image 730 is captured, therefore a portion of the area of real space above the inventory display structure is also included in this image. The virtual viewpoint is moved to a lower height and is moved leftward for capturing image 732, thus including a larger portion of the inventory display structure. The height of the virtual viewpoint is moved further lower and is moved rightward when capturing the image 734. The position of the virtual viewpoint is at a further lower height when capturing the image 736. Given the virtual camera's location, the warping operation includes calculating the homography that can be used to warp the selected image to its perspective. The warped images in FIG. 7D illustrate how the fridge doors now look as if the image was captured by a camera positioned to view the fridge door head on.

Figure 7E:
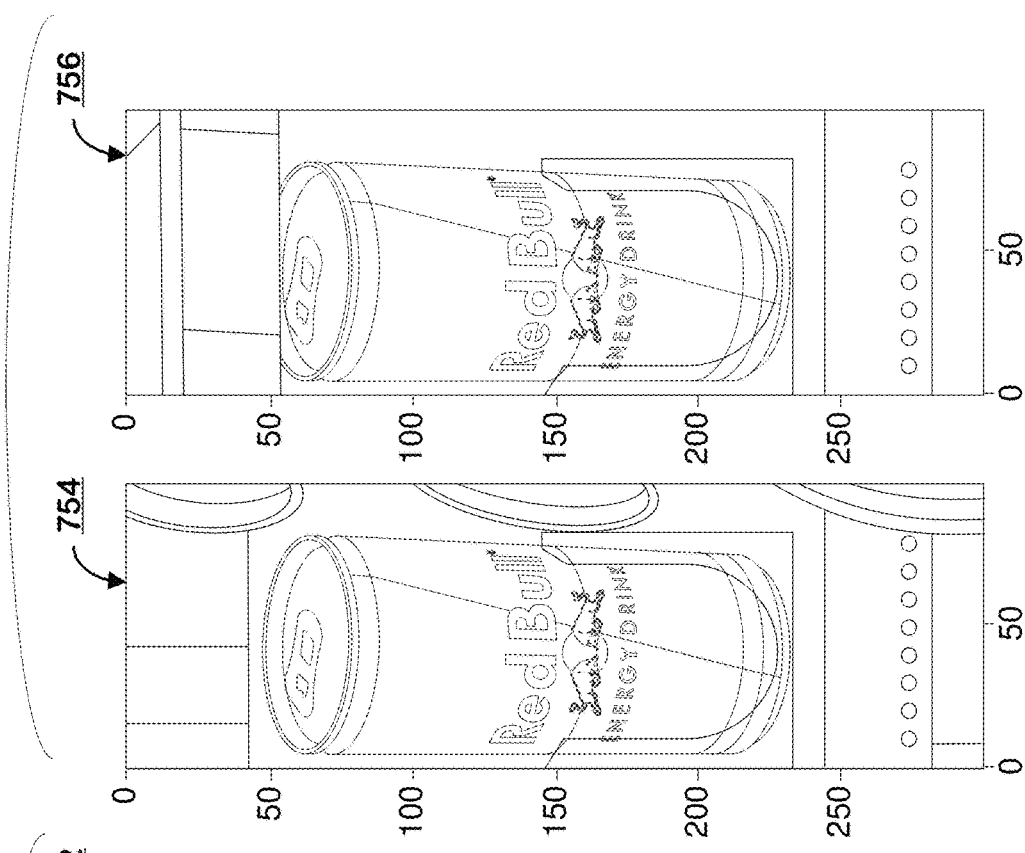
FIG. 7E presents crops of inventory items from the warped image for detecting a size of an inventory item.
Figure 7E:
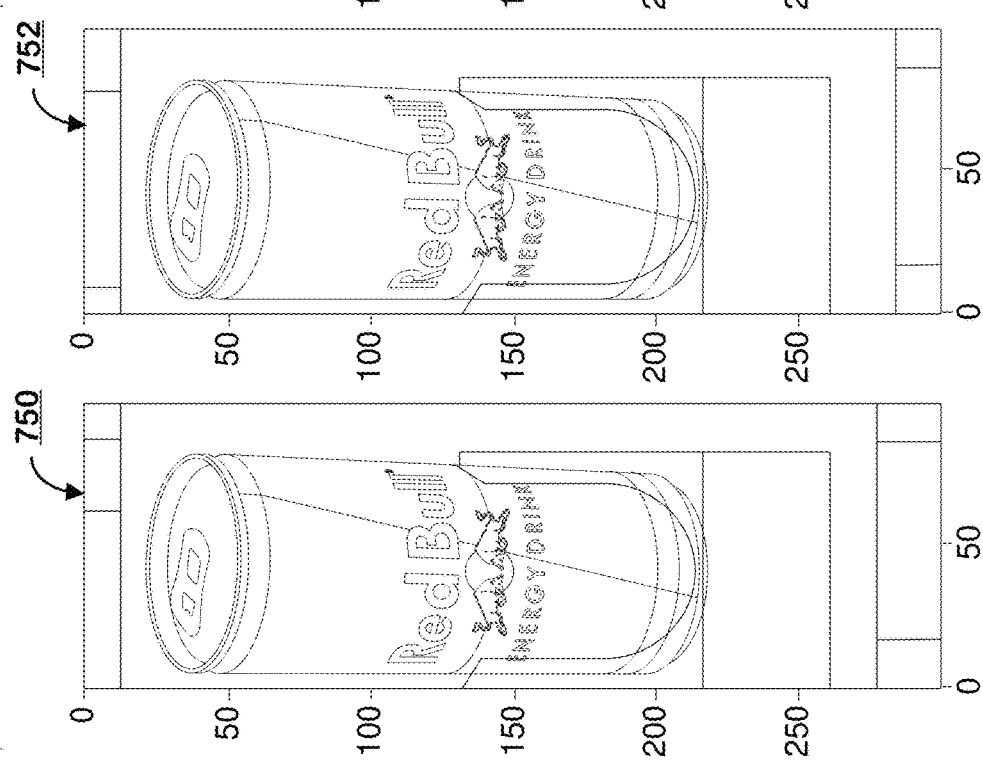

The images of inventory items are cropped out from the warped image for inputting to the size detection model for detecting the size (operation 825). Tight crops of inventory items are taken so that two or more items can be compared for detecting the size. FIG. 7E shows two pairs of images of two inventory items of the same product but different sizes. Two pairs are shown here to illustrate that the technology disclosed can crop out multiple images of the same inventory item from the warped image (or from pre-processed or unprocessed reference images) for inputting to the size detection model. As the items are now presented with similar perspective and positioned at the same distance from the virtual viewpoint, it becomes easier for the trained size determination model to detect the size of the inventory item. A scale can also be placed along the images to show the height and width of the inventory items. The comparison becomes easier when images of items of different sizes are taken from a same perspective and placed close to each other. The performance of the trained size determination model is better when the input images are taken from the same perspective and at a same distance from the virtual viewpoint.

Referring to the images in FIG. 7E, the first pair of cans in the left two images 750 and 752 are smaller than the cans in the second pair of images on the right in images 754 and 756. Using the same scale for all four cans, it is clear that the two cans in images 754 and 756 on the right side have a larger height as compared to the two cans on the left side in images 750 and 752. Also, it is clear that the two cans on the right side have a larger width as compared to the two cans on the left side. The comparison becomes easier when images of items of different sizes are taken from a same perspective and placed close to each other. If the task is to determine the size of the item in image 750, then the query image 750 is provided as input to the size detection model along with a reference image of the same product type i.e., image 754. It is also clear that items in images 750 and 754 have the same flavor which is indicated by a dark blue color of the cans. Similarly, the items in 752 and 756 have the same flavor which is indicated by light blue color of the cans.

Figure 7F:
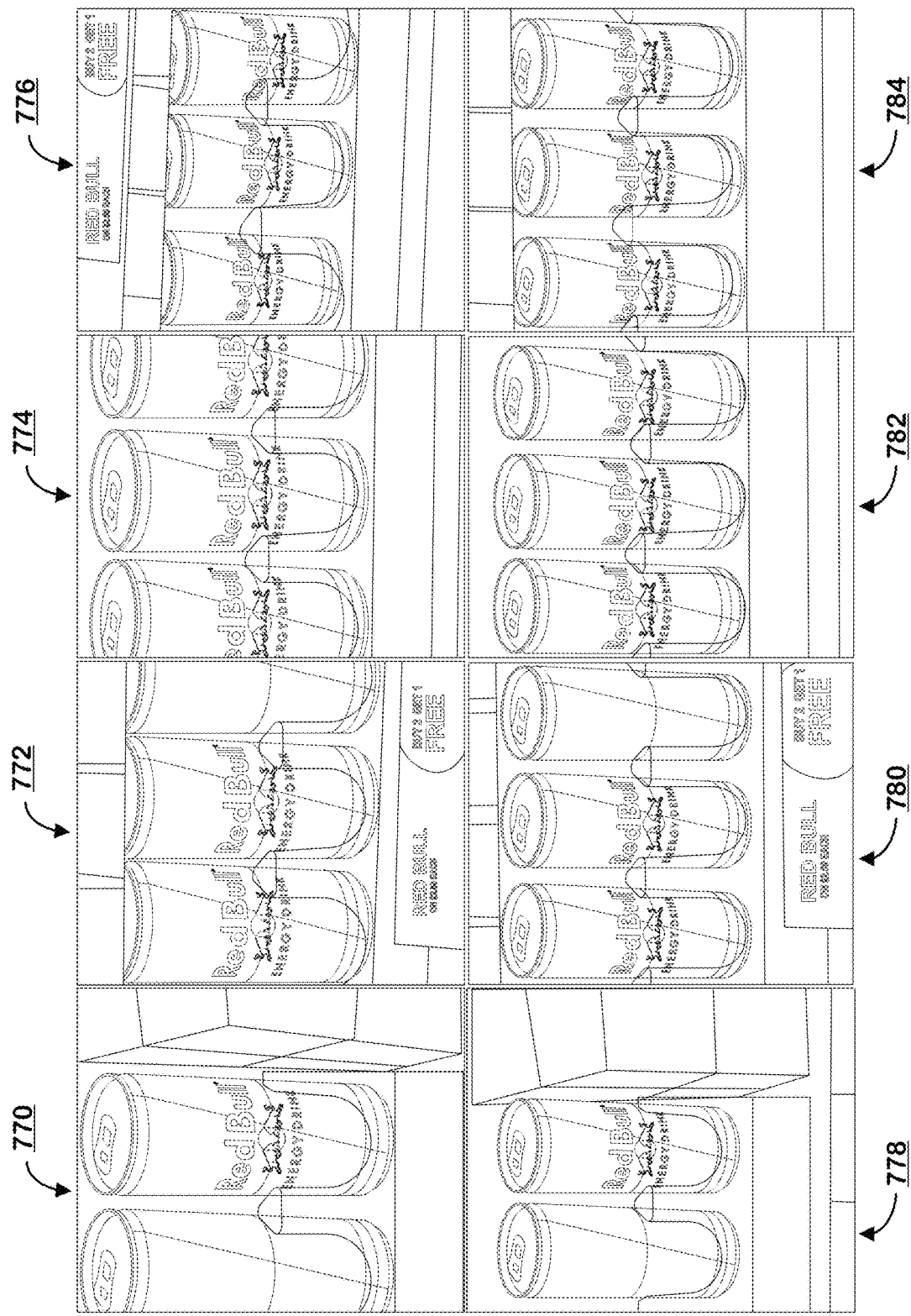
FIG. 7F presents examples of cropped images of inventory items for use in detection of a size of an inventory item.

The process can also include an operation of obtaining and creating reference images for use in detection of sizes of inventory items (operation 830). The reference images can be stored in a database and can have data associated therewith. The technology disclosed can build galleries of normalized cropped images of items for which the sizes are difficult to tell apart (e.g., Red Bull™, Coca Cola™, or other products), and use the normalized crops to compare against any new items to be classified. The normalized crops are images of items that are taken from images of an inventory location from a pre-defined or pre-determined distance such as 1 meter, 2 meter, 3 meter etc. The reference images can provide a direct measurable reference to assign a size to any new cropped image to be labeled. FIG. 7F provides examples of unnormalized reference images in the top row i.e., the images labeled as 770, 772, 774, and 776. The images 778, 780, 782, and 784, in the bottom row of FIG. 7F are normalized images. It can be seen that normalized images of cans in the bottom row appear slightly smaller than their unnormalized counterpart in the top row. In general, the normalized images make the 12 ounce cans look bigger than the 8.4 ounce cans because all images are taken from the same distance from the virtual viewpoint or the virtual camera. The technology disclosed includes logic to adjust a size of the reference image to correspond to the virtual point of view that is normal to the image of the query item. In such a case, the reference item and the query item are then located at the same pre-defined distance from the virtual camera or from the virtual point of view. The reference images in the reference library include metadata including a distance of the inventory item in the reference image from the virtual point of view. The technology disclosed can adjust the size of the reference image of the inventory item by matching the distance of the inventory item in the reference image from the virtual point of view to the pre-defined distance.

At operation 835 the query image and the reference image are input to the trained size determination model for determining a size of the item in the query image. Examples of input images to the trained size determination model are provided in FIG. 7G. Eight examples of input images are presented in FIG. 7G in boxes labeled from input image #1 to input image #8. Each of the eight boxes in FIG. 7G comprise an input image that is provided as an input to a size determination model. The input image includes two parts (i.e., two images). The two images, within the input image, are placed together to form the input image. The part on the left (of each input image) is a query image and the part on the right (of each input image) is an image of the same product from the reference gallery. A broken line is shown in the example input images to indicate the left and right parts of the input images. The technology disclosed can store, cropped query images, for which the size is correctly determined, as part of the reference library of images for subsequent use as reference images. Therefore, the number of reference images can increase in the reference library over time.

Figure 7G:
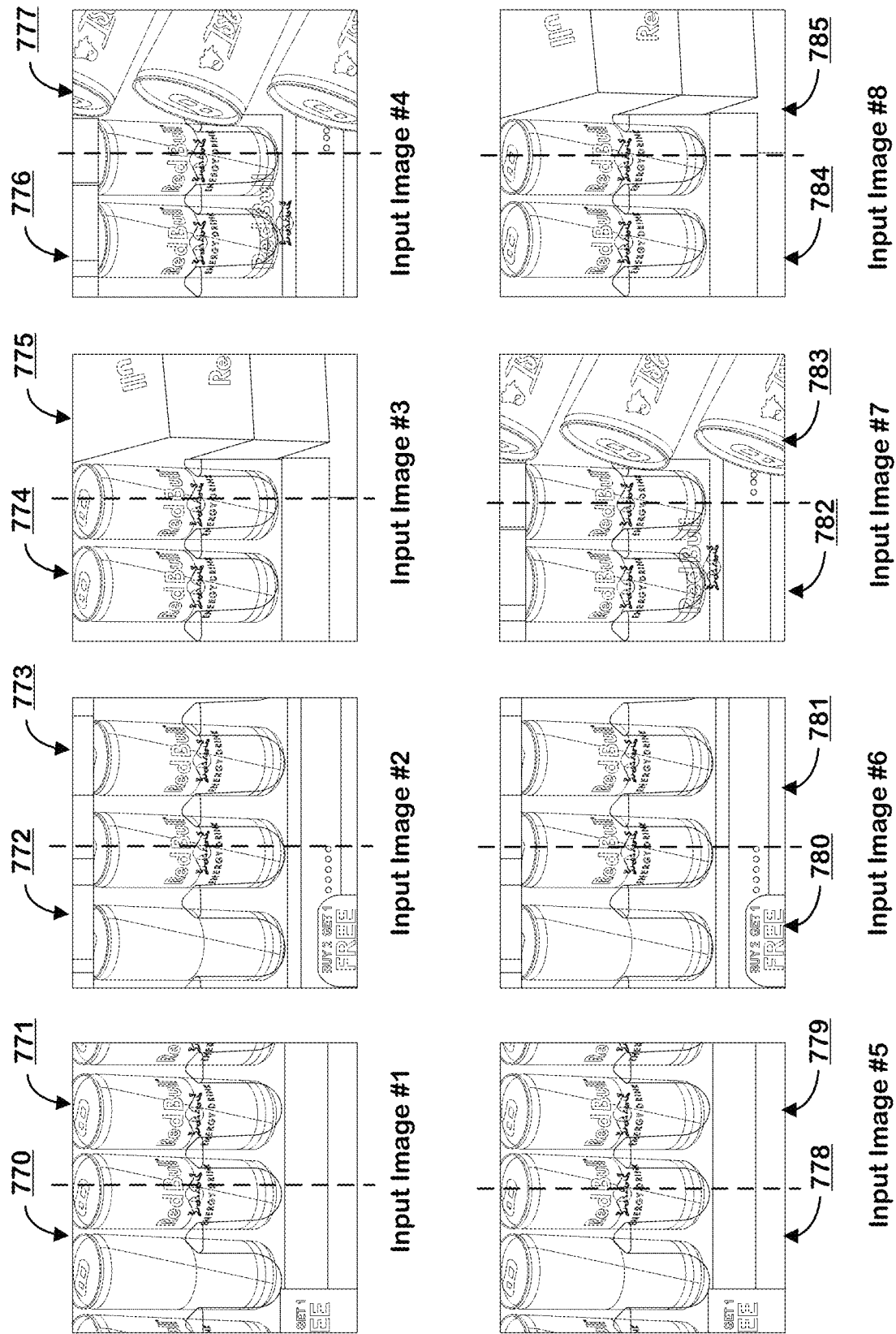
FIG. 7G presents input images to the size detection model, each input image include a query image and a reference image.

The four input images on the left in FIG. 7G (i.e., input images 1, 2, 5 and 6) include a same query image combined with different reference images. Input images 2 and 6 are taken at a closer distance to the inventory item as compared to input images 1 and 5. One of the four input image examples can be provided as input to the trained size determination model to determine the size of the inventory item in query image. In some cases, such as when prediction confidence is lower than a threshold, multiple determinations of the size of the query item can be made by providing two or more input images, one by one, to the size determination model, to determine the size of the item. The results of multiple model determinations can be combined such as by using a majority vote to determine the size of the item.

Input images 3 and 7 are examples using a same query item and input images 4 and 8 are input image examples using another same query item. One of the two input images for a particular query inventory item can be used for determining the size of the query inventory item. Detailed examples are provided below.

For example, the input image 1 of FIG. 7G comprises a query image 770 and a reference image 771. Input image 2 comprises a query image 772 and a reference image 773. Input image 3 comprises a query image 774 and a reference image 775. Input image 4 comprises a query image 776 and a reference image 777. Input image 5 comprises a query image 778 and a reference image 779. Input image 6 comprises a query image 780 and a reference image 781. Input image 7 comprises a query image 782 and a reference image 783. Input image 8 comprises a query image 784 and a reference image 785. In each of the eight input image examples, the (half) inventory item to the left of the broken line, which is part of the query image and the (half) inventory item to the right of the broken line, which is part of the reference image are compared to one another for size determination. The size determination model can output a binary input indicating whether the size of the item in the query image matches the size of the item in the reference image. If the output is true, then the size of the item in the query image is the same as the size of the image in the reference image. As the size of the item in the reference image is known, the technology disclosed can then use the size of the item in the reference image when processing the item in the query image. If the output from the size detection model is false, then the technology disclosed can either use another reference image with the query image and input to the size detection model or if the item being reviewed in the query image has one other size, then that size can be used for further processing the query item.

The technology disclosed can also implement a second machine learning model to determine the size of inventory items. This model, referred to as trained item size classification model, is trained to detect the size of the inventory item using a pixel-wise height and a pixel-wise width of the inventory item when the inventory item is viewed from the virtual point of view at the pre-defined distance. Cropped out image of the inventory item to a trained item size classification model are provided as input to the trained item size classification model. This model can be used in combination with the trained item size determination model presented above or it can be implemented independently. In some cases when a reference image for the query inventory item is not available, the technology disclosed can determine the size of the query inventory item using the trained item size classification model.

Determining Size of Occluded Inventory Items

In some cases, the inventory items are placed in inventory display structures that are occluded such as fridges. The fridge doors may be covered with promotional materials and therefore items on shelves in a fridge may be completely or partially occluded. The technology disclosed includes logic to detect when the occlusion is temporarily removed and initiate the camogram update and item size detection processes at that time. Upon detection of the occlusion, the technology disclosed uses a trained occlusion determination model and from the at least one of the first and second images to determine that a hand of a subject has grabbed a handle and that the subject has opened a door that is causing the occlusion. Upon the determination that the subject has opened the door that is causing the occlusion, the technology disclosed performs the process steps for item size determination, i.e., the determining of the two-dimensional plane, the selecting, the warping and cropping using images that are obtained at a time that is subsequent to a time at which the first and second images are obtained. The occlusion determination model is trained to classify images to determine when the fridge door is opened and when the fridge door is closed. During inference, the technology disclosed can initiate the item size detection or camogram update process when the occlusion determination model determines that the fridge door is open. The occlusion determination model is also trained to determine when a subject grabs a handle of the fridge door. This can be used as an indicator that the subject is intending to open the fridge door. This indication or signal can initiate the processing of images at a higher image frame rate to capture the image of fridge when the door is open for a small window of time.

Network Configuration

Figure 9:
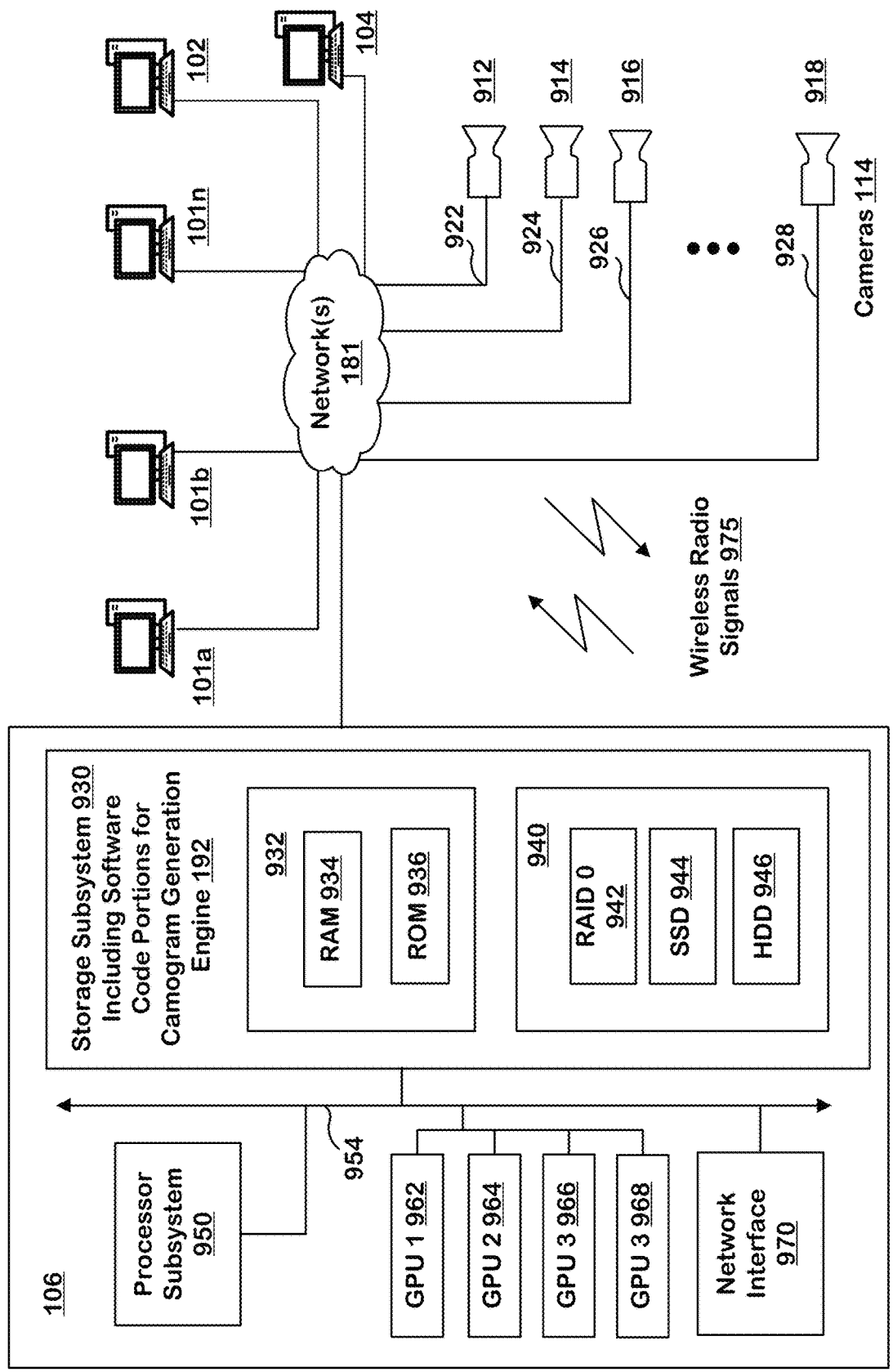
FIG. 9 is a camera and computer hardware arrangement configured for hosting the subject persistence processing engine of FIG. 1.

FIG. 9 presents architecture of a network hosting the camogram generation engine 192 which is hosted on the network node 106. The system includes a plurality of network nodes 101*a*, 101*b*, 101*n*, 102, and 104 in the illustrated embodiment. In such an embodiment, the network nodes are also referred to as processing platforms. Processing platforms (network nodes) 106, 101*a*-101*n*, 102, 104 and cameras 912, 914, 916, and 918 are connected to network(s) 181.

FIG. 9 shows a plurality of cameras 912, 914, 916, and 918 connected to the network(s) 181. A large number of cameras can be deployed in particular systems. In one embodiment, the cameras 912 to 918 are connected to the network(s) 181 using Ethernet-based connectors 922, 924, 926, and 928, respectively. In such an embodiment, the Ethernet-based connectors can have a data transfer speed of 1 gigabit per second, also referred to as Gigabit Ethernet. It is understood that in other embodiments, cameras 912 to 918 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 930 stores the basic programming and data constructs that provide the functionality of certain embodiments of the present invention. For example, the various modules implementing the functionality of the camogram generation engine 192 may be stored in storage subsystem 930. The storage subsystem 930 is an example of a computer readable memory comprising a non-transitory data storage medium, having computer instructions stored in the memory executable by a computer to perform all or any combination of the data processing and image processing functions described herein including logic to detect tracking errors and logic to re-identify subjects with incorrect track_IDs, logic to link subjects in an area of real space with a user account, to determine locations of tracked subjects represented in the images, match the tracked subjects with user accounts by identifying locations of mobile computing devices executing client applications in the area of real space by processes as described herein. In other examples, the computer instructions can be stored in other types of memory, including portable memory, that comprise a non-transitory data storage medium or media, readable by a computer.

These software modules are generally executed by a processor subsystem 950. A host memory subsystem 932 typically includes a number of memories including a main random access memory (RAM) 934 for storage of instructions and data during program execution and a read-only memory (ROM) 936 in which fixed instructions are stored. In one embodiment, the RAM 934 is used as a buffer for storing camograms data generated by the camogram generation engine 192.

A file storage subsystem 940 provides persistent storage for program and data files. In an example embodiment, the storage subsystem 940 can includes four 120 Gigabyte (GB) solid state disks (SSD) in a RAID 0 (redundant array of independent disks) arrangement identified by a numeral 942. In the example embodiment, planogram data in the planogram database 140, inventory items data in the items database 150, store map data in the store map database 160, camera placement data in the camera placement database 170, camograms data in the camograms database 180 and/or video or images in the video/image database 190, which may not be in RAM, can be stored in RAID 0. In the example embodiment, the hard disk drive (HDD) 946 is slower in access speed than the RAID 0 942 storage. The solid state disk (SSD) 944 contains the operating system and related files for the camogram generation engine 192.

In an example configuration, four cameras 912, 914, 916, 918, are connected to the processing platform (network node) 106. Each camera has a dedicated graphics processing unit GPU 1 962, GPU 2 964, GPU 3 966, and GPU 4 968, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 950, the storage subsystem 930 and the GPUs 962, 964, and 966 communicate using the bus subsystem 954.

A network interface subsystem 970 is connected to the bus subsystem 954 forming part of the processing platform (network node) 106. Network interface subsystem 970 provides an interface to outside networks, including an interface to corresponding interface devices in other computer systems. The network interface subsystem 970 allows the processing platform to communicate over the network either by using cables (or wires) or wirelessly. The wireless radio signals 975 emitted by the mobile computing devices in the area of real space are received (via the wireless access points) by the network interface subsystem 970 for account matching. A number of peripheral devices such as user interface output devices and user interface input devices are also connected to the bus subsystem 954 forming part of the processing platform (network node) 106. These subsystems and devices are intentionally not shown in FIG. 9 to improve the clarity of the description. Although bus subsystem 954 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300-∞, a field of view field of view with a ⅓" sensor of 98.2°-23.8°. The cameras 114 can be any of Pan-Tilt-Zoom cameras, 360-degree cameras, and/or combinations thereof that can be installed in the real space.

System Components

Figure 10:
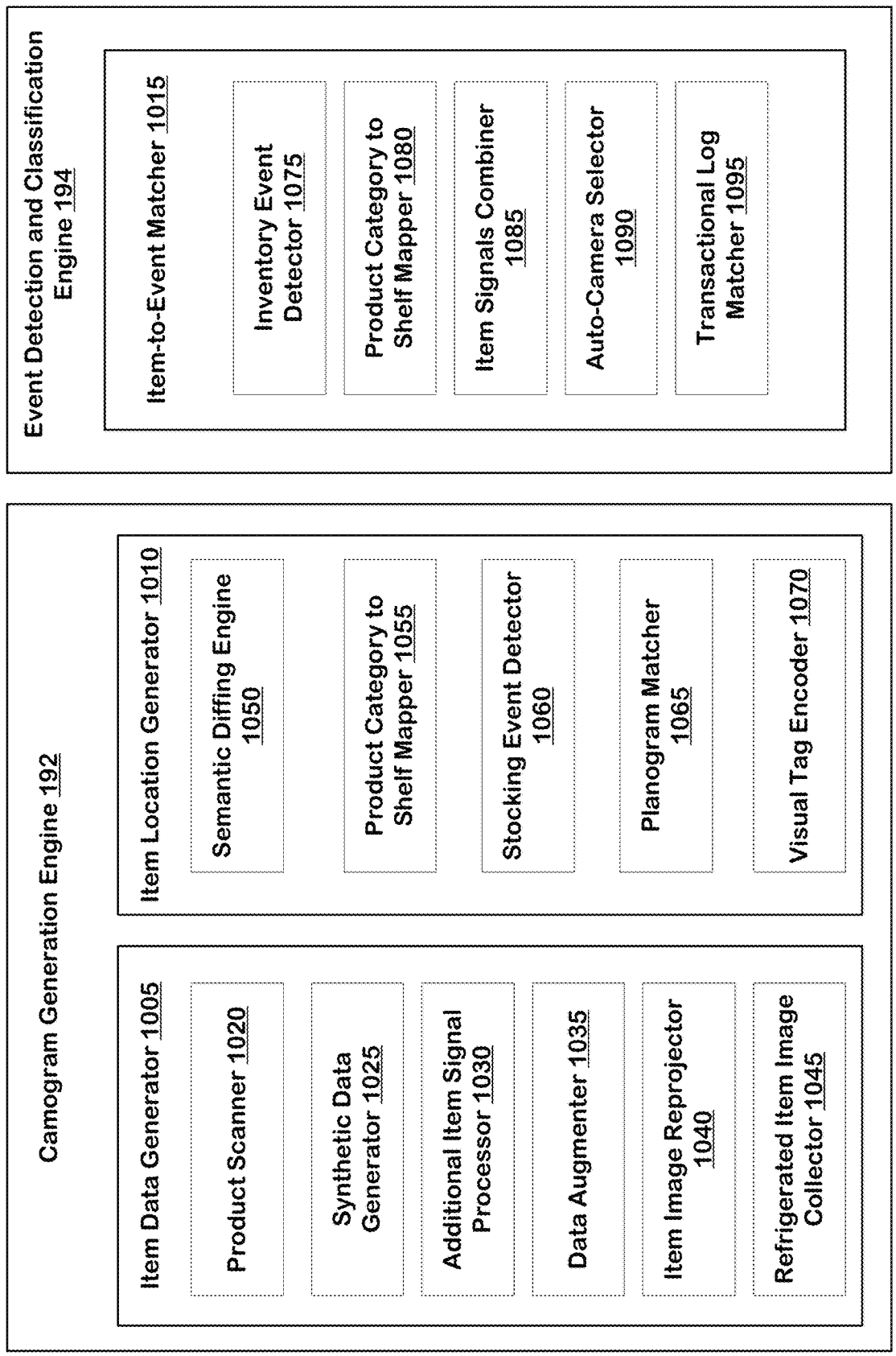
FIG. 10 presents components of the camogram generation engine and the event detection and classification engine from FIG. 1.

FIG. 10 presents selected components of camogram generation engine 192 and event detection and classification engine 194. The camogram generation engine 192 comprises of two high-level components, an item data generator 1005 and an item location generator 1010. The event detection and classification engine 194 includes one high-level component, an item-to-event matcher 1015. The high-level components further comprise many components or engines that perform various operations related to item data and location generation and matching of items to events detected in the area of real space. Details of these components and engines are presented below. Any of the generators, matchers, scanners, augmenters, reprojectors, collectors, mappers, detectors, encoders, combiners, selectors, etc. described with respect to any of the figures described herein can be implemented as a separate device having dedicated and/or shared hardware and/or software components that perform the functionality thereof and/or they can be implemented as individual or combined engines that perform the functionality thereof.

Components of Camogram Generation Engine

The camogram generation engine 192 comprises two high-level components, an item data generator 1005 and an item location generator 1010.

Item Data Generator

The item data generator comprises a product scanner 1020, a synthetic data generator 1025, an additional item signal processor 1030, a data augmenter 1035, an item image reprojector 1040, and a refrigerated item image collector 1045. Details of these components are presented in the following sections.

Product Scanner

A store employee or an operator can scan products in order, on the shelf, with an application running on hardware that keeps track of that order and the associated UPCs (or SKUs). The product scanner 1020 includes logic to automatically transcribe that information onto a camogram or 3dogram (or a three-dimensional camogram). In some instances, a store employee can go to a shelf and use an application running on hardware, such as a scan gun or tablet, to go through the items or count the items on shelves. The system includes logic to use the data collected from the application or image recognition and the scan gun to build camograms. The camogram generation engine 192 can use data collected from other operations in the store and use it to build camograms or 3dograms.

Synthetic Data Generator

The synthetic data generator 1025 includes logic to generate synthetic image data for inventory items in a shopping store. The synthetic image data can be used to train machine learning models for item detection and classification tasks. Synthetic data generator can build three-dimensional (3D) models of SKUs (or items) and then synthetically render them (with or without domain randomization) to generate large training datasets. Machine learning models can be finetuned on such datasets. In such implementations, a base model can be trained on either only real data, or a mixture of real and synthetic data.

The synthetic data generator 1025 includes logic to build 3D model of inventory items. The 3D models can then be used to generate synthetic perspectives to train a machine learning model. The trained machine learning models can be used to detect and classify items as they taken or placed on shelves by shoppers. Synthetic data generator can build 3D models of the items with unique SKUs and use those 3D models to synthetically render a large training dataset for data augmentation, and domain randomization for a feature extractor model.

A domain can denote different measuring circumstances such as locations, times, experimental conditions, contexts at the time of data collection. Domain randomization is a systematic approach to data generation process that aims to enhance generalization of the machine learning algorithms to new environments.

The technology disclosed can use data augmentation techniques to increase the amount of training data by adding slightly modified copies of already existing data or newly created synthetic data from existing data.

The technology disclosed can use the training data set to training machine learning models that can identify items with unique SKUs positioned on shelves, using a single image of the front and back of the SKU that is collected.

The technology disclosed can use domain randomization techniques and data augmentation techniques, to create a training dataset that can be used to train machine learning models that generalize well in real world situations when only single image per SKU is available initially.

The technology disclosed includes logic to build 3D models of SKUs based on the high-resolution front and back images and use those 3D models to augment the dataset with views of the product from many different angles. This helps generalize the feature extraction and classification machine learning model to adapt to the distribution it would see in the cameras of SKUs on a shelf. The data augmentation is useful when a few or a single image of a SKU is available initially for training the machine learning models.

Additional Item Signal Processor

The additional item signal processor 1030 can merge various item detection and classification signals via an expert systems or learned systems. The additional item signal processor 1030 includes logic to combine the different signals together into an ensemble via, for example, an expert system. Examples of such signals can include signals for detecting size, flavor, weight or other characteristics of an inventory item.

Getting information about size of an item is an important signal when classifying the detected item. In addition to classifying an item, the system needs to get some sizing information regarding the item detected. For example, various sizes of a can of a soft drink, or other products need to be correctly detected. As the shapes, colors, markings, etc. of items of different sizes of the same produce are similar, the classification can be challenging. It can become difficult to visually classify such items because the pattern of such items appear similar. In order to classify different sizes of the same product the system needs to understand different "keypoints" on the product and measure it. The system includes logic to detect such keypoints on items and use these keypoints as additional input signals to classification algorithm. The system can detect the same keypoint in multiple camera perspectives, and then use multi-view geometry to triangulate that keypoint into a 3D coordinate system. The details of the item size detection method are presented above.

The technology disclosed includes logic to train a point correspondence model on the SKU specific data, and then use that to more accurately triangulate multiple points on an inventory item (with a unique SKU) as captured in images from multiple sensors. The technology disclosed can then estimate the size of the item or SKU detected. The size of the SKU can then factor into classifying the SKU, especially for families of SKUs with a variety of sizes.

If the label or a part of the label on the item is readable then the system can use it as an additional signal to narrow down the item classification. The technology disclosed can bring together multiple signals including object character recognition (OCR) label reading to detect and classify items.

Some shopping stores may have items with specific price tags, barcodes or other forms of product identifiers. The system includes logic to detect and identify the price tags, barcodes or other product identifiers and associate those to the boxes on the camograms. This can significantly reduce the search space and speed up the item classification. The system can implement the logic using a trained model. The system can use price tags, OCR, text detection and association as an additional signal to constraint the search space when detecting items (either via model, or camogram annotators).

Detecting price of items can be helpful in dealing with different sizes of same product. For example, to differentiate between a two-liter bottle vs one liter bottle of the same product. The system can detect the price tag and associated with a detected object. This price tag can then be provided as an additional signal to classification model. Price tag detection and associating it with the detected items (or SKUs) can be helpful to deal with the item size identification. Visual signal-based deep learning models can have limitations when classifying inventory items and their outputs may not be robust. The system can add heuristic methods or other signals like shelf location, product category, price, and/or item count (most of which are available in catalog data) to achieve the desired item detection and classification accuracy.

The technology disclosed overcomes the individual inefficiencies of various system presented above by combining the various signals and ensemble them together such as using expert systems. Thus, the technology disclosed can we bring these approaches together in a way where their strengths complement each other, leading to an overall accurate system.

Data Augmenter

The data augmenter 1035 includes logic to augment training data. Data augmentation is used to generate synthetic training data. More details regarding specific data augmentation technique for use in training of machine learning algorithms used by the technology disclosed are presented below. Data augmentation can reduce the wait time to access training data as synthetic or augmented data can be used to train machine learning models. Typically catalog data is readily available for a shopping store. The data augmenter 1035 can start with one catalog image per SKU and create an augmented dataset per SKU which can help to build the 3D SKU asset and eventually the system can have a 3D SKU catalog that can be used to create synthetic data.

Image augmentation is an important aspect of training machine learning models for detection and classification tasks related to events in a cashier-less store. Using the product categories, the image augmentation can be fine-tuned.

The technology disclosed can include an internal SKU catalog where the system can create an internal product category or product taxonomy. When the system receives the SKU list from a shopping store, each SKU from that list is mapped to one of the internal product categories. For the data augmentation pipeline, the product category plays a significant role. For example, if the product belongs to the "beverage category" the product is expected to be inside the fridge. So, for these SKUs, the data augmentation pipeline can produce augmented images with glares, different lighting conditions, tilted views, etc. whereas for detecting other items such as candy bars, top views, flips, rotation, distortion, cropped views, etc. are more relevant. When the technology disclosed receives the catalog images and corresponding metadata for a SKU, the features of the data augmentation pipeline can be selectively turned off or turned on which helps to create more realistic augmented dataset and reduce sole dependency on the initial data collection and data annotation for a new shopping store. The high quality inventory items data generate by data augmentation help in training the machine learning models for camogram updates and for item size detection processes presented above.

Item Image Reprojector

The item image reprojector 1040 includes logic to reproject poses of subjects in the area of real space into camera views that do not run pose detection model. The image reprojection can increase the efficiency of image factoring when semantic diffing technique is used to detect changes in inventory display structures. The image reprojection technique can reduce processing cost and processing time required for image factoring. In some implementations, the technology disclosed does not run full algorithm i.e., the subject tracking process and the event detection process, on all cameras to reduce processing costs. If subject tracking process is running on selected cameras in the area of real space then the item image reprojector can reproject the subjects' poses detected from selected cameras into views of cameras that do not run subject tracking or pose detection. Once poses are reprojected, views from all cameras can be used for generating factored images by removing poses of subjects positioned in front of shelves. This can improve the performance of the system to quickly get the same results as described using semantic diffing approach.

The technology disclosed includes logic to generate 3D views of the products as described above. The 3D views produced can be used in review process and also as an additional input signal in the video processing. The system includes ability to project camograms from one perspective or view to all the other cameras/views. The system can use the images of shelves to create and update a three-dimensional (3D) view of a camogram.

The technology disclosed includes a high resolution and low frames per second (fps) calibrated camera system for camograms i.e., to collect unoccluded high resolution images of shelves at a lower frequency. These images can be used to automate camogram labeling and projection of 3D poses on it. The shopping store can have different types of cameras installed in it and the cameras that are related to camograms can be high resolution/low fps cameras. These can be pan-tilt-zoom (PTZ) cameras which can provide the system the ability to zoom in to any part of the store where the system is not confident about what things are positioned on which parts of shelves. The high-resolution images can increase the confidence score of classifications.

The technology disclosed includes logic to label or detect items from one camera, and reproject those labels onto other shelves using homographies or by intersecting lines of sights with known 3D shelf geometry as stored in the store maps database 160. The technology disclosed includes logic to detect an item from one or more images from one camera and then reproject the detected item or its label. Reprojecting means if the system can detect an item from one camera then it can also detect it from another camera's view. The system can use various geometric technique to do this reprojection. This can speed up labeling process if items are being labeling manually. From a detection perspective, the system can detect from one camera and then detect the same item from another camera. The system includes logic to use detection from two cameras and then reproject on both cameras so that they can correct each other and achieve advantages of ensemble technique. This technique is related to multi-view detection and labeling that can be used by the technology disclosed to efficiently classify items in a shopping store.

Refrigerated Item Image Collector

The refrigerated item image collector 1045 includes logic to collect images of items from different types of shelves in the store that may have occlusions that partially or completely occlude the items in shelves. The refrigerated item image collector 1045 includes logic to capture images of refrigerated items. Some shopping stores have installed screens at fridge doors that can prevent the camera-based system to view items placed in the fridge. The technology disclosed includes logic to detect items positioned in a refrigerated shelves or fridges during intervals in which the fridge door is open. The technology disclosed include "open-fridge detector" component that includes logic to detect when a fridge door is open.

Heavily occluded glass fridge doors because of promotional items hangers and stickers. Two or more columns of inventory items can be occluded in every fridge due to the frame of the fridge door. The technology disclosed includes logic to implement an "open-fridge" detector. In one implementation, the system can use action classification model, which can detect that a shopper is "grabbing an item". In this implementation, the system can detect that the "item" grabbed is a fridge handle. In another implementation, a machine learning model such as a binary classifier is trained to classify what a fridge looks like when it is open vs. when the fridge is closed. During inference, the trained model can then detect when the fridge is open and initiate the camogram builder process and item size determination process.

The technology can use multiple smaller pinhole cameras mounted inside fridges to partially capture the rows of SKUs to build a complete camogram of the fridge. The technology disclosed can detect camogram of the rear of the fridge. Most fridges are stocked from the back. Retailers also generate "reverse planograms" for this purpose. The rears may have highly unobstructed views. The system can build a camogram of the rear and apply it to the front of the fridge.

The technology disclosed can update these screen display fridge doors dynamically in real-time based on the actual camogram. Currently these doors are powered by a static planogram provided by the retailer. The system includes the following logic to generate and update camograms. The technology disclosed can detect inventory items in a section of camogram that are out of place with respect to a planogram. The technology disclosed can also detect out of stock SKUs in a camogram.

The technology disclosed includes extreme zoom using matrix of cameras that can include automatic controllers and can be moved to view different parts of the area of real space. These cameras or sensors can scan inventory items that are not easily viewable. This feature makes it possible to select a 3D point in the store's coordinate space to extreme zoom on and the system can select the best PTZ camera for this task and figure out where to point this camera (Pan and tilt) and how much to zoom it in order to get the best close up view.

The technology disclosed includes logic to build a global SKU database that can include SKU assets (including images, 3D assets, front and back images, annotated PTZ images via camograms, etc.) across different stores or regions or countries, which is valuable data in the retail or shopping store environments.

By building a global product catalog the technology disclosed is able to transfer the knowledge from local store to global item SKU database which can improve the performance of detection and classification tasks. Global SKU database can be an important feature in the machine learning implementation of the system. The system can use a subset of the global SKU database to train the model.

The technology disclosed can create a "Data Mine" with SKUs and actors for camogram data collection. In one implementation, actors can be introduced in a store to collect items pretending to shop. The system can take pictures from the cameras. This technique can rapidly provide a large amount of data for training.

Label Adjudication is commonly used process in data labeling. Technology disclosed can include different type of adjudication that can include labels from different perspectives, and using adjudicating logic if they don't agree. When we have humans in the loop, humans can make mistakes, so we can have a second human label the items. If there is disagreement, then the system can have a third person or a cohort of persons to suggest a final label for the item.

Item Location Generator

The item location generator 1010 comprises a semantic diffing engine 1050, a product category to shelf mapper 1055, a stocking event detector 1060, a planogram matcher 1065, and a visual tag encoder 1070. The details of these components are presented in the following sections.

Semantic Diffing System

The semantic diffing system (or semantic diffing engine) 1050 can leverage factored images (subjects in foreground removed) of inventory display structures to allow automated camogram annotation to be performed on unconcluded views of shelves. The system includes logic to use the semantic diffing-based logic to generate camograms. The input to semantic diffing is factored images in which subjects occluding the inventory display structures have been removed. The system uses images of shelves from one or more cameras. During the store operation, subjects (such as shoppers or store employees) are moving in front of the shelves. The system can remove subjects in front of the shelf through a process called "image factoring". In this process the system can subtract out the foreground portions of images resulting in most recent or up to date image of the background (shelf). This image factoring approach can provide clean perspective of the inventory display structures such as shelves. Using that clean view, the technology disclosed can then use machine learning-based process to annotate the camogram.

The technology disclosed includes logic to perform semantic diffing to get pixel-level masks of taken items, which then serve as instance segmentation labels for training an instance segmentation model. The existing change detection techniques detect an item by drawing a rectangle or box around the item. To achieve a higher degree of precision, the semantic diffing system can use another technique called "segmentation" or "instance segmentation". Instead of drawing a box, the semantic diffing system can detect each pixel in the image and classify pixels as belonging to the item or not. Therefore, this technique is pixel-level accurate instead of a bounding box-level accuracy which can have inaccuracies around the edges of the bounding box. The pixel-level semantic diffing technique is computationally expensive to generate labels. The semantic diffing model described above can provide precise pixel-level masks. After doing some post processing the semantic diffing system can transform that into instance segmentation. This can reduce the processing cost of this technique to get instance-level segmentation data.

The semantic diffing system can run semantic diffing model to detect changes, and only annotate/automate parts which have been changed for more efficiency and real time camograms. The system can use output from a semantic diffing algorithm which detects what parts of the shelves changed over a period of time. This input signal is used for targeted update of the camogram. The trigger-based update can receive signals from semantic diffing system indicating change in a portion of the area of real space. The trigger-based update process enables maintaining a near realtime camogram by updating the camogram as changes are detected in the area of real space.

Product Category to Shelf Mapper

The product category to shelf mapper 1055 includes logic to narrow down items for classification by the section or area of the store it is positioned in i.e., beverage section, chips section, dairy section etc. There can be thousands or more of items (SKUs) in a store which can cause issues for detection accuracy when a particular item is being classified. However, the product category to shelf mapper 1055 includes logic to detect what part of the shelf and which part of the store, is captured in an image e.g., beverage section, dairy section, etc. This additional information can reduce the thousands of SKUs to a few SKUs (such as ten, twenty or so) in that shelf for further classification of items in that shelf. This can increase overall classification accuracy of the system and reduce processing time. The two step item classification process described above can be implemented using the logic implemented in this component. The technology disclosed can map the store based on shelf section and category of products (e.g., fresh foods, packaged goods, candy etc.).

The technology disclosed includes a hierarchical detection system (specially for similar SKUs of different sizes/flavors). The system includes ability to detect a family of SKUs e.g., a particular soft drink family or a sports or energy drink family etc. and then use extreme zoom capabilities for each SKU to have a much higher resolution and a richer signal to do fine grained detection on sizes and flavors in the identified family of items.

The technology disclosed includes logic to implement a hierarchical detection system in the areas in which there exist classification problems and where it is hard to classify sizes and SKUs. The hierarchical organization of SKUs can use family of SKUs and product catalogs as mentioned above. The system can use extreme zoom from cameras to read text off of the products.

Stocking Event Detector

The stocking event detector 1060 includes logic to target deeper camogram re-labeling after restocking (and other targeted efforts). The shelf can change more drastically at certain times of the day for example when restocking happens. The stocking event detector can provide signal to update the camogram after restocking has occurred to make it more accurate.

The stocking event detector 1060 can identify a stocking event and trigger the signal which can initiate targeted camogram update. The system can identify a stocking event for a shelf, and use that to trigger an update to the camogram for that section or that shelf. Stocking event can be detected by detecting a person with boxes close to a shelf and using logic to identify that stocking is happening. This can be used as a trigger to initiate camogram update for that section right after the stocking has occurred.

Planogram Matcher

The planogram matcher 1065 includes logic to perform planogram compliance. The system includes logic to initiate a process to determine compliance of camogram with the planogram. Planogram of a store provides the visual representation of a store's products and how those products are displayed on different shelves. Shopping stores can have their internal planograms which can be used by the system as in input along with their product list. Planograms can be stored in the planogram database 140.

If the planograms are provided as input to the planogram matcher 1065, the planogram matcher component can automate the ingestion of these planograms for each section and re-project this to camera image plane while generating a camogram. This can provide the technology disclosed with another signal apart from the SKU identification model detection. Planogram matcher can use a heuristic method to collate all these various types of signals to have the final SKU detections for an item in an image captured by a sensor. The technology disclosed can create a planogram for the store using the targeted high resolution camera zooming tool and SKU detection model.

If a shopping store does not have their internal Planogram, the technology disclosed can create a planogram for the shopping store using the targeted high resolution camera zooming tool and SKU identification model. The technology disclosed can use and/or create digital planograms as another added signal for classification of inventory items.

The technology disclosed includes logic to perform SKU drift analysis based on camogram data. The SKU drift analysis can identify correlation between SKU-drift and purchase frequency. SKU drift indicates changes in locations of inventory items (or an SKU) in the area of space. For example, SKU-drift can occur due to takes of inventory items (e.g., "shopping" of an inventory item), moving (re-placement) of inventory items to other places in the area of real space, and/or re-stocking of inventory items. Popular inventory items that attract a large number of shoppers can have a large number of take and put events associated with it. This can result in frequent changes of positions of the inventory items as a large number of this inventory item are purchased, relocated and/or restocked. Therefore, such inventory items (or SKUs) will have a high SKU-drift value. SKU-drift analytics can help store managers to plan re-stocking and/or reordering of popular inventory items, as well as re-locating inventory items to correct locations. The technology disclosed can provide SKU-drift data analytics using the camogram data. For example, the system can perform SKU drift analysis and determine how it is related to purchase frequency.

Visual Tag Encoder

The visual tag encoder 1070 includes logic to detect visual tags that can be used as additional inputs to detect and classify items. Such inputs can be fed as alternatives to camogram operations and review as part of a flavor/size determination. The technology disclosed includes logic to build brand, flavor, size into product catalog with a flavor taxonomy and dominant visual color. This information can be provided as an input to camogram operations and reviewed as part of a flavor/size detection for verifying the results of the SKU detection.

Existing systems often do not use signals from visual-based product identifications. Three dimensional visualizations of the products can be an important input. The visual tag encoder includes logic to detect packaging evolution for an item. For example, the appearance of a can of soft drink can change for Christmas or Olympics or other sporting events. This can be linked to hierarchical arrangement of data in product or catalog data structure. Color is also a very important signal for flavor variants such as for in soft drinks or energy drinks for example. Flavor information can be detected using a color signal.

The technology disclosed can build a visual tag encoding retail coordinates of a section so that any image capturing the tag can be registered against known store layout. The system can incorporate tag system into stocker app with front facing photo restocking confirmation. The technology disclosed can reverse the use case and use OCR based tag and camogram to detect possible weights and measures noncompliance in the store. The reverse signal or reverse information is also very valuable to retail. This can be considered as camogram compliance and used for compliance or enforcement, which is important from shelf labeling, shelf pricing perspective. The technology disclosed includes logic to combine various signals such as OCR tag with camograms to detect noncompliance with planograms. The technology disclosed can determine using information on the label to detect if there is a discrepancy in item placement of items with respect to a planogram.

Components of Event Detection and Classification Engine

The event detection and classification engine 194 comprises of a high-level component, an item-to-event matcher 1015.

Item-to-Event Matcher

The item-to-event matcher 1015 comprises an inventory event detector 1075, a product category to shelf mapper 1080, an item signals combiner 1085, an auto-camera selector 1090, a transactional log matcher 1095. Details of these components are presented in the following sections.

Inventory Event Detector

The inventory event detector 1075 includes logic to detect takes and puts of inventory items by shoppers in the shopping store. The technology disclosed can use various event detection techniques to perform this task such as semantic diffing model, region proposals model, stocking event detector model, etc. In addition, the technology disclosed can have parallel event detection pipelines and use the detection from a pipeline with highest detection confidence. The technology disclosed can use signals from inventory event detector 1075 to dynamically update the camogram as puts (or takes) of items are detected. The technology disclosed includes logic to use inventory events (puts and takes) as input to update the camogram. If puts have taken place on a shelf then updates to camogram can result in higher probability of correct classification of items.

Product Category to Shelf Mapper

The product category to shelf mapper 1080 includes logic to map catalog products to different product categories. Categories can include standard product categories with a finer taxonomy e.g., dairy product category can include items such as milk, yogurt etc. Each item in a category can be stocked in different brands, flavors, sizes, etc. A category such as dairy can have subcategories such as milk, yogurt, etc. These can be further divided into sub-categories. For example, milk subcategory can have whole milk, reduced fat milk subcategories etc. Similarly apparel category can include sub-categories such as shirts, trousers etc.

The technology disclosed can include a taxonomy of products. The taxonomy of products can help the system to narrow down products or product categories where the detection and classification of items becomes challenging due to lighting or placement of items. The technology disclosed can include these product categories and finer product categories in the product catalog. This can be useful not only for how the model performing in inference mode but also for model training. In some embodiments, the technology disclosed can be provided a shopping store's SKU list as input. In another embodiment, a custom catalog of SKUs can be created. The catalog can be saved as internal database of the SKUs. This may not be a global catalog across different stores as each catalog is based on different tenants. If the same product is being sold by different tenants or different shopping stores, these are not usually linked to a same product. The technology disclosed can also include logic to build and use a global product catalog which can be used across multiple tenants.

The technology disclosed includes logic to classify the shelves of a store and map to different product categories this can help to create a 3D model of the store and synthetic data creation also can help to restrict the SKU search space.

The technology disclosed includes logic to create different types of augmented data set for different types of shelves. For example, in some cases augmented data is not useful or augmented data generated for a particular shelf type may not apply to other shelf types. For SKU searches, it has been observed that augmented data set in some instances may not be useful for the fridge section. Based on such classification of shelves the technology disclosed can use different synthetic data set creation techniques for different categories of shelves. Using the shelf categories, the system can build synthetic training data accordingly per shelf.

Item Signals Combiner

The item signals combiner 1085 includes logic to combine signals from multiple components and/or engines as described above and use the signals as input to detection and classification of items.

Auto-Camera Selector

The auto-camera selector 1090 includes logic to select appropriate cameras to provide a monitor a good view of shopper to detect takes (or puts) of items.

The system can implement one or more of the following three methods to implement an auto-cam (or auto-camera) selector.

In one implementation, a machine learning model is trained using training data that are either the visual features of the shopper in each camera, their pose in each camera, or both. The label for each input in the training data is a "best camera" for which camera can best see an action happening out of the collection of cameras that can see the shopper. The technology disclosed can then train the camera detector with a variety of traditional machine learning and deep learning approaches.

In another implementation, the technology disclosed can select a best camera for each location in the store. For this, first the technology disclosed discretizes the store's floor into a grid, and for each grid cell a camera is selected which camera is the best camera to see an action happening in that grid. Camera coverage per grid can be determined to select best camera for an area of real space or for a grid. Further details of placement of cameras in an area of real space are presented in U.S. patent application Ser. No. 17/358,864, entitled, "Systems and Methods for Automated Design of Camera Placement and Cameras Arrangements for Autonomous Checkout," filed on 25 Jun. 2021, now issued as U.S. Pat. No. 11,303,853, which is fully incorporated into this application by reference.

In yet another implementation, the technology disclosed can build an expert system that takes as input the 3D pose of the shopper and their 2D poses in each camera, and calculate which camera has the closest and least obstructed view of the shopper's hand involved in the action.

It is understood that technology disclosed can use other techniques in addition to the three listed above for auto-camera selection to select a camera providing a best view of the customer. In some implementations the camera selection logic can select the top three, top five, or more cameras with a best view of the shopper. The reviewer can then select one of the recommended cameras to view the shopper.

Transactional Log Matcher

The transactional log matcher 095 can use transactional logs from traditional point of sale system matched up to the shopper tracking system's detections to backwards update the camogram when there are mismatches.

The transactional log matcher 1095 includes logic to use the point-of-sales (POS) transactions and match the transactions to the detections for takes and puts of items generated using the camograms. The transactional log matcher can pair those up and determine if there is a mismatch. The technology disclosed also includes logic to go backwards (in the detection and classification process steps) to correct the errors in classification of items. The mismatches can also be used to go back and identify errors in other processes of the system. This is also referred to as "shadow mode" operation, i.e., the camogram-based system is run in parallel to track the transactions in the cashier-less store to continually monitor and improve the system. Transactional logs can be close to ground truth but may have noise in it due to cashier errors, etc. In some instances, this can be considered as an audit.

The technology disclosed includes the following features that support generation and updating of camograms.

Bootstrap labels of SKUs: A common concept in machine learning is human in the loop, the humans can be doing the labeling, or the annotation. Following this, the technology disclosed can train a machine learning model to detect using that labeled training data. The results of the model can be manually checked mode and mistakes of model are labeled. The mistakes are important to relabel and feedback into machine learning system. The technology disclosed applies this technique in the context of labeling of items on shelves and training machine learning models to detect and classify items.

1-shot learning with PTZ image crops: The technology disclosed can improve search performance by using 1 PTZ image crop.

The technology disclosed can use a heterogeneous camera system. It can use Pan/Tilt/Zoom cameras to focus on multiple shelves and capture high resolution images for different shelve planes. The technology disclosed can use different sets of cameras while tracking people where instead of high-resolution images, the image capture speed (frame per second) gets more priority. A challenge is to identify SKU location and do inventory mapping or generate a camogram on these high-resolution image planes and project it back to the high-speed camera image planes. To generate the camogram on these high-resolution image planes for the first time, the system can create image crops based on the model detected SKUs which are then identified by the labelers and enrolled to the product search catalog only once. If the system performs the SKU search on these enrolled SKUs, the search works well and the system can achieve high accuracy in this SKU search method. The system includes logic to run the search model over all the enrolled SKUs per shopping store.

The technology disclosed includes SKU search with few-shot learning using augmented images per SKU. Below we describe 1-shot learning, few-shot learning, and zero-shot learning, that can be used by the camogram generation and updating components.

In 1-shot learning the SKU search method is based on only 1-catalog images. The workflow for this starts with one catalog image and metadata and based on the product category the system can pass the catalog image through the data augmentation pipeline and it will create a dataset for that SKU. The system can then include that dataset to the search pipeline and model will start generating detections for that SKU.

In a few-shot learning the system starts with catalog augmented images along with few labeled PTZ image crops. The system can train a prototypical network model as a backbone for feature extraction and based on that system will develop the search and ranking model.

Zero-short learning is most relevant when a new SKU is introduced. When the model detects a new SKU (based on low detection score threshold and other heuristics) the technology disclosed can use targeted zooming tool for PTZ camera and can capture a high-resolution image of that SKU. The technology disclosed can then enroll that image crop to the PTZ-to-PTZ image search model. If the planogram already has that SKU information, the system can use some heuristic method to label that newly identified SKU while enrolling to the model without having any human in the loop. This enrollment is sufficient for the model to start working on that new SKU.

Very reliable zero shot or one shot models, with reliable confidence thresholds: The technology disclosed can use automatic capture of high resolution snaps of low confidence SKUs using PTZ cameras and high zoom (and automated creation and enrollment of 3D SKU assets for new SKUs, or new packaging etc.). The technology disclosed includes logic to identify products with one image. The technology disclosed can have the ability to zoom in to any part of the store using one of the cameras installed in the shopping store. With very reliable thresholds, the system can zoom in to items that are difficult to classify and provide the model with a very high-resolution image for the SKUs identified with low confidence. The technology disclosed can also use the high-resolution images of shelves to create 3D assets in automated way and feed those to the system for training and inference.

Analytics purely based on camograms: This feature is particularly useful when running more frequently/automated and semantic diffing to measure activity and changes on a shelf, and analyze metrics for each SKU like popularity, volume, movement etc. The technology disclosed can run various analytics using the camograms. For example, the technology disclosed can identify which SKUs are popular, which SKUs are not selling, etc. using up to date maps of shelves.

The system can use stocking events and stocking photos to automate the camogram generation process. The system can further integrate that into a coordinate system. The technology disclosed can include a tool that (scanner app) which can also be used as a stocking app.

Another feature of the technology disclosed includes combining 3D spatial coordinates with retail coordinates (e.g., category management layouts, etc.). Retail coordinates are a human semantic system for referring to locations on shelves. For example, which section? which shelf (i.e., which row in the section)? and how many items over from the beginning of the shelf (row). This information allows people to unambiguously refer to the exact location of a product inside a store. The technology disclosed, using a 3D map of the store, can label points in 3D that directly correspond to retail coordinates. For example, "Section 6, Shelf 3, 4th from the left" can be found in the 3D map, which then allows the system to have a direct x, y, z coordinate positions corresponding to the retail coordinate.

With this information, the system can then seamlessly switch back and forth between the coordinate systems. This is useful for many things. For example, with the scanner app. If the operator using the scanner app knows they are scanning items on Section 6, Shelf 3, then as we scan items from left to right the system can then automatically know exactly where those items exist in 3D. From there the system can use that 3D information for the various use cases in described here (like reprojecting those 3D points into 2D for each camera to build a camogram).

Two Camera View Tool

Technology disclosed can be used to implement software tools that support operations of a cashier-less shopping store. The operations that can be supported by the tools can include verifying inventory events in the area of real space and checking assignment of items to shoppers. A "two camera view" tool is an example system that uses the camograms that are generated and updated using systems and methods presented herein. The features of the two camera view tool can be invoked by various user interface elements. The two camera tool provides user interface elements that support reviewing a visit of a subject to a cashier-less shopping store and reviewing actions performed by a shopper during the visit. The two camera view tool can be deployed as a web application. A reviewer can use the tool to review a visit of a subject including various events detected by the subject tracking and inventory events detection systems associated to the shopper during his visit to the shopping store.

Figure 11A:
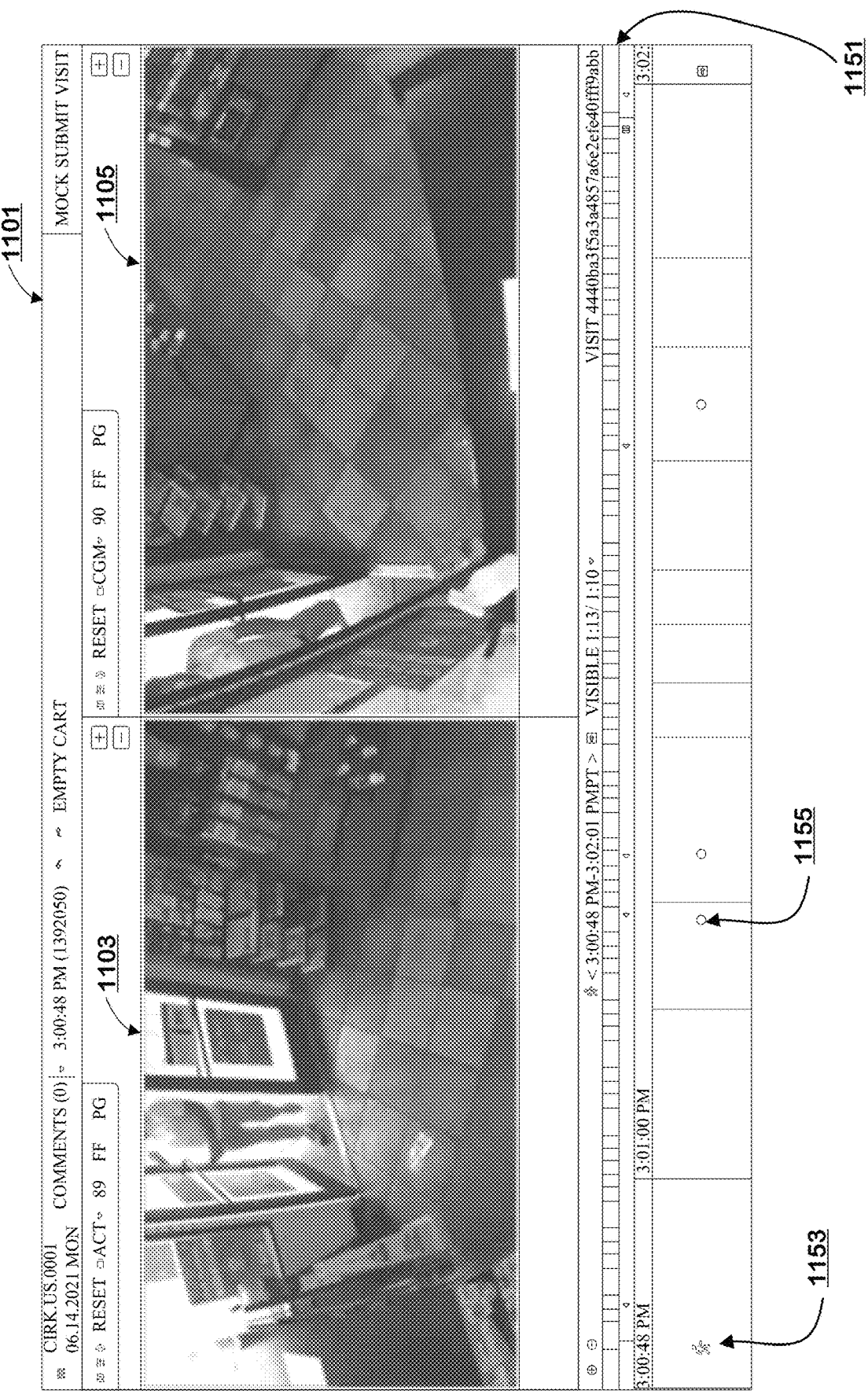

FIG. 11A shows a user interface 1101 of the two camera view tool with two windows 1103 and 1105 displaying sequences of images received from two cameras in the area of real space. The system includes logic to select cameras that provide best view of the shopper in the store. The user interface 1101 shows the sequences of images from the two cameras selected by the system. In the example presented in FIG. 11A, the two cameras selected by the system are oriented towards the entry/exit to the store. Both cameras have overlapping fields of view of the area of the real space. The bottom portion of the user interface 1101 presents a timeline 1151 of subject's visit starting with the entry timestamp presented with an icon 1153. Symbols such as circle 1155 indicate events during the subject's visit. The events can include taking of items from shelves and putting items back on shelves. Other events such as a check-in event can be indicated with a "$" sign on the timeline. Additional review tools such as a scrubber is also provided to view different portions of the subject's visit to the area of real space.

The two camera view tool also includes "auto camera switching" (or auto camera selection) feature to automatically switch to video stream from another camera that provides better view of the visitor. The technology disclosed automatically determines which camera provides best view of the subject.

A Scrubber range can be selected e.g., 8, 15, 30 seconds or 1 minute long segments, the reviewer can extend the time beyond the selected segments. With smaller segments, the reviewer can view more frames per second and hence smoother video. Time range longer than 1 minute can also be selected.

Visitor review can be conducted on one subject at a time or for a "group shopping". In one implementation, the technology disclosed can identify a group of shoppers that are shopping together. The reviewer can jump between shoppers of the same group.

The system includes logic to shift from one visitor (or subject) to another. The user interface can include a button that can be used to shift from the current visitor to another visitor in the store.

Image adjustments such as zoom or rotation can be performed by the two camera view tool. A reviewer can manually select cameras or use the automatic selection of cameras for reviewing the visit of the subject to the area of real space. The auto camera ranking system can recommend the best cameras for viewing the subject and the inventory events. The auto camera ranking system can also generate other recommendations for camera selection. The recommended cameras can provide good view of the subject.

The technology disclosed assigns a visitor identifier (ID) that is a randomly generated identifier. Checkmark on a visitor means that the visitor has associated a credit card with their visit. Other information can include a timestamp including a frame number. The reviewer can quickly jump to certain events in the timeline 1151 by selecting indicators 1153, 1155, etc., to assist in a review process of determining whether a shopping cart or shopping list data is accurate.

Figure 11B:
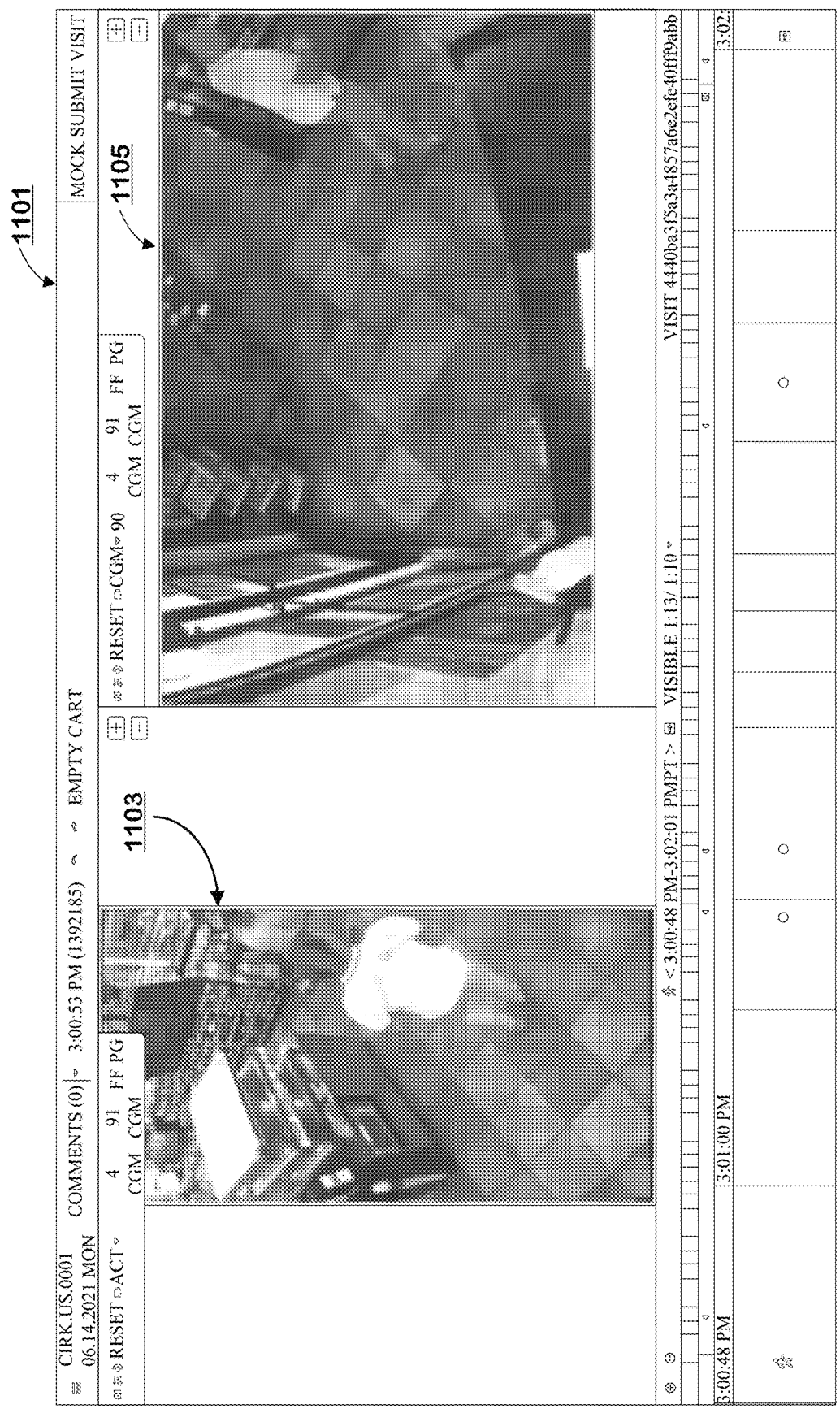

FIG. 11B shows that the two camera view tool changes the source camera for the left window 1103 to give a better view of the shopper as the shopper moves in the area of real space. For example, the view in the left camera window changes to a view from another camera the window 1103.

Figure 11C:
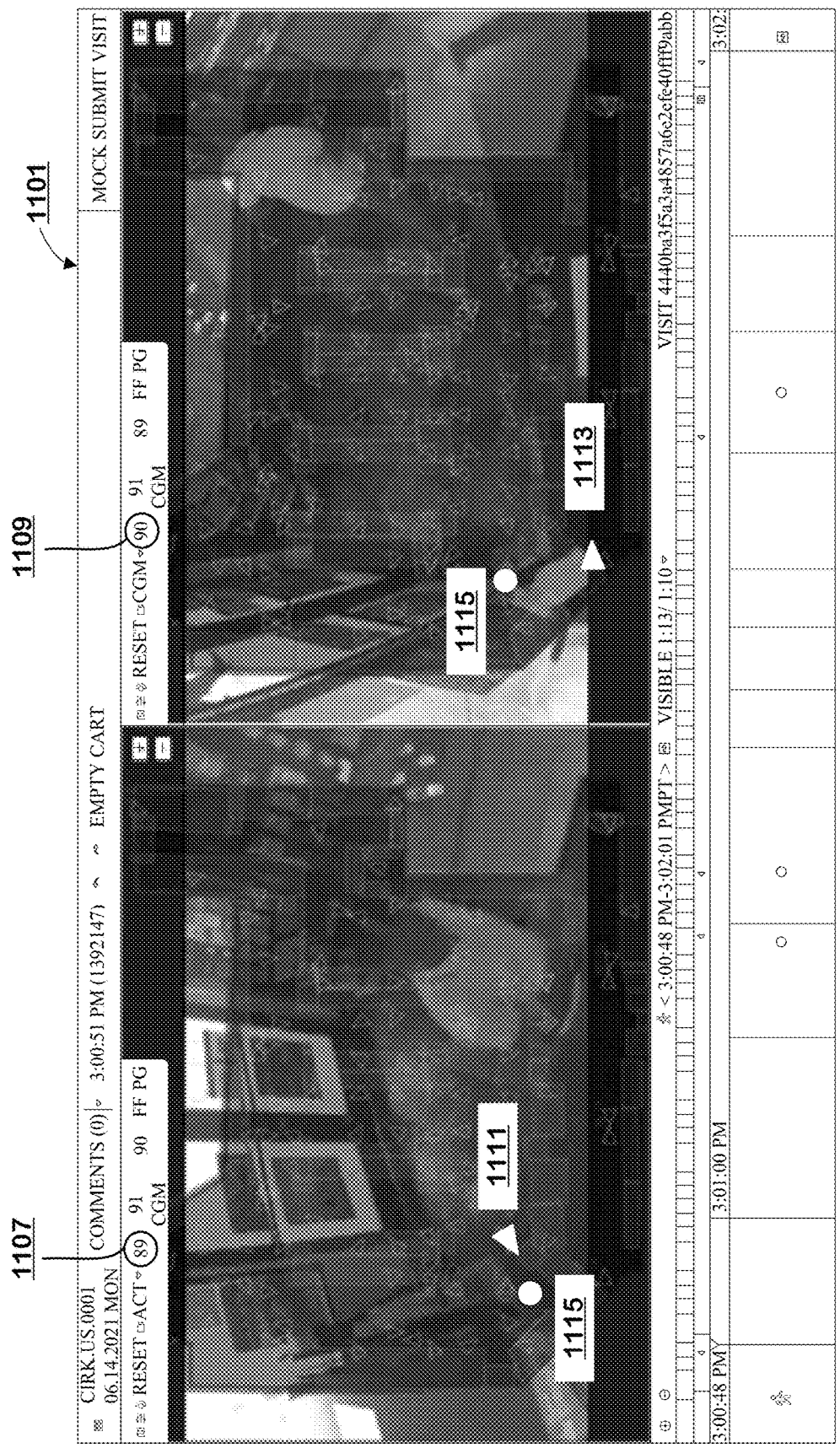

The system can provide a map view of the area of real space indicating camera positions and orientations as shown in FIG. 11C. A map view can be positioned on one camera window or both camera windows. The active camera in respective window is shown by a colored triangle. For example, in the left camera window active camera is camera number "89" (label 1107) and the position of the camera in the map of the area of real space is indicated by a colored triangle 1111. The direction or orientation of the camera is indicated by the direction of the triangle. Similarly, the source camera (or active camera) for sequences of images in the right camera window is number "90" (label 1109). The position of the camera in the right camera window is shown by the triangle 1113. The position of the subject in the area of real space is shown in respective camera windows as a colored circle 1115.

Figure 11D:
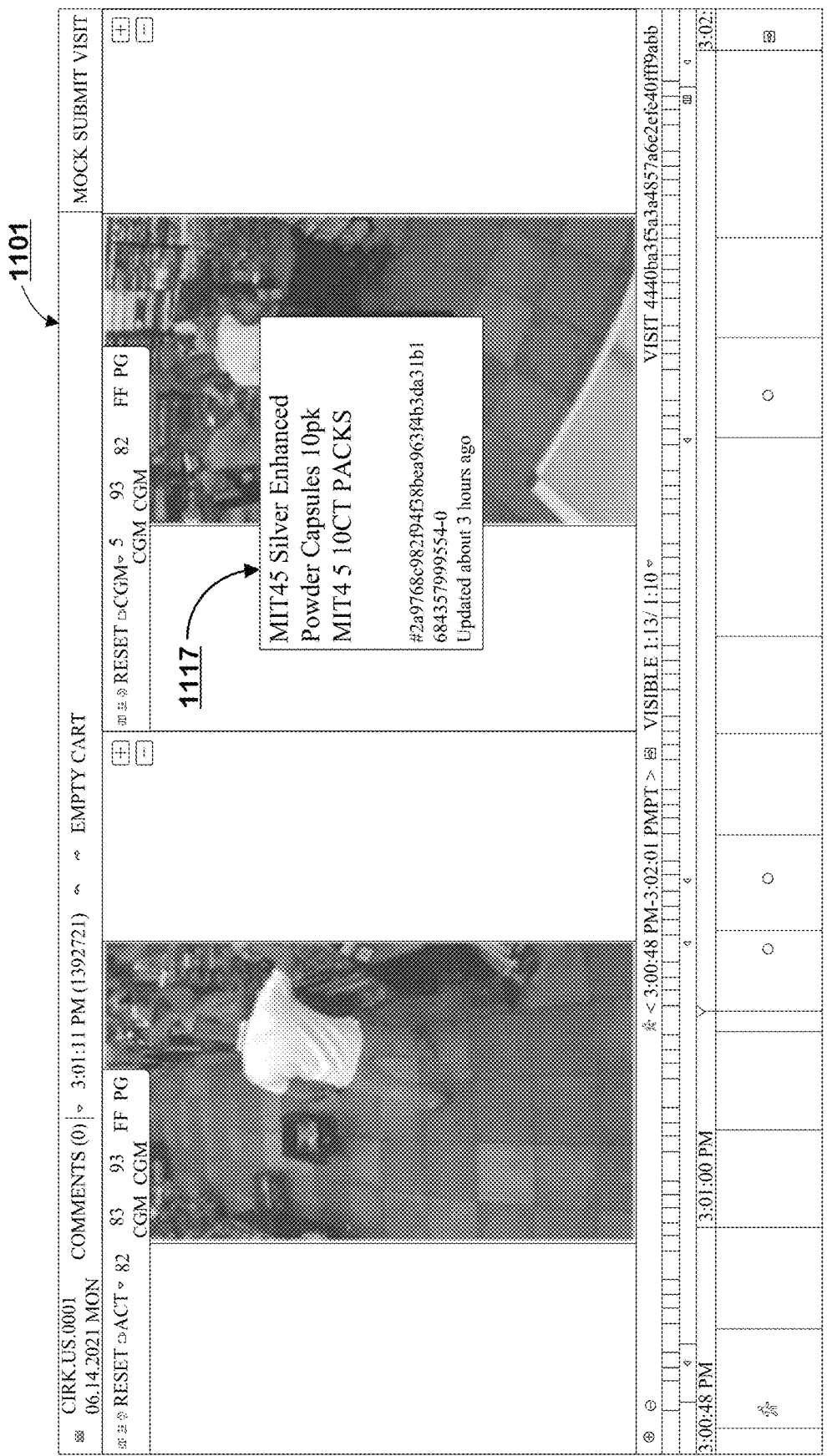
Figure 11E:
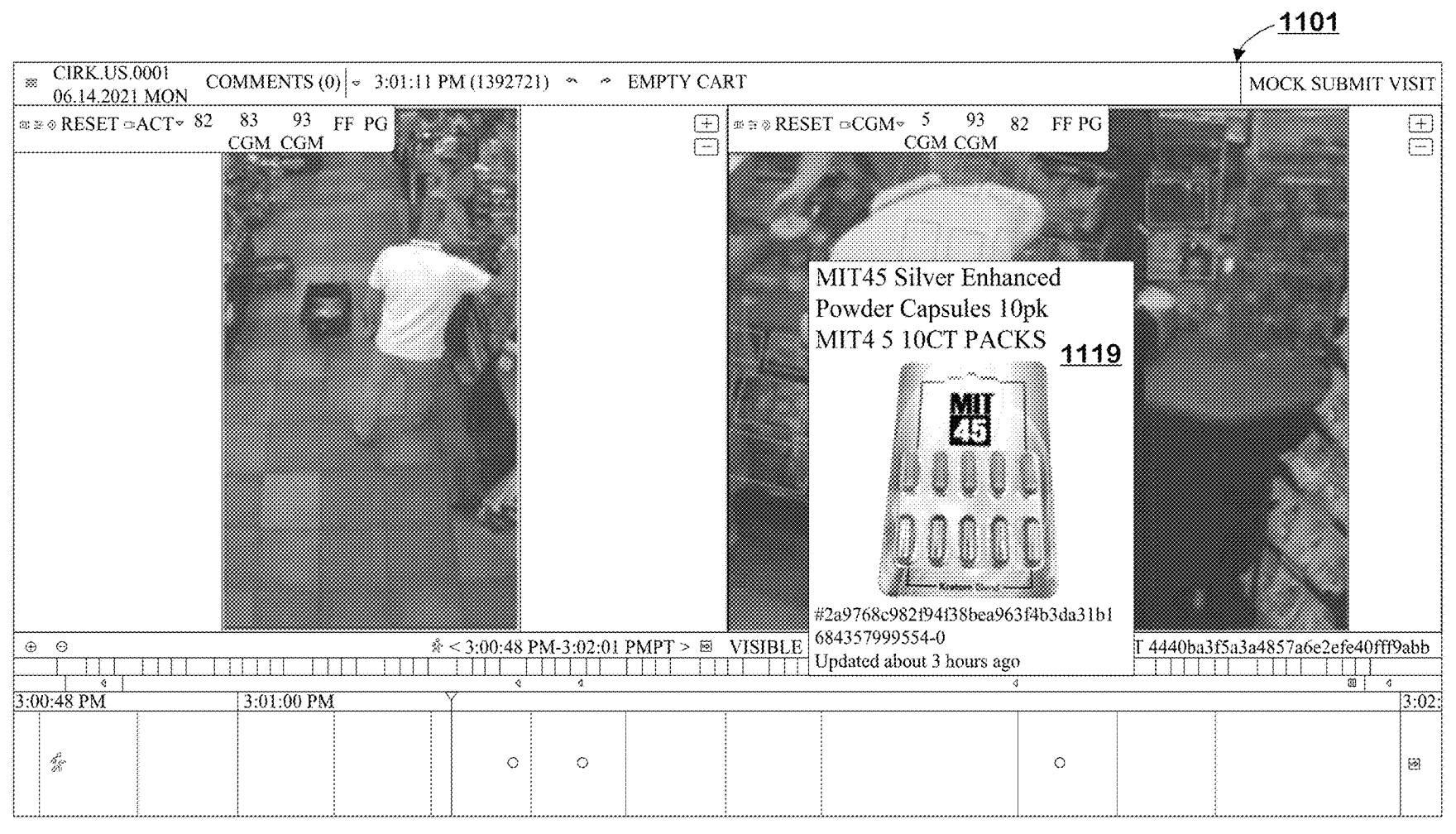

FIG. 11D presents an inventory event detected by the technology disclosed as the subject takes an item from a shelf in the area of real space. The technology disclosed detects that the subject has picked up an item. In one embodiment, a reviewer reviewing the inventory event associated with a subject can open a "camogram view" on the two camera view tool using a user interface element. The camogram view can show bounding boxes around items positioned in shelves. The boxes are annotated. The annotations are displayed when a pointer (such as mouse) is positioned on or close to a box in the camogram view or when a portion of the camogram is selected by a reviewer. For example, the details of the item including the name of the item, the unique identifier such as SKU and other information can be displayed on the camera window 1117. FIG. 11E shows another view of the selected inventory item in a box 1119. The information in the box also includes an image of the inventory item. This can help the reviewer to validate if the same item was picked by the subject during the inventory event under review.

Figure 11F:
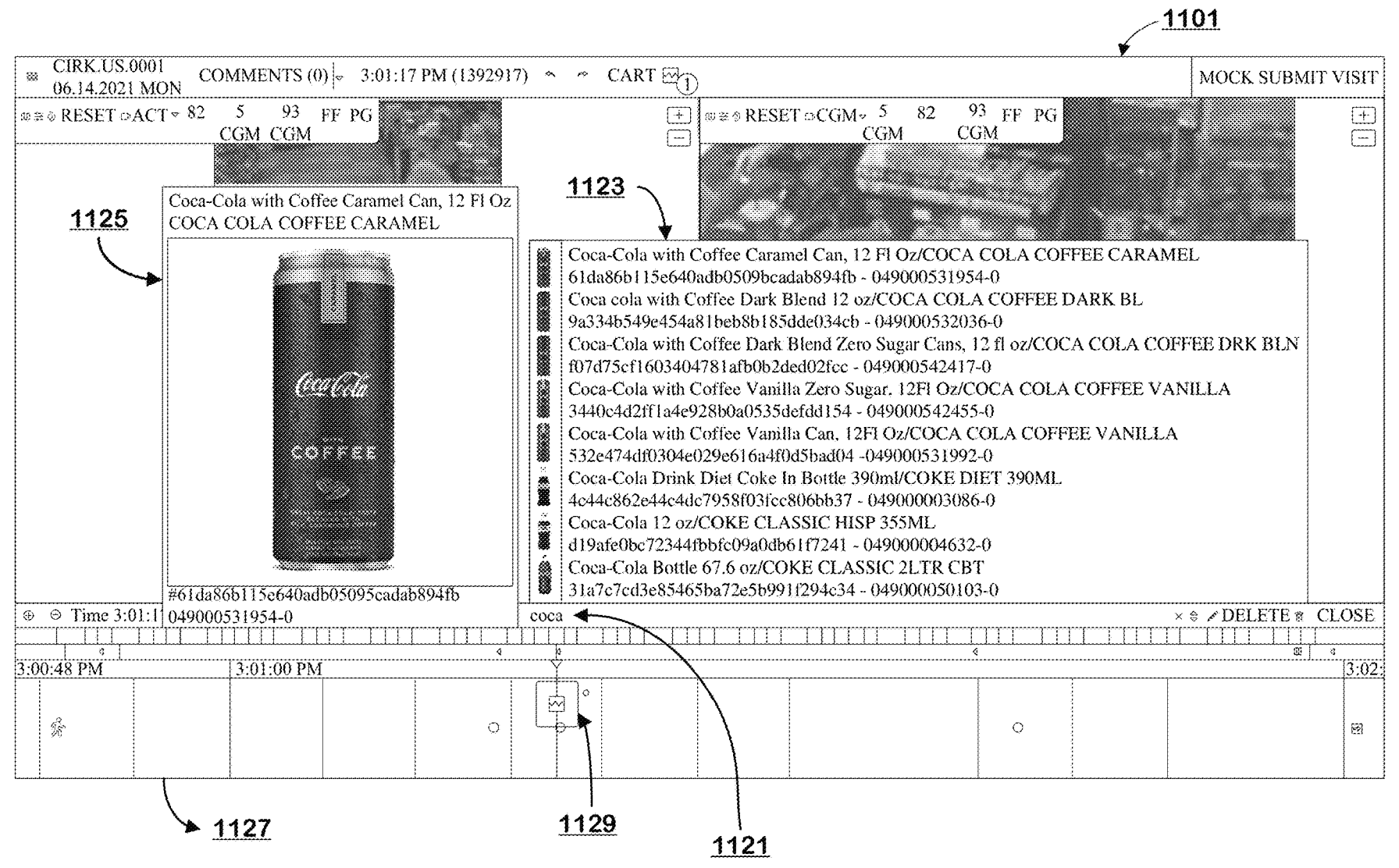

In some cases inventory items of the same product (such as a particular brand of soft drink) are stocked in the shopping store. For example, the soft drink of a same brand in a same size can be stocked in multiple flavors. The event detection system can sometime make an error in detecting the particular flavor or size of a can of that soft drink taken by a subject. A reviewer while reviewing the inventory event can enter a product's name or a first few letters of the product's name in a search bar 1121 as shown in FIG. 11F to check the details of that item. A list of items matching the description entered in the text box are displayed to the reviewer for selection in a window 1123. The two camera view tool displays a list of inventory items stocked in the store in a list view (1123) along with images of respective items, their respective sizes, flavors, SKUs, and other relevant information. A reviewer can select an item in the list to view the particular item in more detail in the window 1125. The reviewer can select the item from the list to add the item to the shopping cart of the customer. Note that the inventory "take" event is presented on the timeline bar 1127 at the time when the event is detected by the system. The timeline bar 1127 also displays a graphical icon 1129 of the item that was taken by the subject in that inventory event. The two camera view tool also provides the functionality to add multiple of items taken by a subject in the subject's shopping cart. The reviewer can review the actions performed by the subject until the subjects exits the store.

Figure 11G:
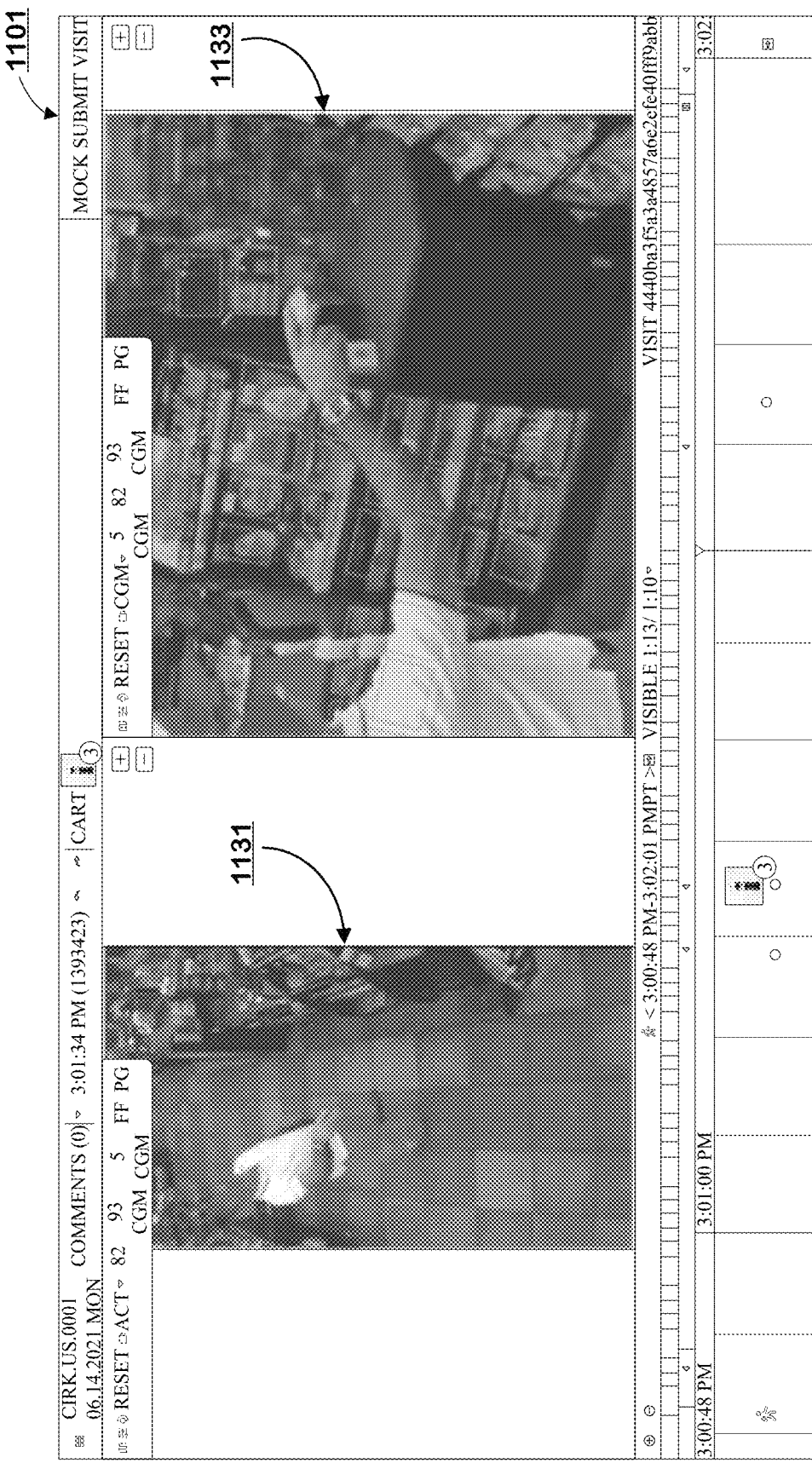

FIG. 11G shows the left (1131) and right (1133) windows of the two camera view tool that can be used to display different views of the area of real space. The first camera view window 1131 can present actions the subjects during their visit to the shopping store. The actions can be puts and takes of items. The second camera view window 1133 can display camograms annotations layer on items in shelves. The annotations can be in the form of boxes placed around items in inventory display structures. The boxes can be in different colors indicating different items. For example, a box of a same color can be used for items of a particular SKU. This can help in visually distinguishing different items placed on a shelf in the camera view in window 1133. Once the reviewer has verified that the shopping cart data for the shopper is correct or after the reviewer has updated the shopping cart data to correctly reflect the items taken by the shopper, then the shopper can be charged for the items identified in the shopping cart data and a digital receipt can be send to the shopper.

The technology disclosed can use different approaches for annotations on the annotation layer. In one embodiment, the system can use a trained machine learning model to generate annotations. Human annotators can also review selected annotations to detect and correct annotations, if required, using the user interface elements provided by another software tool that is built using the technology disclosed. The other software tool is referred to as a camera annotation tool. The technology disclosed can use planned placement of items on shelves such as in planograms and use those to generate annotations in a programmatic way. Further details of the camera annotation tool are presented below.

Camogram Annotation Tool

The technology disclosed includes a camogram annotation tool (also referred to as "CamogramViz") that can be used to annotate the items on shelves. The CamogramViz can be used in the Camogram generation process. The CamogramViz tool can be used to provide a feedback loop to camogram annotation from machine learning models. The CamogramViz tool can be used to annotate and/or review annotations produced by machine learning models that detect items with respective SKUs as viewed from different cameras at respective image planes in the area of real space.

The CamogramViz tool can access a Cameraservice API provided by the technology disclosed along with camogram model pipeline endpoint and provide the inventory items (SKUs) that are detected by the machine learning model per camera image at regular time intervals. Annotations provided by the model can be manually reviewed to add or edit the SKU labels associated with each bounding box enclosing an item in a shelf. The annotation work can be performed on the low-resolution camera images or de-warped fisheye view images. The technology disclosed can also provide high-resolution front facing images to the CamogramViz tool. These images can be manually reviewed and annotated at various zoom levels in the images for a shelf or a portion of shelf to identify the details of an item (SKU). For example, size, flavor and other such properties of an inventory item are difficult to identify in the low-resolution images, but can have significant impact on the accuracy of the checkout process. Such details can be reviewed in camogram annotations provided by the annotation tool.

Figure 12A:
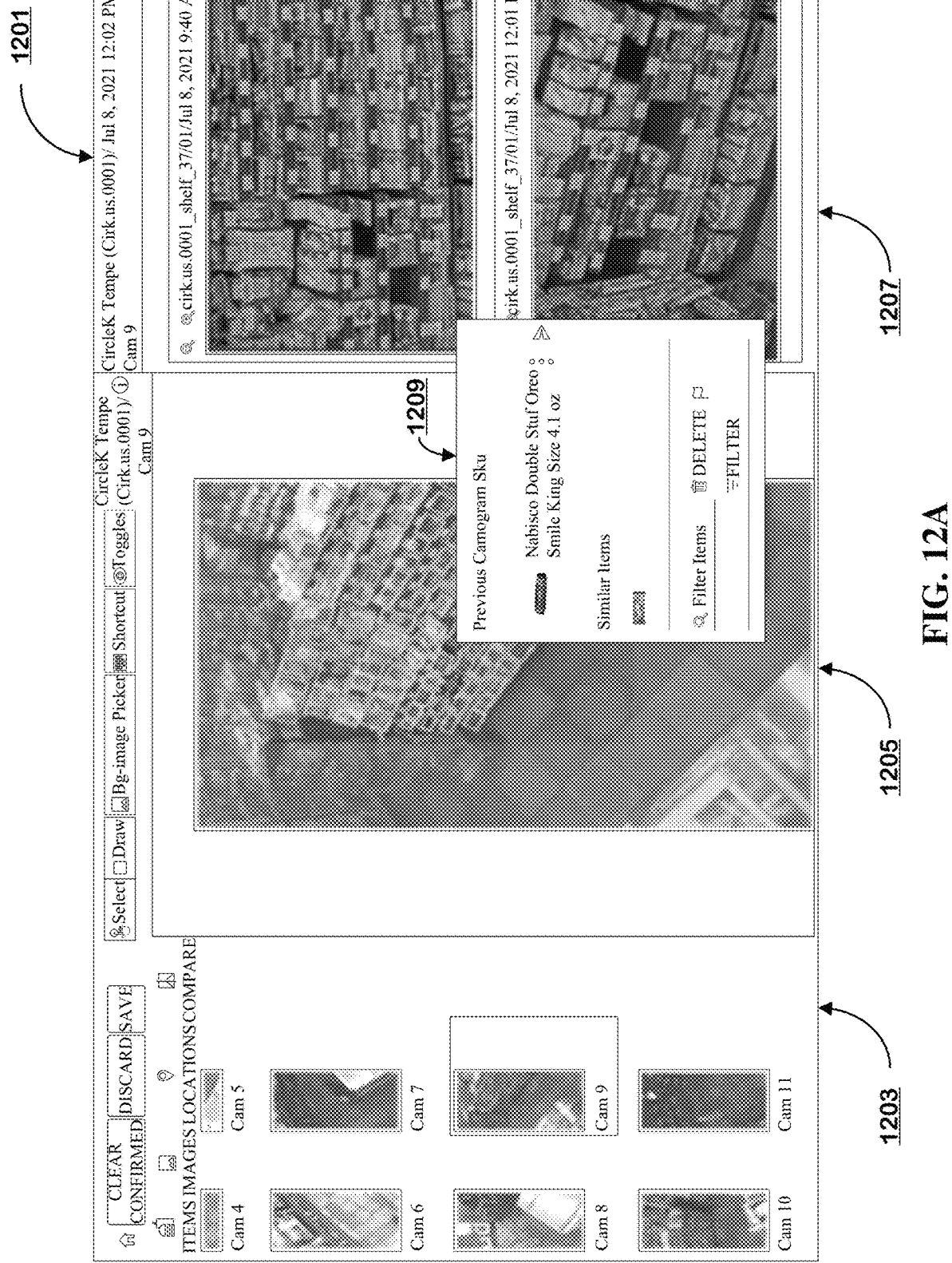

FIG. 12A presents a user interface 1201 of the CamogramViz tool. The user interface is divided into three areas referred to as a left panel 1203, a middle panel 1205 and a right panel 1207. The left panel 1203 in the user interface shows all camera views to be annotated. The middle panel 1205 shows the annotated inventory items (SKUs) within the active area for that shelf and the right panel 1207 shows corresponding high resolution front facing images of the shelf. Selection of any box within the middle panel 1205 shows the inventory item information in a window 1209. The window 1209 can display similar inventory items (or similar SKUs) available in shopping store's product catalog so that the annotator or reviewers can review minor differences between all related inventory items in the store. The related items can belong to a same product category or provided by a same product manufacturer/distributor or positioned in same area of the shelf as the query item, etc. The technology disclosed can use all these criteria in combination or separately to select similar items for display in the window 1209.

Other usability features of the CamogramViz tool include color coded bounding boxes around inventory items for different SKUs. All items with the same SKU have bounding boxes of same color. This feature improves efficiency of reviews of annotations as inventory items with same SKU appear in same colored bounding boxes.

If the SKUs are missing in high-resolution images (as the low resolution and high-resolution image capture frequencies are not the same), annotators can also compare the image with Store planogram which are already ingested and stored in the camogram database 180.

Figure 12B:
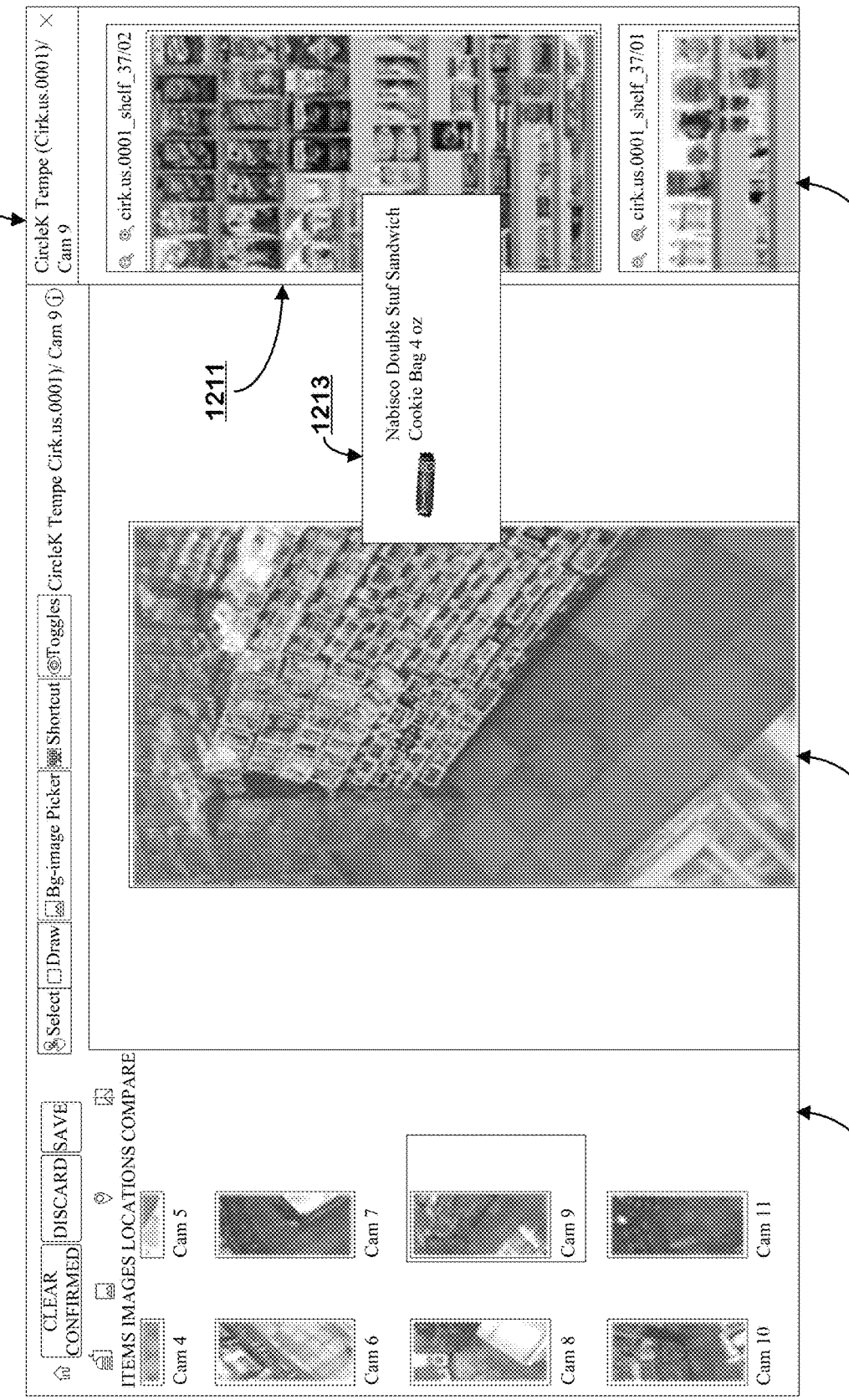

FIG. 12B shows a user interface in which a planogram 1211 for a shelf under review is shown in the right panel 1207. The user interface also shows the name, brief description and image of a selected inventory item in a window 1213, which is selected from the planogram. Upon completion of review of the camogram, the CamogramViz tool can save the camogram in camogram database 180 which is then accessible by other services like the shopping store app or for use by analytics models.

Figure 12E:
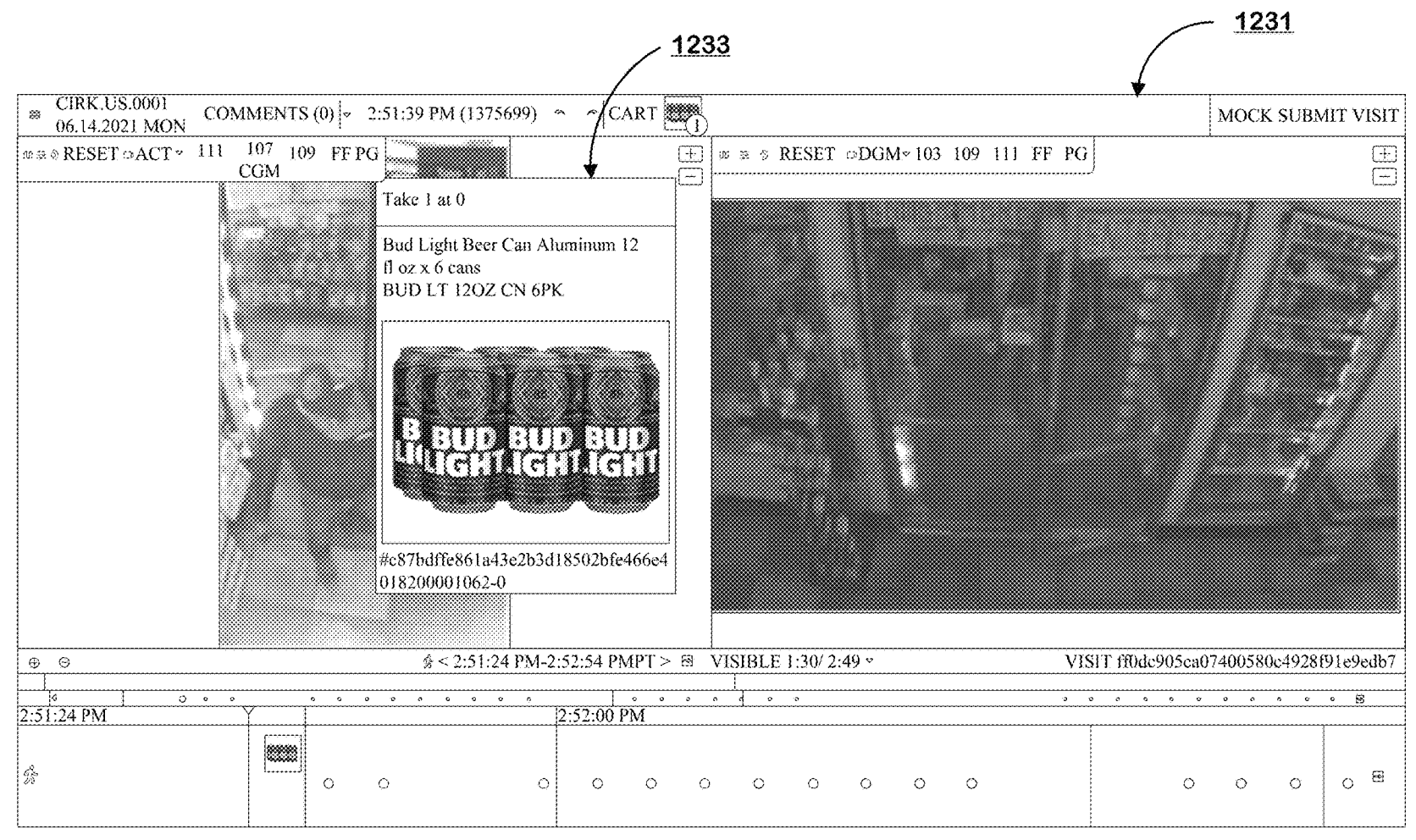

FIGS. 12C 12D and 12E show a sequence of images from captured from cameras in the area of real space for a subject's visit to the shopping store. The subject enters the store as shown in two camera view tool's user interface 1231. The subject takes a six-pack of drinks as shown in the user interface of two camera view tool in FIG. 12D. Upon selection of the item from the camogram from where the subject picked up the item, the two camera view tool displays a window 1233 including the details of the item taken by the subject (FIG. 12E).

Figure 12F:
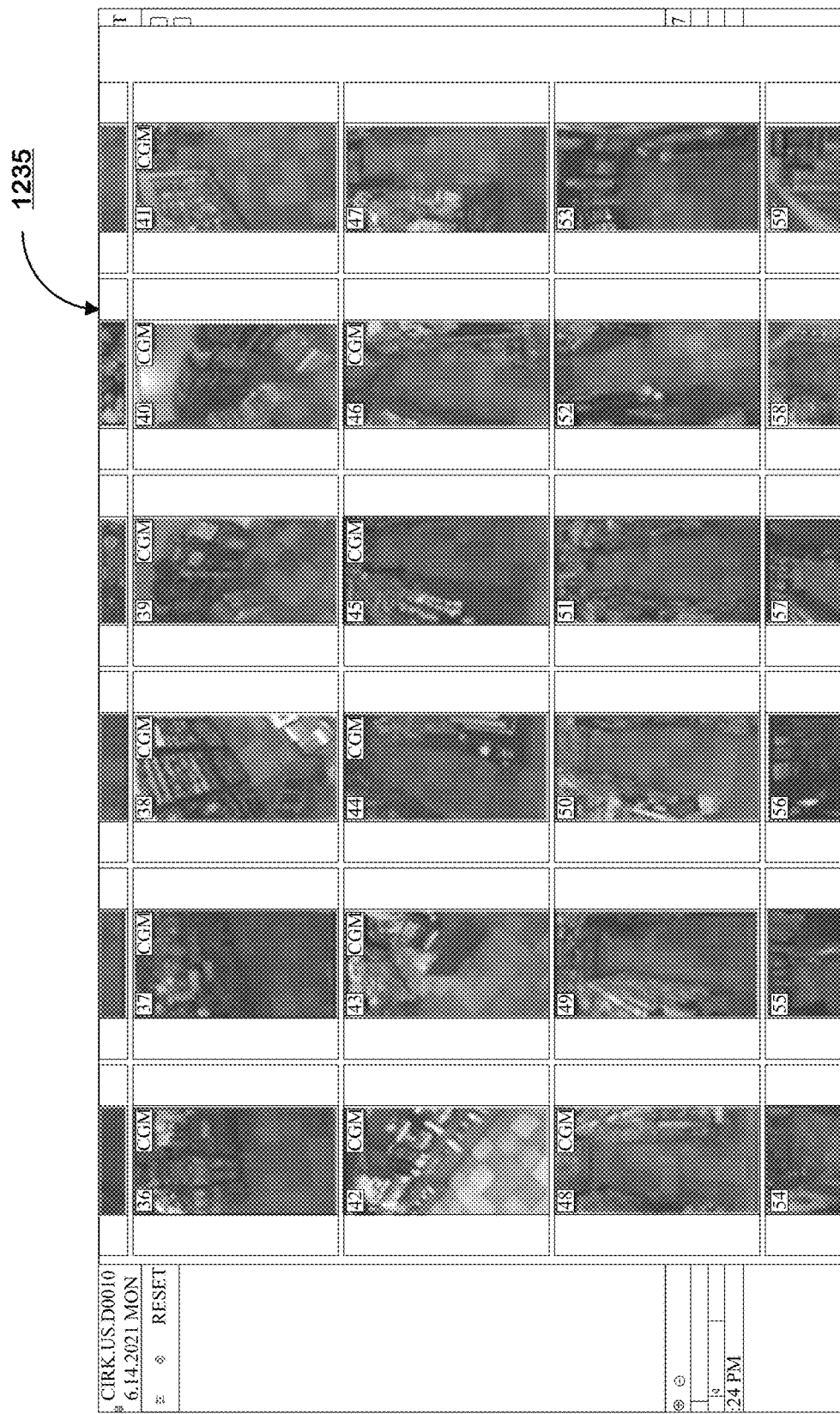

FIG. 12F shows camera views 1235 from various cameras in the area of real space. A camera that provides best view of the subject and/or the inventory item can be selected from the camera selection view 1235.

Figure 12G:
Figure 12G:
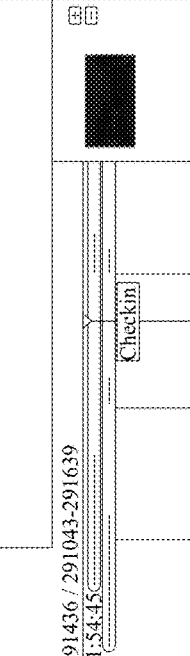

FIG. 12G shows a user interface 1237 of a two camera view tool for reviewing check-ins of subjects in the area of real space. The subjects can scan their cell phone or other mobile devices on a scanner in the shopping store to check-in. FIG. 12G shows an image of a subject scanning the mobile device for check-in on a kiosk in the shopping store (1239). Other methods can be used for check-in such as asking subjects to provide their information via text, audio, etc. at the check-in kiosk. Check-ins of visitors can be displayed on the user interface using specific identifiers such as "$" signs with the timestamp and camera frame identifier. A dispute in purchase such as an item contested by a subject can be resolved by a reviewer reviewing the shopper's visit using this system. The reviewer can pull-up the visit that was related to a digital receipt that is in question by the shopper.

Figure 12H:
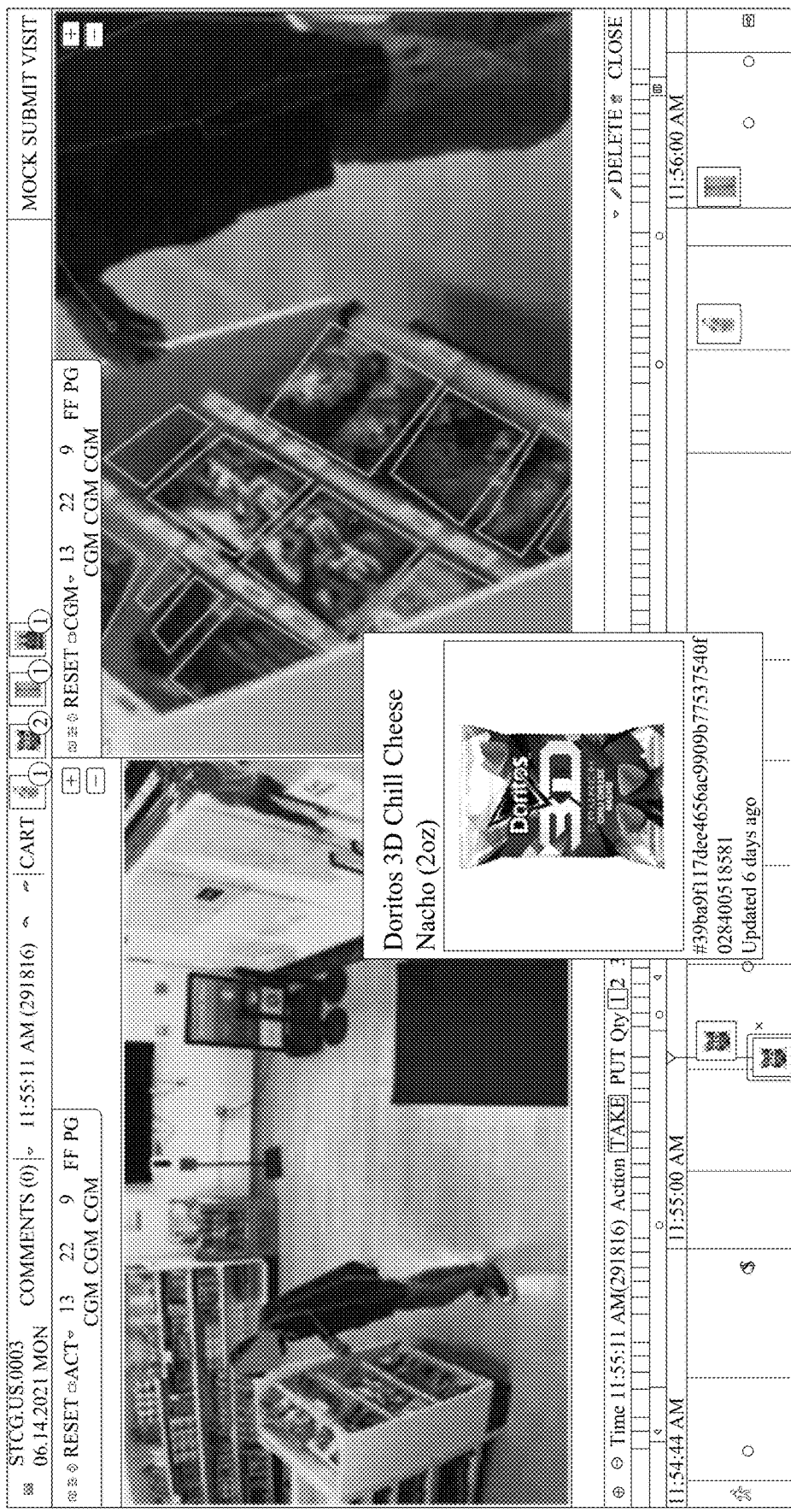

The system can be used in a "deep-dive" process in which the system can compare clients' (a shopping store) receipts and to receipts generated by the cashier-less system to identify any discrepancies. For example, a reviewer may not see an item being taken or the annotation may have been incorrect or not up to date on the shelf. FIG. 12H shows the process in which the items taken by the subject per the digital receipt are being compared with inventory events associated with the customer using the two camera view tool.

Additional Features of Two Camera View Tool

The technology disclosed can utilize different types of cameras including 360-degree cameras installed in the area of real space. The two camera view tool enables a reviewer to drag and drop a user interface element in the map of the shopping store to get a 360-degree view of the shopping store. The view automatically rotates to keep the subject in a center or close to the center of the images captured by the camera. The technology disclosed includes logic to project the locations of skeletons representing subjects in the store from 2D space to 3D space. The technology disclosed can use that information to detect the subjects who have checked in at a check-in location as shown below. The subjects who have checked-in can be represented in the two camera view tool in a different color such as in a green-colored skeletons. The subjects who have not checked-in can be displayed in a different color such as red-colored skeletons. Additional icons, text or other information can be displayed on a skeleton representing a subject such as the subject's identifier, a recently taken item, etc. Subjects who are currently in the process of checking-in can be presented in a green-colored box near the check-in kiosk. The green-colored box can indicate the subject has been successfully identified. The technology disclosed can then associate the subject's account information with the visitor for payment processing.

Figure 13A:
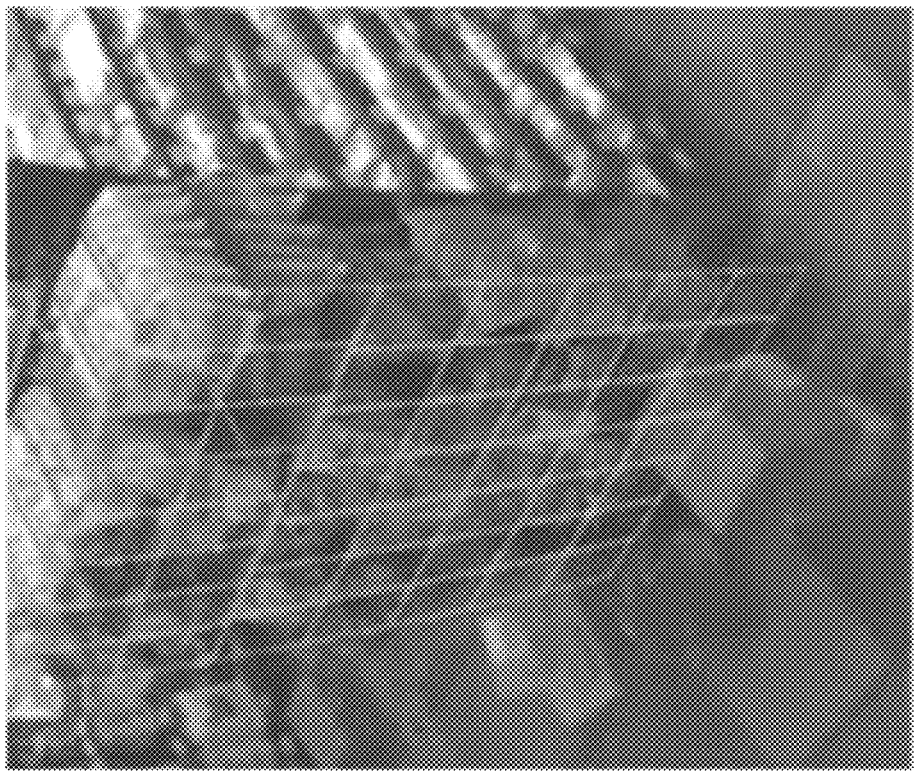
FIGS. 13A, 13B, 13C, 13D, 13E, 13F and 13G present additional features of a two camera view tool.
Figure 13B:
Figure 13C:

As the technology disclosed includes logic to create three-dimensional poses of subjects and display structures in the area of real space, the technology disclosed can present three-dimensional grids on inventory display structures as shown in FIG. 13A. The information regarding placement of items in the area of real space as included in planograms can be given as input to the two camera view tool. The technology disclosed includes logic to use that planogram information and the 3D grid of shelves to create a camogram as shown in FIG. 13B. In such an implementation, the technology disclosed uses 3D grids and planograms to draw boxes on the inventory display structures by using the geometry of the 3D grids and the information in the planograms as shown in FIG. 13C.

Figure 13D:
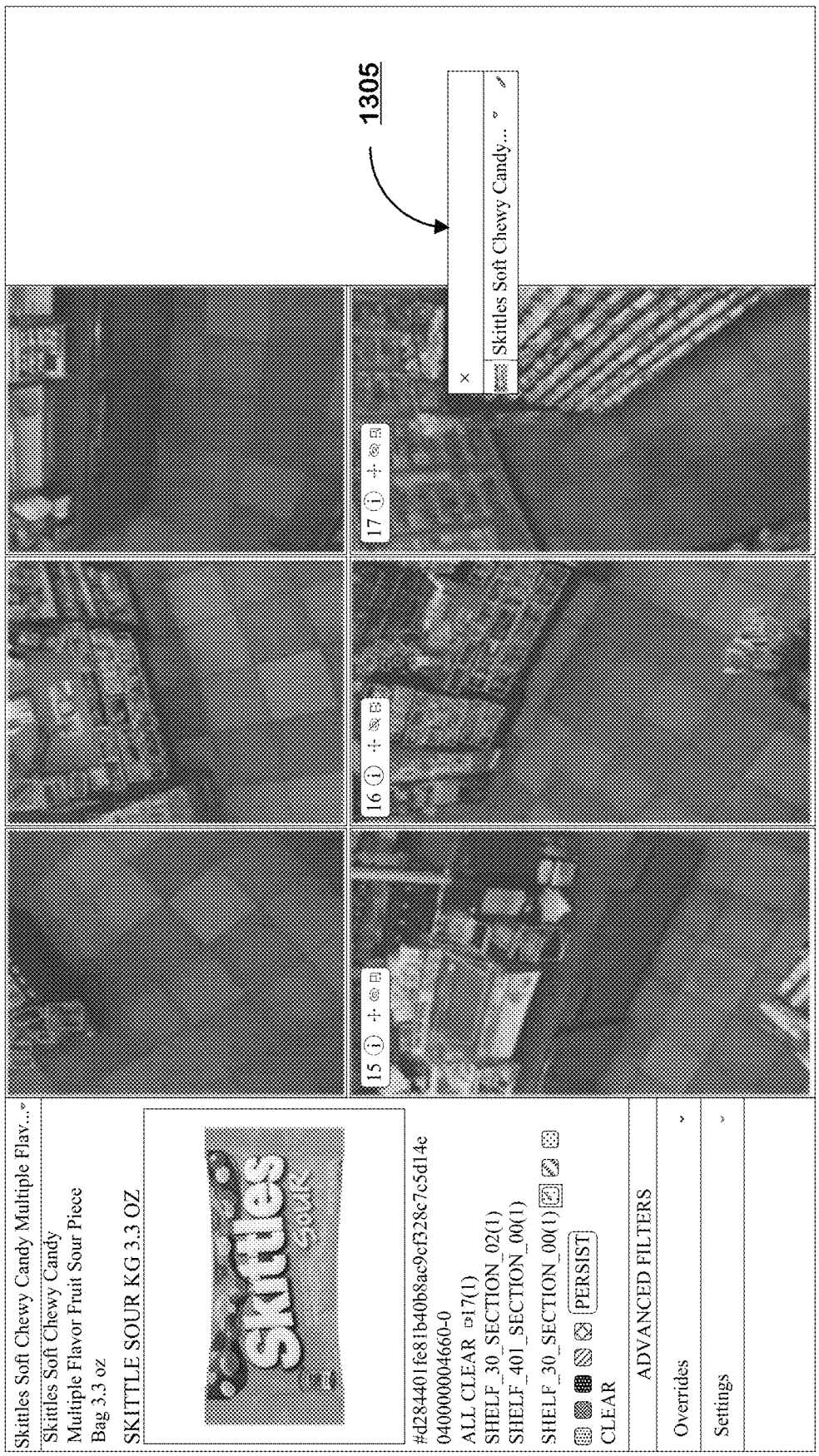

FIG. 13D presents an interface of the two camera view tool that can be used to view an annotation 1305 of an inventory item placed in the area of real space. A reviewer can select an item from the camogram to view the inventory item data such as item name, description, SKU, price, size, flavor, etc.

Figure 13E:
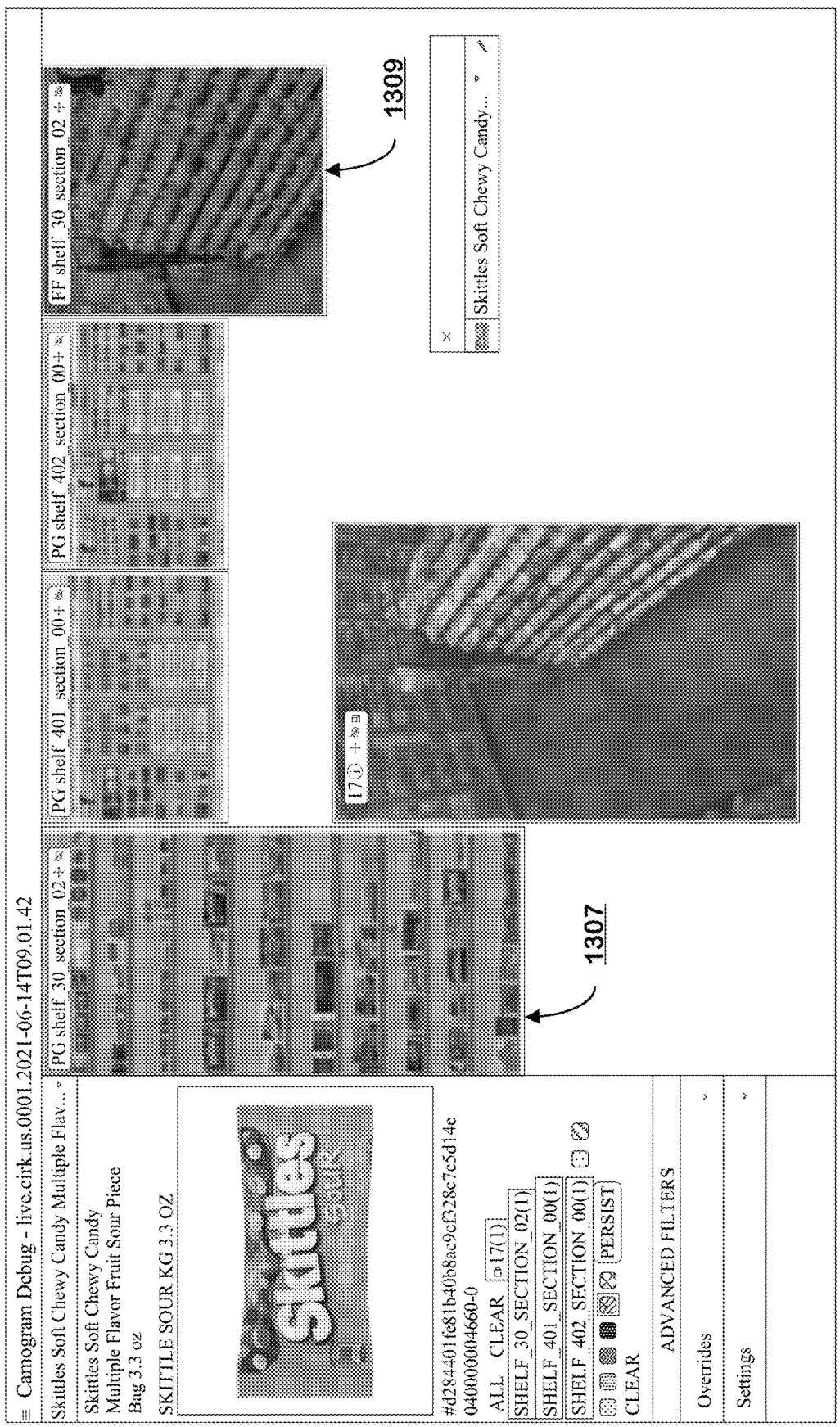
Figure 13F:
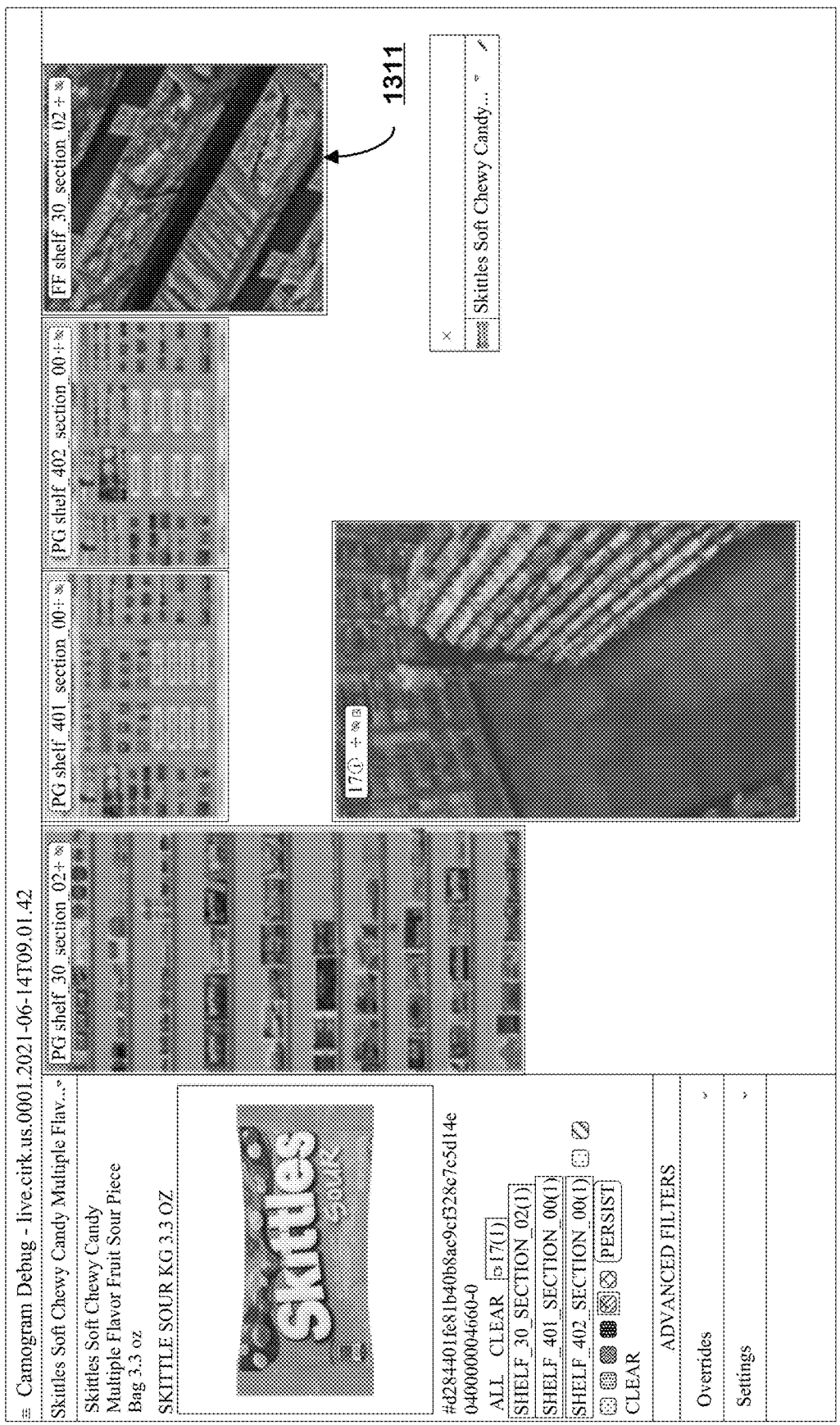

FIG. 13E presents a user interface of the two camera view tool that shows planograms of the store which have also been annotated (1307). The right window in the following image shows a high-resolution image 1309 of the shelf. FIG. 13F shows a zoom in on the high-resolution image to view a particular item more closely (1311).

Figure 13G:
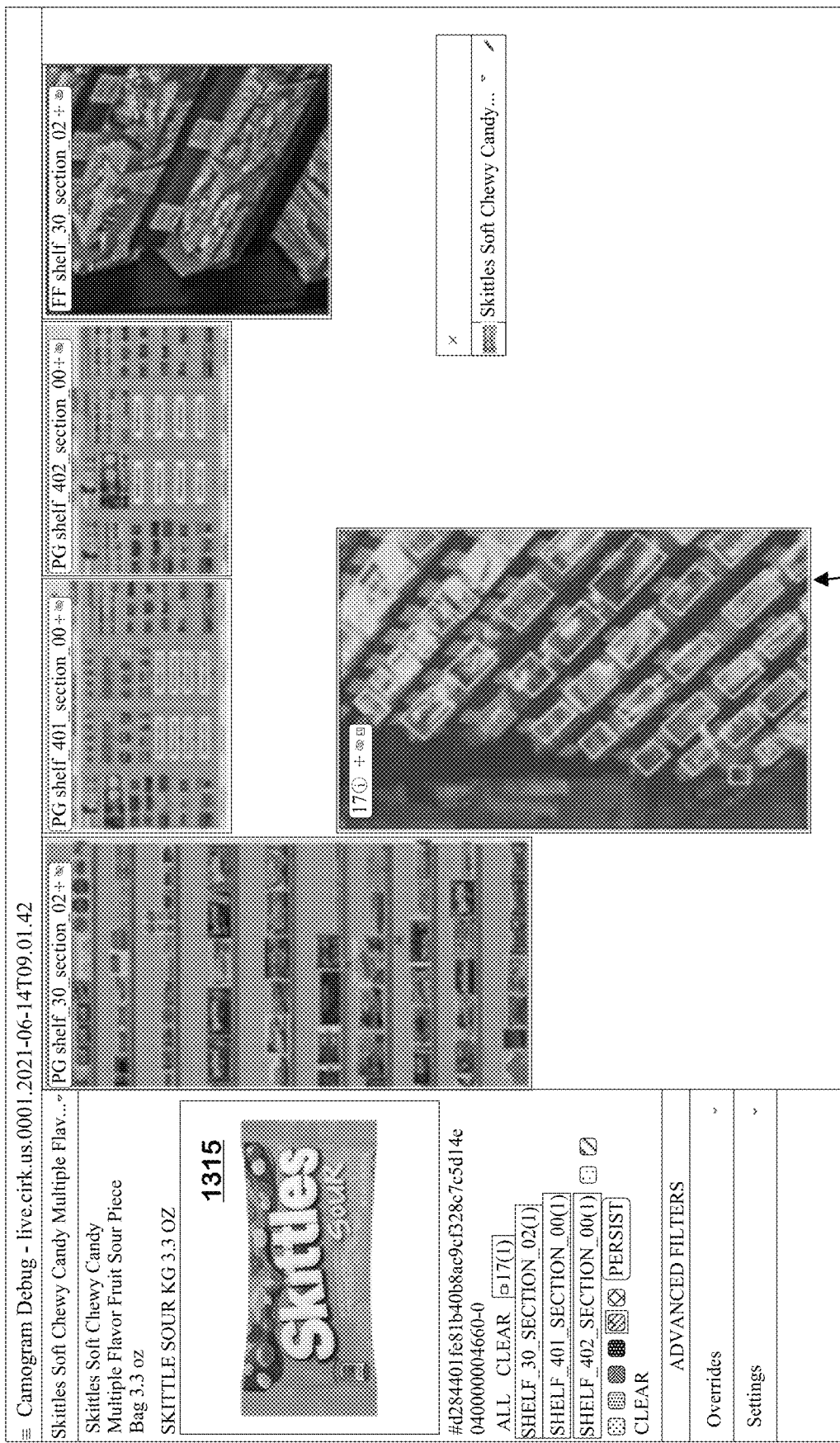

FIG. 13G shows another user interface of the two camera view tool in which the image from the default camera is in the middle window. The "Skittles™" item is indicated in a box on the left side of the user interface (1315). A color can be selected by the reviewer for a particular item. In such case, all items of with the same SKU are displayed in boxes of the same color. The high-resolution images are captured after a longer time intervals to save bandwidth and processing requirements. For example, a high-resolution image can be received every 30 seconds, or after one minute or even after longer time intervals such as two minutes or more. The technology disclosed receies low-resolution images at video speeds. FIG. 13G shows a zoomed in view 1313 of the high-resolution image in the middle window of the two camera view tool.

Figure 14A:
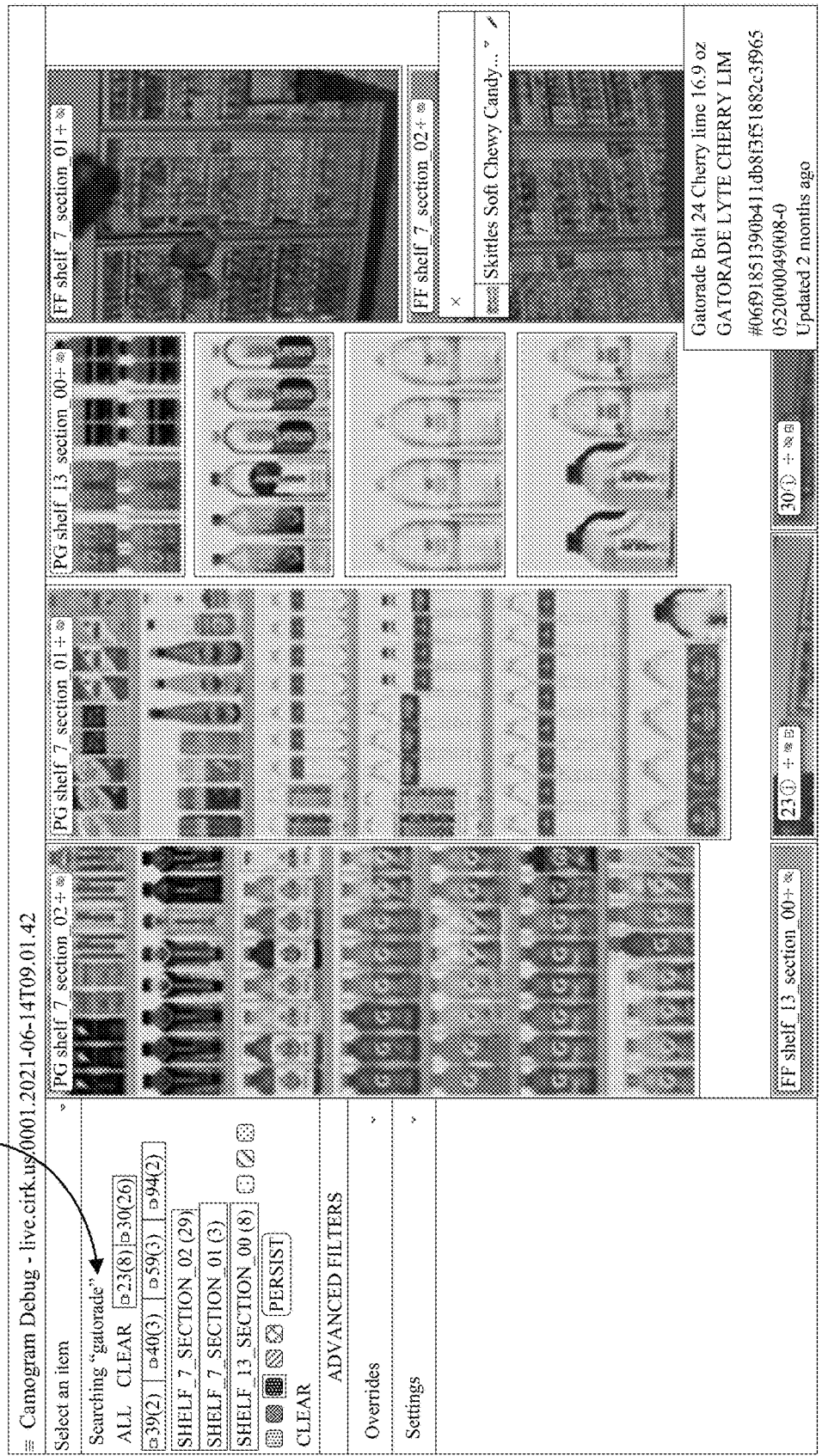

FIG. 14A shows item search functionality provided by the two camera view tool. An item name or a SKU can be used to search for an item in the shopping store. For example, in FIG. 14A search is performed for a "Gatorade™" drink product using the product name as a search keyword (1405).

Figure 14B:
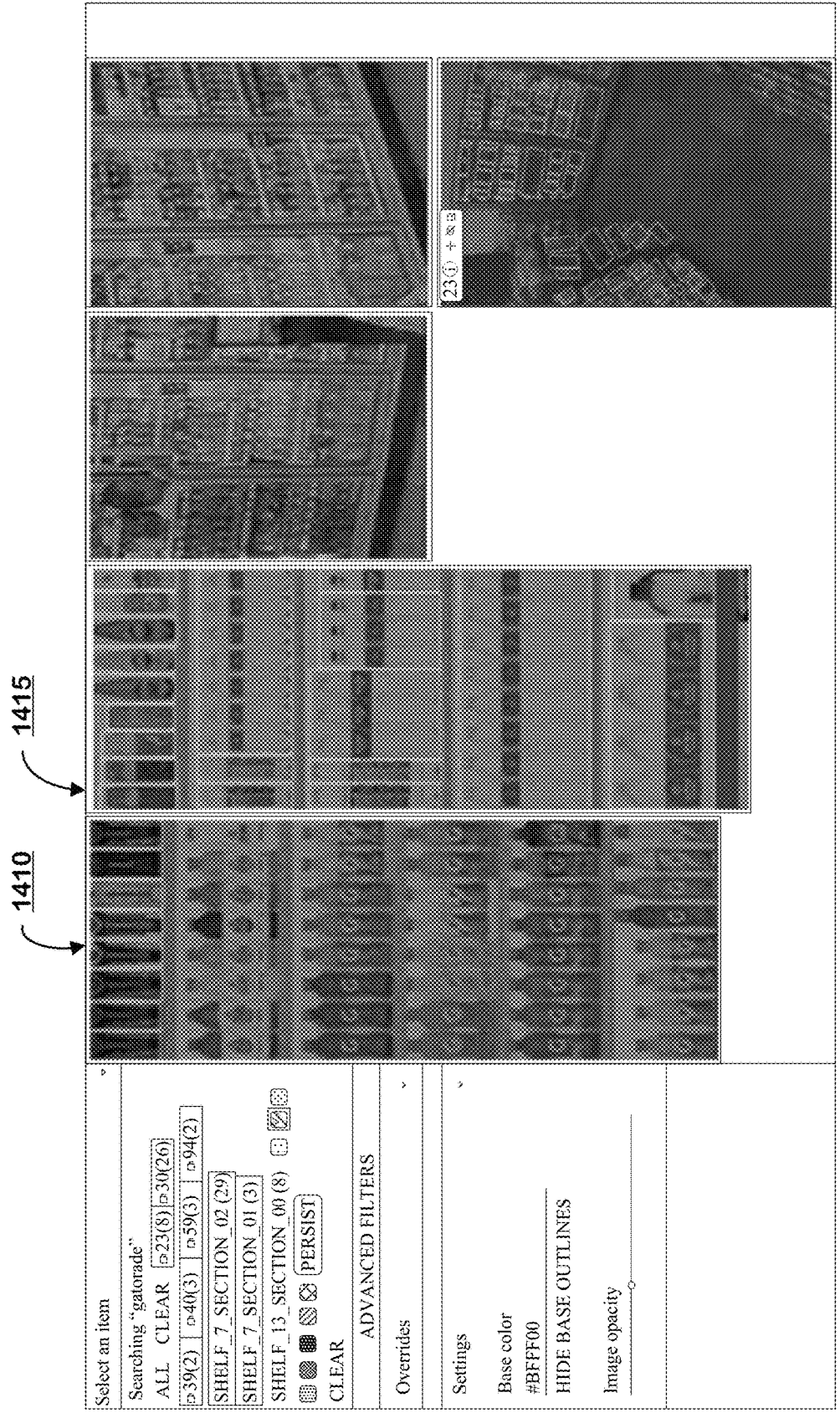
Figure 14C:
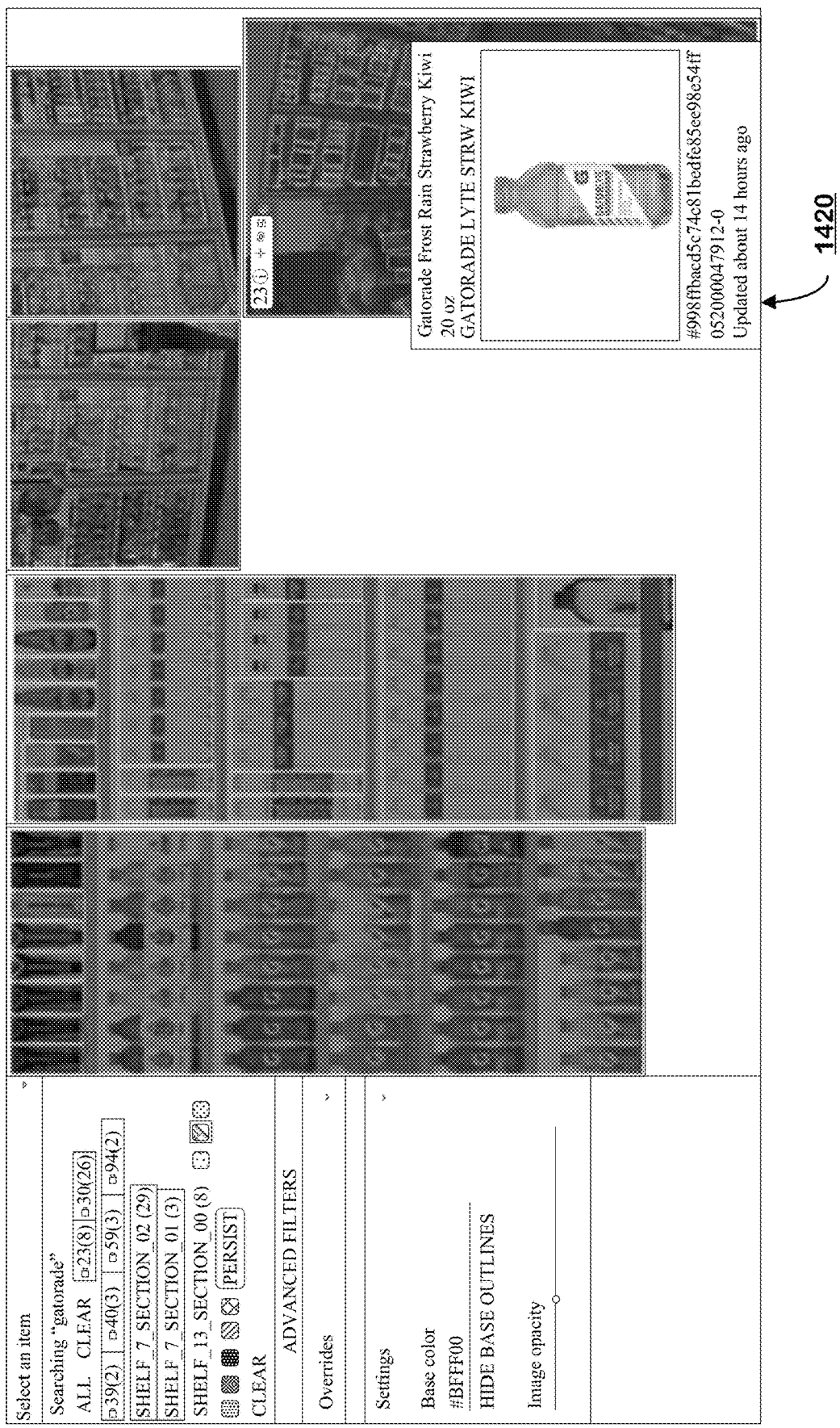
Figure 14D:
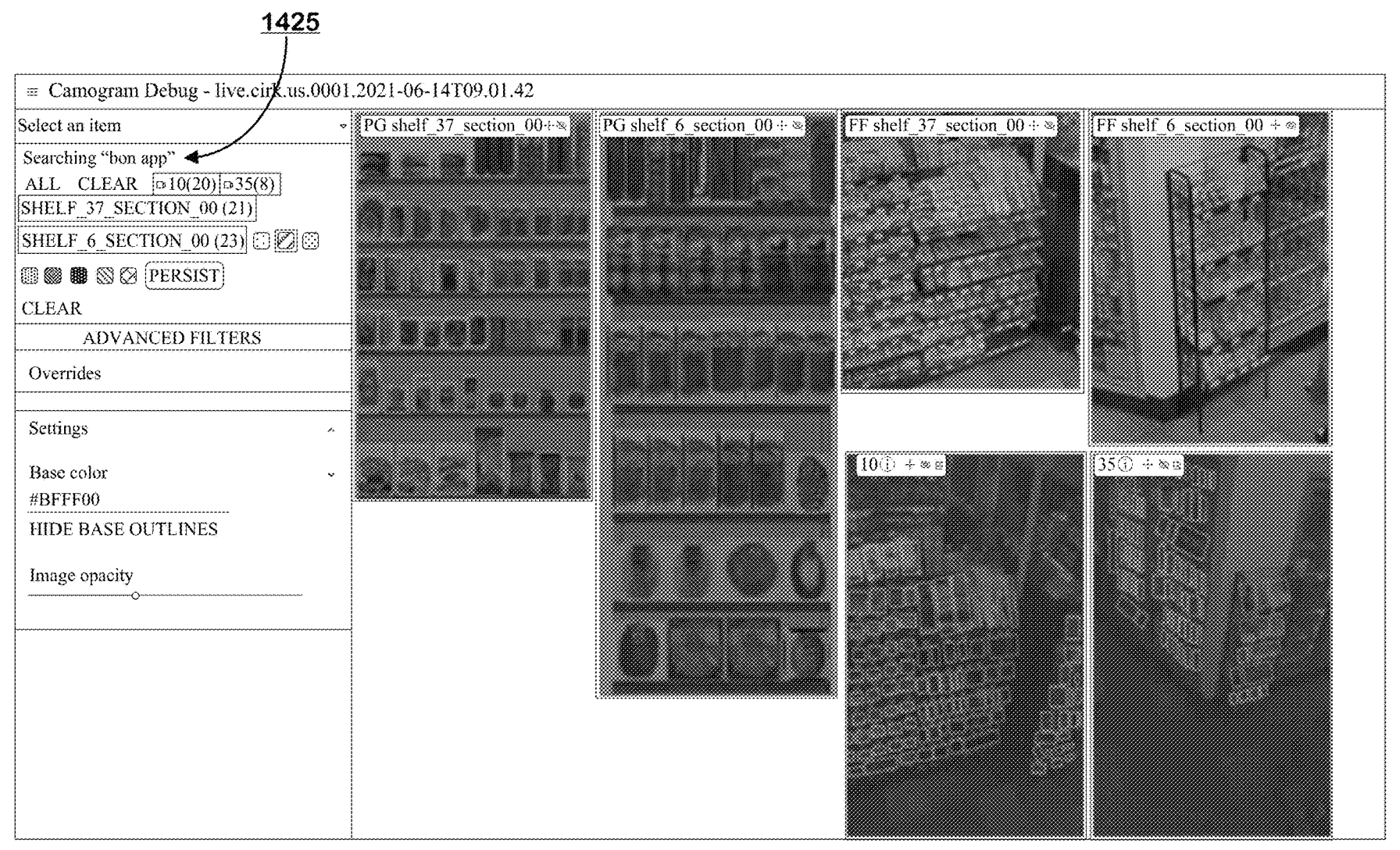
Figure 14E:
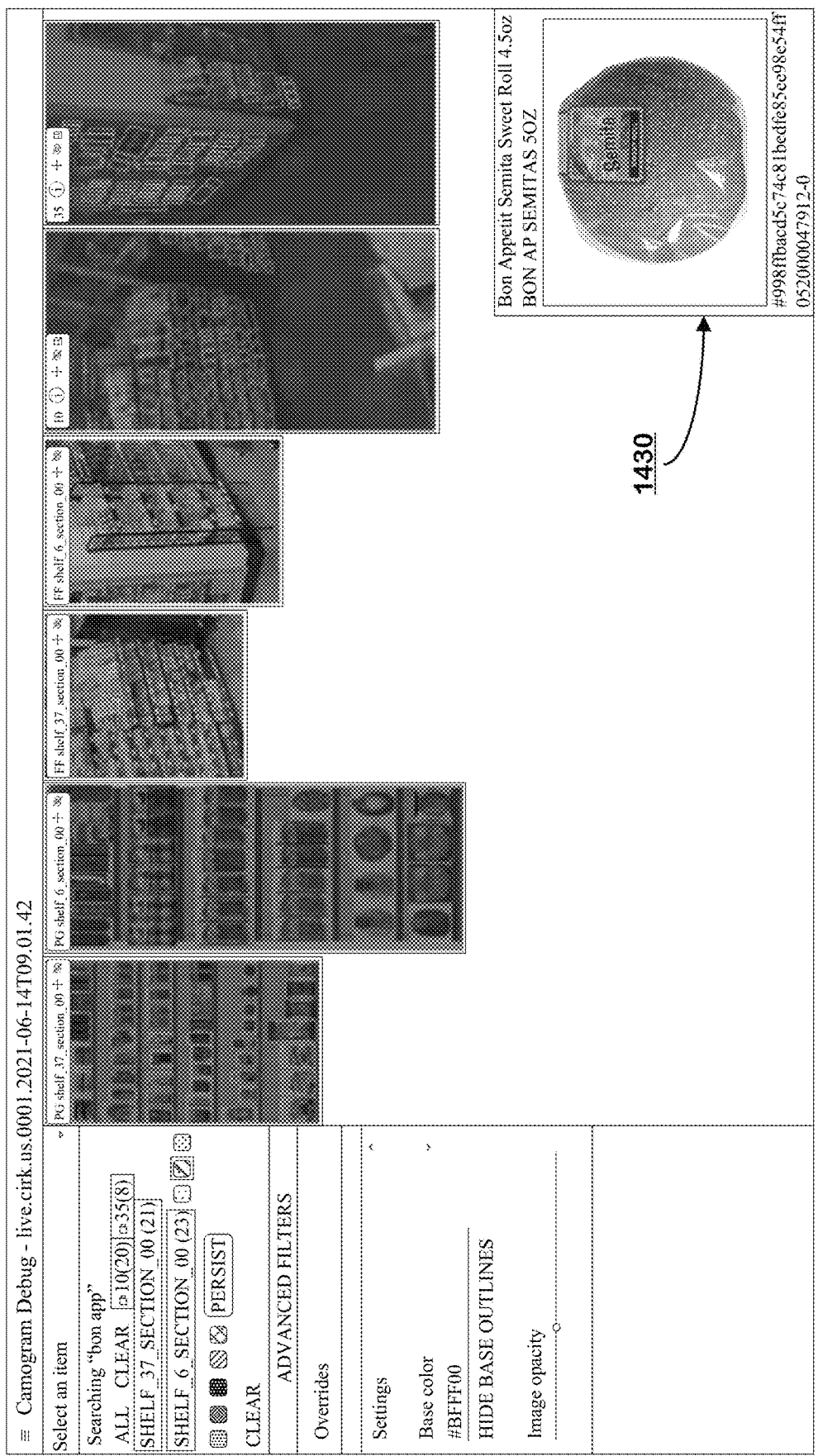

FIG. 14B illustrates search of item using camogram. The reviewer can select all "Gatorade™" products to be shown in a particular colored boxes such as blue or yellow color etc. The technology disclosed displays all items labeled as "Gatorade™" on camogram, positioned in multiple locations in the shopping store. Reviewers can also access the planogram during the review as shown in illustration 1410 and 1415. This can help the reviewer to identify what item may be taken by a visitor to a store. FIG. 14C shows a particular instance of an item as selected from the camogram. The item's image and other information is displayed in a window 1420. FIG. 14D shows another item searched in the store labeled "bon app" (1425). The user interface in FIG. 14D shows planograms and high-resolution images. FIG. 14E shows a detailed view of the item in a window at the right bottom (1430). The item's image is displayed in the window along with item name and other details.

Figure 14F:
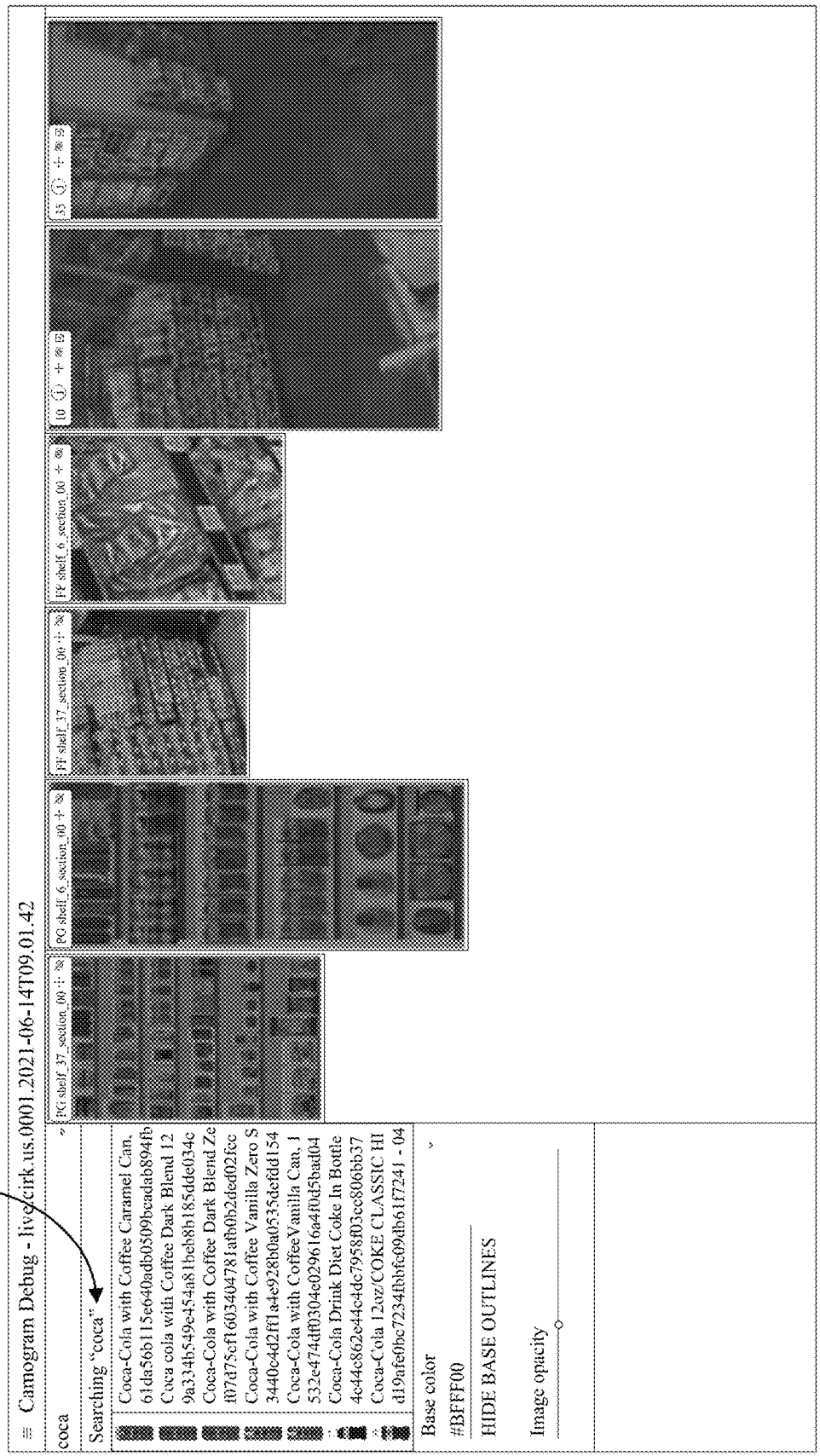
Figure 14G:
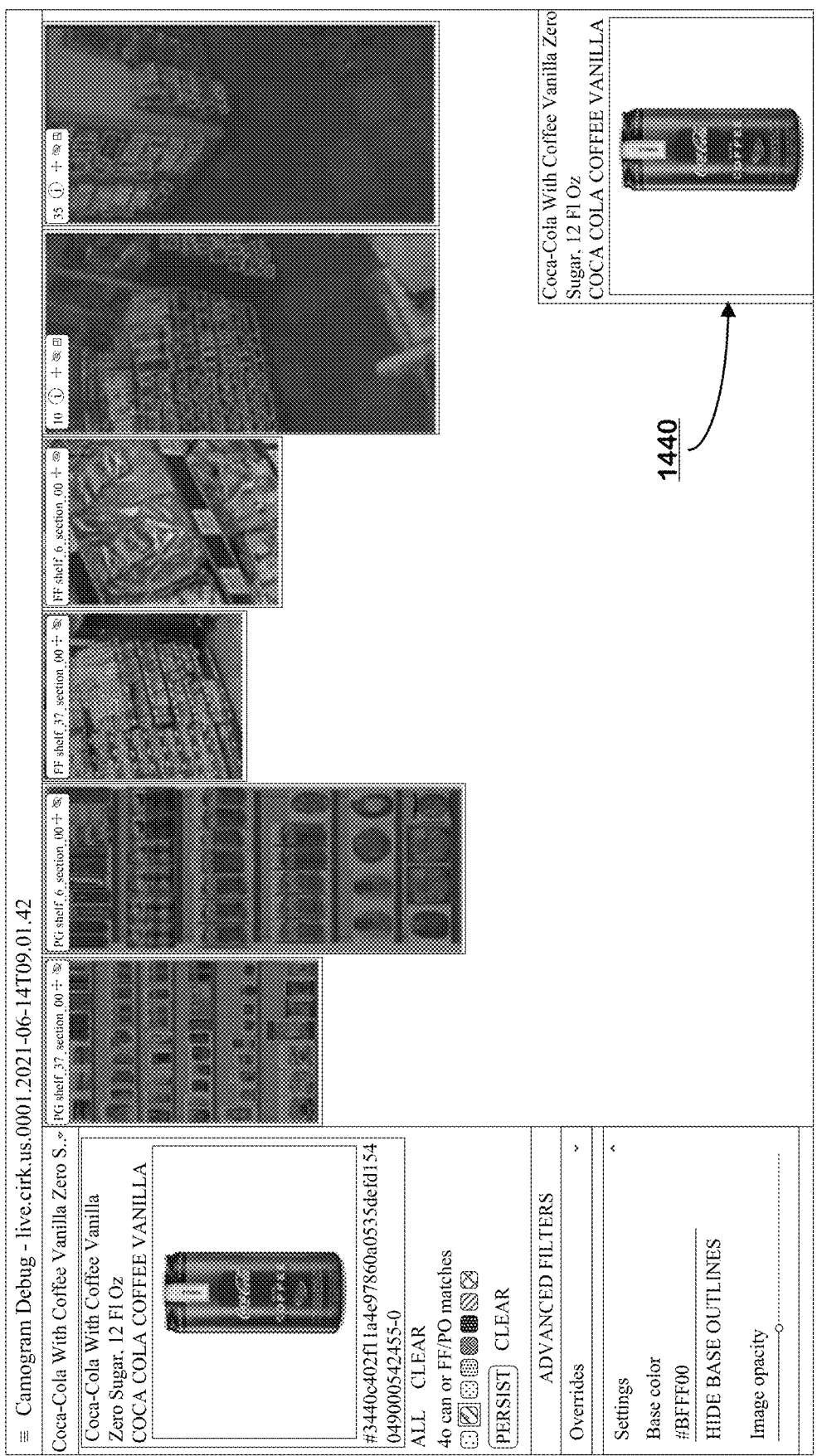

FIG. 14F shows searching items using partial name of the item entered in the search bar in the left window (1435). The search keyword "coca" results in a list of inventory items presented a search results window. Selecting a particular item from the search results presents details of the selected item in the left window and also presents product details in a small window 1440 on the bottom right of the user interface (FIG. 14G).

Two Methods to Map 3D Grids on Camograms

The technology disclosed can use two approaches to map 3D grids on camogram images. The first approach is to use calibrated images and the second approach is to use stretched (or skewed) images in case of non-calibrated cameras. The 3D grids form cells or grids on camograms that can be viewed and processed in three dimensions of the area of real space.

The first method to map 3D grids on camogram is to identify items in the area of real space to label the items as they appear in the area of real space. This approach is suitable for some product arrangements such as pile of items in the store. For example, this method can be applied to form 3D grids for a pile or a tower of water bottle cases.

The second method considers that shelves have item slots (or cells) in which items are positioned and using that map the technology disclosed can identify the slots in which items are positioned and which slots are vacant. If there is a shelf or a portion of the shelf that is empty then using the planned placement of items in the slots in the shelf, it can be determined which items have been taken by one or more subjects or which items have been placed in the shelf in a current time interval. The slots can be compared across time intervals to determine which items have been taken and which items have been placed in slots that were empty in the previous time interval. In other words, in this method the process to map grids on camogram can start with an image of a shelf. The image may be of an empty shelf or an empty fridge. The system can then populate the image with planogram information. The reviewer can have the camogram as a starting image. This can be considered as a grid overlaying images. The technology disclosed can create a camogram structure using the grid structure and planogram information.

Figure 15:
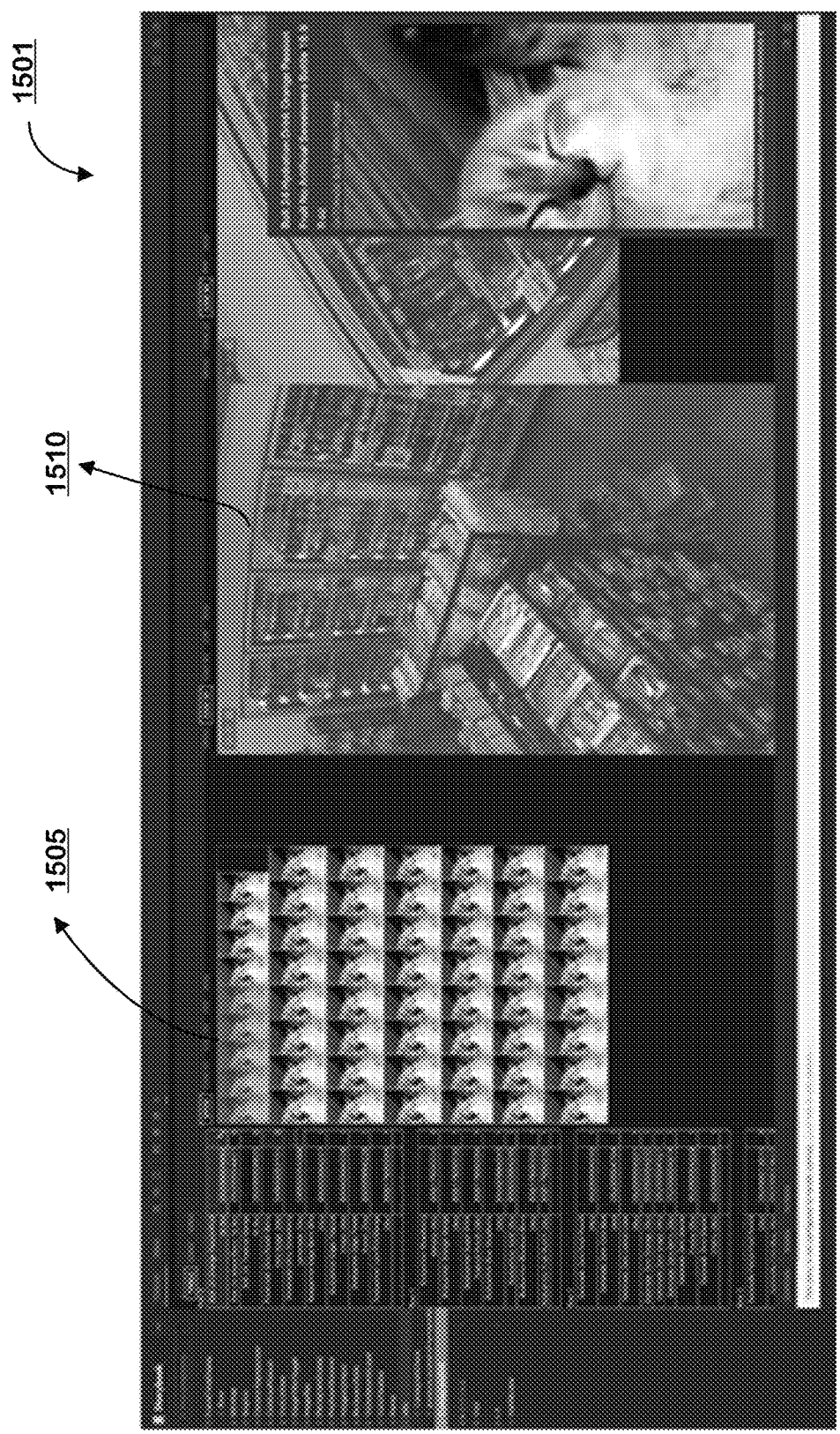
FIG. 15 presents mapping of grids on camograms for determining positions of items in inventory display structures.

FIG. 15 illustrates mapping of grids on a camogram. In a left side window of the user interface 1501, default images of items (cat images) are displayed in a planogram 1505. The items are arranged in slots, grids or cells that are mapped to inventory locations in an inventory display structure 1510. One slot is designated for placing one item in the shelf. The technology disclosed provides tools for efficient updates of camograms by allowing the reviewer or user of the mapping tool to select one or more slots and update the inventory items in those slots. For example, as shown in FIG. 15, the user has selected five slots in the top row of the planogram. The selected slots in the planogram appear as highlighted boxes in the planogram (1505) and corresponding locations in the inventory display structure are also highlighted in a same color (in the inventory display structure 1510). This helps the reviewer to quickly identify the locations in the area of real space where the items in planogram are placed. The technology disclosed provides tools to select a plurality of slots in the planogram and remove items from selected slots, change items in the selected slots or merge two or more slots to make a bigger slot for accommodating larger items. For example, the user can replace the default images with actual images of the inventory items and the user can update descriptions of the inventory items. Further details of operation steps for first and second methods of mapping 3D grids on camograms are presented below.

First Method of Mapping 3D Grids on Camograms

The first method includes the following operations.

Operation (1): identifying one or more cameras (and what parts of those cameras views) need to be labeled. For example, a camera view X is of both an aisle with endcap and the fridges behind that aisle. The method includes labeling the foreground aisle and excluding the background fridges from labels.

Operation (2): For the area of real space being labeled, drawing using a trained machine learning model, bounding boxes around items and identifying each shape with an item placed in that cell or slots.

Operation (3): Repeating operations 1 and 2 for other camera views. If another camera view needs to have the same items labeled, this approach can label the same item from multiple camera views. However, the technology disclosed can cross-reference same items labeled from different camera views.

Second Method of Mapping 3D Grids on Camograms

The second method includes the following operations.

Operation (1): Identifying a physical inventory display structure that the internal planogram represents.

Operation (2): Accessing details of the items on that inventory display structure, whether through a retailer provided planogram, a physical scan of the inventory display structure in store with a barcode scanner (e.g., using a scanner app to systematically capture images of items), or using a front facing photograph.

Operation (3): Mapping the internal planogram to camera views. This can be done either via using 3D positioning data e.g., the shelf is known to occupy a certain 3D position in the area of real space, and have specific width/height/depth etc. The mapping can also be performed by stretching/skewing onto an un-calibrated 2D image. As there is an underlying internal planogram, any update to that data would be reflected in projections of that data.

FIG. 15 presents an example in which multiple slots for an item are mapped on an inventory display structure. Making the items as "zeros" in slots can then change the rectangles or increase the width of boxes as shown below. The camogram will then be updated automatically. This approach requires items to be positioned in well-defined slots. The technology disclosed includes a feature to let a store employee to scan items in the store using a scanner gun or tablet. The system can take a picture, annotate the picture and apply to all the places where the item is located at. The system does not need fully calibrated cameras to do that. This is an alternative way to enter items in the inventory item database 150.

Figure 16:
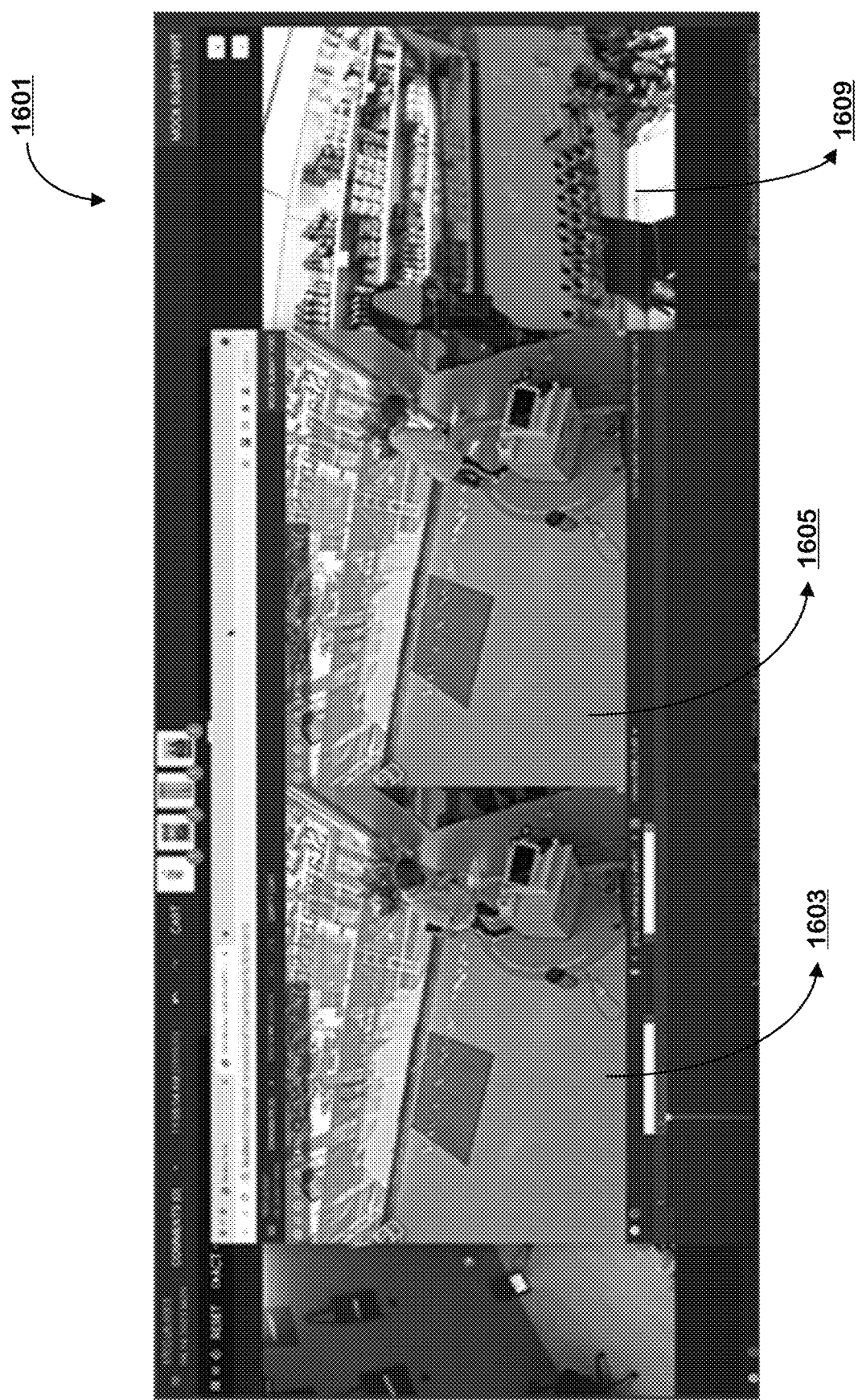
FIG. 16 presents a two camera view tool when images of the area of real space are received from 360 degree cameras.

FIG. 16 presents a user interface 1601 of the two camera view tool when images are received from 360 degrees cameras positioned in the area of real space. The technology disclosed can process images received from 360 degree cameras in the area of real space. The technology disclosed can take as input the full 360 distorted fisheye images from a 360 degree camera and then undistort the images received for further processing. Using 360 degree cameras requires less cameras to be installed in the store as these cameras provide larger coverage of the area of real space. FIG. 16 shows images received by 360 degree cameras in left and middle windows, 1603 and 1605, respectively. The right window 1609 presents images received from a standard pan-tilt-zoom (PTZ) camera positioned in the area of real space. The right window also displays several green colored triangles on the image. The triangles indicate positions of cameras in the area of real space and the directions of the triangles indicate the orientation of cameras. Standard PTZ cameras have an orientation and view the area of real space in their respective fields of view. The 360 degree cameras are different as there are no directions (or orientations) of 360 degree cameras. Therefore, in the camera placement map for the area of real space, 360 degree cameras are represented as circles.

The technology disclosed can also include cameras that include computing resources. These cameras can perform computations related to subject tracking, pose detection, inventory event detection or other tasks at least partially and send the computed results to the server. Such camera installation can also reduce Internet bandwidth requirements.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method for tracking inventory items in an area of real space, the method comprising:
   in response to receiving a signal, generated in dependence on sensors and indicating a change to a portion of an image of an area of real space, implementing a trained location detection model to determine that an inventory item identified in the portion of the image has changed a position within a same location in the area of real space as a result of the inventory item being a shifted inventory item;
   implementing a trained item classification model to determine a classification of the inventory item; and
   updating an inventory database with inventory item data determined in dependence on the determined classification of the inventory item to provide an updated map of the area of real space as a result of the received signal indicating the change to the portion of the image,
   wherein the trained location detection model determines that the inventory item is the shifted inventory item based on the inventory item being shifted within the same location.

2. The method of claim 1, further comprising, responsive to the determination that the inventory item is the shifted inventory item, determining that the inventory item does not need to be re-categorized.

3. The method of claim 1, wherein the portion of the image includes a location of a cell in a map of the area of real space and the inventory item is located in the location of the cell in the map.

4. The method of claim 3, wherein the trained location detection model determines that the inventory item has changed the position within the same location based on the inventory item changing the position while remaining within the location of the cell in the map.

5. The method of claim 1,
   wherein the method further includes in response to the trained location detection model determining that another inventory item has not changed the position within the same location, but has rather changed a location, implementing a trained product category determination model to determine a product category for the inventory item, and
   wherein the implementing of the trained product category determination model is performed prior to the implementing of the trained item classification model.

6. The method of claim 5, wherein the implementing of the trained product category determination model includes:
inputting, to the trained product category determination model, the portion of the image of the area of real space (a) matching a location of a cell in which the inventory item is located in a map of the area of real space and (b) obtained in a current time interval; and
determining, by the trained product category determination model, the product category for the inventory item, which is located in the cell in the map of the area of real space from the portion of the image obtained in the current time interval.

7. The method of claim 1, wherein the implementing of the trained location detection model includes:
inputting, to the trained location detection model, (i) a portion of a first image of the area of real space (a) matching a location of a cell in which the inventory item is located in a map of the area of real space and (b) obtained in a previous time interval and (ii) a portion of a second image of the area of real space (a) matching the location of the cell and (b) obtained in a current time interval; and
determining, by the trained location detection model, that the inventory item located in the cell has changed the position within the same location in dependence on the location of the inventory item in the first image and the second image.

8. The method of claim 1, wherein the implementing of the trained item classification model includes:
inputting, to the trained item classification model, (i) the portion of the image of the area of real space (a) matching a location of a cell in which the inventory item is located in a map of the area of real space and (b) obtained in a current time interval, (ii) a determined product category of the inventory item, and (iii) a determined size of the inventory item; and
classifying, by the trained item classification model, the inventory item in dependence upon the portion of the image of the area of real space, the determined product category of the inventory item and the determined size of the inventory item.

9. The method of claim 8, prior to the inputting to the trained item classification model, the method further including:
determining, using a trained item size detection model, a size of the inventory item, which is located in the cell, from the portion of the image obtained in the current time interval, by processing the portion of the image by warping and cropping the portion of the image and providing the processed portion of the image to the trained item classification model.

10. The method of claim 1,
wherein the received signal indicating the change is generated by matching at least one factored image of inventory locations in the area of real space captured in a first time interval with at least one factored image of inventory locations in the area of real space captured in a second time interval, and
wherein the factored images are generated by removing foreground objects occluding inventory items placed in inventory locations.

11. The method of claim 10, wherein the received signal indicating the change is generated based on a mismatch being detected between the factored images at a location of the inventory item.

12. The method of claim 1, wherein the received signal indicating the change is generated by matching a first image captured in a first time interval with a second image captured in a second time interval, such that the signal indicating the change is generated based on the first image including at least a hand, of a subject, without an inventory item and the second image containing the hand, of the subject, holding at least one inventory item.

13. The method of claim 1, wherein the received signal indicating the change is generated by matching at least a first image of inventory locations in the area of real space captured in a first time interval with at least a second image of inventory locations in the area of real space captured in a second time interval, wherein the first image and the second image are captured by a same sensor, and wherein the received signal indicating the change is generated based on a mismatch being detected between the first image and the second image.

14. The method of claim 1, wherein the trained location detection model determines that the inventory item has changed a position within the same location in the area of real space based on the inventory item being relocated to another location in the area of real space that is designated as being a proper location for a particular inventory item that is the same as the inventory item.

15. The method of claim 1, wherein the inventory item data includes at least one of: a category of the inventory item, a sub-category of the inventory item, a description of the inventory item, a location in three-dimensions of the inventory item within the area of real space, a weight of the inventory item, a flavor of the inventory item, and a shelf-identifier of a shelf on which the inventory item is located.

16. A method for tracking inventory items in an area of real space, the method comprising:
in response to receiving a signal, generated in dependence on sensors and indicating a change to a portion of an image of an area of real space, implementing a trained location detection model to determine that an inventory item identified in the portion of the image has changed a position within a same location in the area of real space as a result of the inventory item being a rotated inventory item;
implementing a trained item classification model to determine a classification of the inventory item; and
updating an inventory database with inventory item data determined in dependence on the determined classification of the inventory item to provide an updated map of the area of real space as a result of the received signal indicating the change to the portion of the image, wherein the trained location detection model determines that the inventory item is the rotated inventory item based on the inventory item being rotated within the same location.

17. The method of claim 16, further comprising, responsive to the determination that the inventory item is the rotated inventory item, determining that the inventory item does not need to be re-categorized.

18. The method of claim 16, wherein the inventory item data includes at least one of: a category of the inventory item, a sub-category of the inventory item, a description of the inventory item, a location in three-dimensions of the inventory item within the area of real space, a weight of the inventory item, a flavor of the inventory item, and a shelf-identifier of a shelf on which the inventory item is located.

19. A system including one or more processors coupled to memory, the memory being loaded with computer instructions for tracking inventory items in an area of real space, the computer instructions, when executed on the one or more processors, causing the one or more processors to implement actions comprising:
  in response to receiving a signal, generated in dependence on sensors and indicating a change to a portion of an image of an area of real space, implementing a trained location detection model to determine that an inventory item identified in the portion of the image has changed a position within a same location in the area of real space as a result of the inventory item being a shifted inventory item;
  implementing a trained item classification model to determine a classification of the inventory item; and
  updating an inventory database with inventory item data determined in dependence on the determined classification of the inventory item to provide an updated map of the area of real space as a result of the received signal indicating the change to the portion of the image,
  wherein the trained location detection model determines that the inventory item is the shifted inventory item based on the inventory item being shifted within the same location.

\* \* \* \* \*